(12) United States Patent
Lu et al.

(10) Patent No.: US 11,832,260 B2
(45) Date of Patent: Nov. 28, 2023

(54) CONTROL INFORMATION TRANSMISSION METHOD AND APPARATUS, RESOURCE POOL CONFIGURATION METHOD AND APPARATUS, AND COMMUNICATION DEVICE

(71) Applicant: GUANGDONG OPPO MOBILE TELECOMMUNICATIONS CORP., LTD., Guangdong (CN)

(72) Inventors: Qianxi Lu, Guangdong (CN); Huei-Ming Lin, South Yarra (AU)

(73) Assignee: GUANGDONG OPPO MOBILE TELECOMMUNICATIONS CORP., LTD.

( * ) Notice: Subject to any disclaimer, the term of this patent is extended or adjusted under 35 U.S.C. 154(b) by 394 days.

(21) Appl. No.: 17/139,433

(22) Filed: Dec. 31, 2020

(65) Prior Publication Data

US 2021/0127413 A1  Apr. 29, 2021

Related U.S. Application Data

(63) Continuation of application No. PCT/CN2018/115283, filed on Nov. 13, 2018.

(30) Foreign Application Priority Data

Jul. 5, 2018  (CN) .......................... 201810729890.8
Jul. 5, 2018  (CN) .......................... 201810730628.5

(Continued)

(51) Int. Cl.
*H04W 72/21* (2023.01)
*H04W 72/044* (2023.01)

(52) U.S. Cl.
CPC ......... *H04W 72/21* (2023.01); *H04W 72/044* (2013.01)

(58) Field of Classification Search
CPC ............................ H04W 72/21; H04W 72/044
(Continued)

(56) References Cited

U.S. PATENT DOCUMENTS 9,893,855 B2  2/2018  Kim et al.
2013/0163556 A1  6/2013  Lee et al.
(Continued)

FOREIGN PATENT DOCUMENTS

CN  105981454 A  9/2016
CN  106165510 A  11/2016
(Continued)

OTHER PUBLICATIONS

Second Office Action of the Chinese application No. 202110192243.X, dated Oct. 31, 2022. 17 pages with English translation.
(Continued)

Primary Examiner — Chi Tang P Cheng
(74) Attorney, Agent, or Firm — PERKINS COIE LLP

(57) ABSTRACT

A control information transmission method and apparatus are provided. The method comprises: transmitting first control information between a first terminal and a second terminal, the first control information being borne on a first control channel and used for scheduling transmission of a first data channel, and the first data channel being used for transmitting data between the first terminal and the second terminal, wherein the first control channel and the first data channel perform time division transmission.

27 Claims, 4 Drawing Sheets

(30) Foreign Application Priority Data

| Jul. 5, 2018 | (CN) | 201810731570.6 |
| Jul. 19, 2018 | (CN) | 201810799372.3 |
| Sep. 4, 2018 | (CN) | 201811026782.0 |
| Sep. 4, 2018 | (CN) | 201811027557.9 |
| Sep. 4, 2018 | (CN) | 201811028294.3 |

(58) Field of Classification Search
USPC .......................................................... 370/330
See application file for complete search history.

(56) References Cited

U.S. PATENT DOCUMENTS

| 2016/0066337 | A1* | 3/2016 | Sartori | H04W 76/14 |
| | | | | 370/329 |
| 2016/0073408 | A1* | 3/2016 | Sartori | H04W 72/0453 |
| | | | | 370/329 |
| 2017/0006580 | A1 | 1/2017 | Patil et al. | |
| 2017/0012753 | A1 | 1/2017 | Kim et al. | |
| 2017/0019886 | A1 | 1/2017 | Patel et al. | |
| 2017/0230956 | A1 | 8/2017 | Kim et al. | |
| 2017/0290020 | A1 | 10/2017 | Aiba et al. | |
| 2018/0159672 | A1 | 6/2018 | Kim et al. | |
| 2018/0176892 | A1 | 6/2018 | Kim et al. | |
| 2018/0234220 | A1 | 8/2018 | Yasukawa et al. | |
| 2019/0182827 | A1 | 6/2019 | Wang et al. | |
| 2020/0267702 | A1 | 8/2020 | Kim et al. | |
| 2021/0028896 | A1 | 1/2021 | Yasukawa et al. | |

FOREIGN PATENT DOCUMENTS

| CN | 106550459 A | 3/2017 |
| CN | 106793092 A | 5/2017 |
| CN | 107079529 A | 8/2017 |
| CN | 107852302 A | 3/2018 |
| CN | 107926005 A | 4/2018 |
| EP | 3128797 A1 | 2/2017 |
| EP | 3331301 A1 | 6/2018 |
| JP | 2017516361 A | 6/2017 |
| WO | 2017026511 A1 | 2/2017 |
| WO | 2017084514 A1 | 5/2017 |
| WO | 2017135998 A1 | 8/2017 |
| WO | 2017195463 A1 | 11/2017 |
| WO | 2018058418 A1 | 4/2018 |

OTHER PUBLICATIONS

Second Office Action of the Japanese application No. 2021-500075, dated Dec. 6, 2022. 3 pages with English translation.
Second Office Action of the Canadian application No. 3105519, dated Oct. 28, 2022. 4 pages.
First Office Action of the Canadian application No. 3105519, dated Feb. 2, 2022. 4 pages.
First Office Action of the European application No. 18925229.9, dated Mar. 29, 2022. 4 pages.
First Office Action of the Chinese Application No. 202110192243. X, dated Jul. 27, 2022. 22 pages with English translation.
First Office Action of the Taiwanese Application No. 108123283, dated Aug. 15, 2022. 14 pages with English translation.
Office Action of the Indian Application No. 202117003200, dated Aug. 18, 2022. 6 pages with English translation.
First Office Action of the Japanese Application No. 2021-500075, dated Sep. 9, 2022. 7 pages with English translation.
Supplementary European Search Report in the European application No. 18925229.9, dated Jul. 21, 2021. 8 pages.
Written Opinion of the International Search Authority in the international application No. PCT/CN2018/115283, dated Mar. 26, 2019. 9 pages with English translation.
International Search Report in the international application No. PCT/CN2018/115283, dated Mar. 26, 2019.
3GPP TS 36.331 V14.2.2 (Apr. 2017), 3rd Generation Partnership Project; Technical Specification Group Radio Access Network; Evolved Universal Terrestrial Radio Access (E-UTRA); Radio Resource Control (RRC) Protocol specification Release 14).
Huawei, HiSilicon, Sidelink PHY structure and procedure for NR V2X, Discussion and decision, 3GPP TSG RAN WG1 Meeting #94bis R1-1810138, Oct. 8-12, 2018.
Intel Corporation; 3GPP TSG RAN WG1 Meeting #86 R1-166516, "Scheduling assignment for sidelink V2V communication", Gothenburg, Sweden, Aug. 22-26, 2016. 10 pages.
ZTE; 3GPP TSG RAN WG1 Meeting #90 R1-1712919, "Resource pool configuration for FeD2D" Prague, Czech Republic, Aug. 21-25, 2017. 4 pages.
European Search Report in the European application No. 22212066. 9, dated Feb. 9, 2023. 11 pages.
Decision of Refusal of the Chinese application No. 202110192243. X, dated Feb. 1, 2023. 15 pages with English translation.
Third Office Action of the Canadian application No. 3105519, dated May 3, 2023. 4 pages.

* cited by examiner

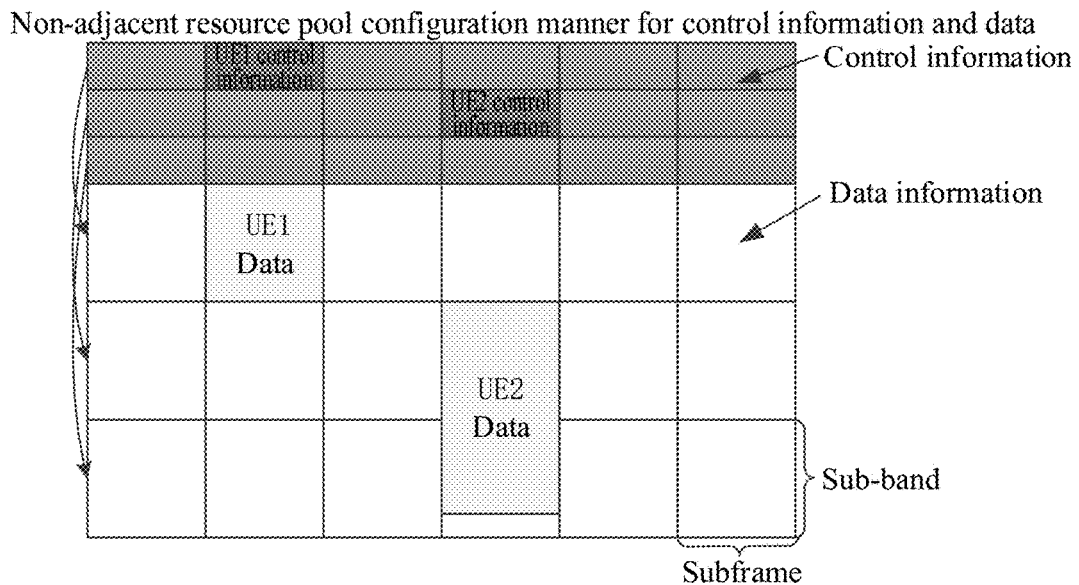

FIG. 4(b)

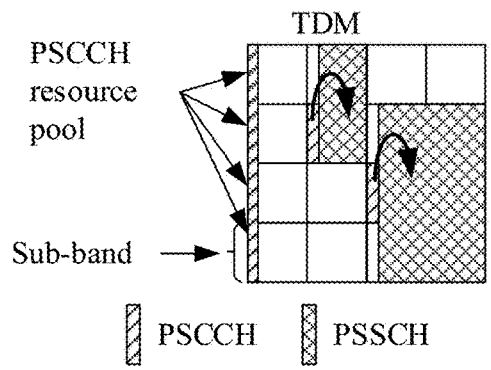

FIG. 5(a)

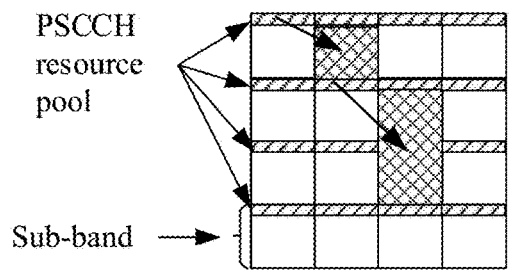

FIG. 5(b)

| A first terminal performs transmission of first control information between the first terminal and a second terminal, the first control information being carried in a first control channel and being used to schedule transmission of a first data channel, the first data channel being used for data transmission between the first terminal and the second terminal, and transmission of the first data channel and the first control channel being time division | 6011 |

FIG. 6(a)

A first terminal performs transmission of first control information between the first terminal and a second device, the first control information being carried in a second control channel and being used to schedule transmission of a first control channel and/or a first data channel, the first control channel being used for transmission of SCI, the first data channel being used for transmission of SL data, and transmission of the first data channel and the first control channel being time division ― 6012

FIG. 6(b)

A first terminal acquires first configuration information, the first configuration information being used to determine at least one of: a time-domain resource of a first resource pool, a frequency-domain resource of the first resource pool, a time-domain resource of a second resource pool or a frequency-domain resource of the second resource pool, a resource in the first resource pool is capable of transmitting a first control channel, the first control channel being used for transmission of SCI, a resource in the second resource pool is capable of transmitting a first data channel and the first data channel being configured for transmission of SL data ― 6013

FIG. 6(c)

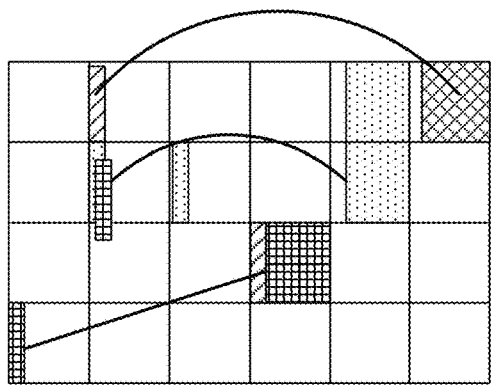

FIG. 7(a)

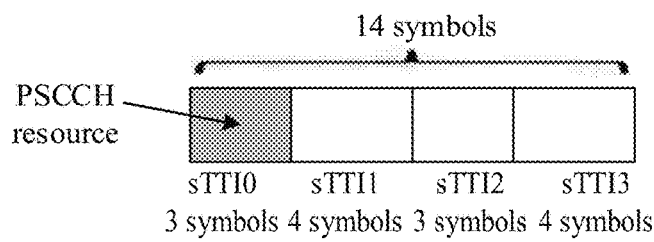

FIG. 7(b)

| Device for control information transmission |
| --- |
| Transmission unit 8011 |

FIG. 8(a)

CONTROL INFORMATION TRANSMISSION METHOD AND APPARATUS, RESOURCE POOL CONFIGURATION METHOD AND APPARATUS, AND COMMUNICATION DEVICE

CROSS-REFERENCE TO RELATED APPLICATION

This is a continuation application of International Patent Application No. PCT/CN2018/115283, filed on Nov. 13, 2018, which claims priority to Chinese Patent Application: No. CN 201810729890.8, filed on Jul. 5, 2018; No. CN 201810731570.6, filed on Jul. 5, 2018; No. CN 201810730628.5, filed on Jul. 5, 2018; No. CN 201810799372.3, filed on Jul. 19, 2018; No. CN 201811028294.3, filed on Sep. 4, 2018; No. CN 201811026782.0, filed on Sep. 4, 2018; No. CN 201811027557.9, filed on Sep. 4, 2018, the contents of which are hereby incorporated by reference in its entirety.

BACKGROUND

A Sidelink (SL) transmission technology based on Long Term Evolution (LTE) Device to Device (D2D) is adopted for a Vehicle-to-Everything (V2X) system. Unlike a conventional LTE system adopting a manner of receiving or transmitting communication data by a base station, a V2X system adopts a D2D communication manner and thus has a higher in spectrum efficiency and lower in transmission delay.

In 3rd Generation Partnership Project (3GPP) Release 14 (Rel-14), a V2X technology is standardized, and two transmission modes including a mode 3 and a mode 4 are defined. In the mode 3, a transmission resource of a terminal is allocated by a base station. In the mode 4, the terminal determines the transmission resource in a manner of combining sensing and reservation.

In a V2X system, a transmission manner of Sidelink Control Information (SCI)+data is adopted for data transmitted through an SL. The SCI carries control information corresponding to data transmission, for example, a Modulation and Coding Scheme (MCS), time-frequency resource allocation information and resource reservation information. A receiving terminal detects the control information to obtain a time-frequency resource position, reservation information and the like of the data and thus may judge whether a resource is available or not. If the terminal may not successfully detect the control information, energy on each transmission resource may be measured, all the transmission resources are sequenced from high energy to low energy, and the resource with low energy is preferentially selected for use.

In New Radio (NR)-V2X, self-driving is required to be supported, and thus higher requirements, for example, a higher throughput, a lower delay, higher reliability, wider coverage and more flexible resource allocation, are made to data interaction between vehicles.

A resource multiplexing manner for data and control information in LTE-V2X determines that a terminal is required to detect all control information at first and then detect data, which may usually cause a relatively higher delay. For example, the terminal is required to receive all control information in 1 ms, extract the control information and then detect corresponding data.

SUMMARY

Embodiments of the disclosure relate to the technical field of mobile communication, and particularly to a method for control information transmission, a method and device for resource pool configuration, and a communication device.

The embodiments of the disclosure provide a method for control information transmission, which may include the following operation.

A first terminal performs transmission of first control information between the first terminal and a second terminal, the first control information being carried in a first control channel and being used to schedule transmission of a first data channel, the first data channel being used for data transmission between the first terminal and the second terminal, and transmission of the first data channel and the first control channel being time division.

The embodiments of the disclosure provide a device for control information transmission, which may be applied to a first terminal and include a transmission unit.

The transmission unit may be configured to perform transmission of first control information between the first terminal and a second terminal, the first control information being carried in a first control channel and being used to schedule transmission of a first data channel, the first data channel being used for data transmission between the first terminal and the second terminal, and transmission of the first data channel and the first control channel being time division.

The embodiments of the disclosure provide a method for control information transmission, which may include the following operation.

A first terminal performs transmission of first control information between the first terminal and a second device, the first control information being carried in a second control channel and being used to schedule transmission of a first control channel and/or a first data channel, the first control channel being used for transmission of SCI, the first data channel being used for transmission of SL data, and transmission of the first data channel and the first control channel is time division.

The embodiments of the disclosure provide a device for control information transmission, which may be applied to a first device and include a transmission unit.

The transmission unit may be configured to perform transmission of first control information between the first terminal and a second device, the first control information being carried in a second control channel and being used to schedule transmission of a first control channel and/or a first data channel, the first control channel being used for transmission of SCI, the first data channel being used for transmission of SL data, and transmission of the first data channel and the first control channel is time division.

The embodiments of the disclosure provide a method for a resource configuration, which may include the following operation.

A first terminal acquires first configuration information, the first configuration information being used to determine at least one of: a time-domain resource of a first resource pool, a frequency-domain resource of the first resource pool, a time-domain resource of a second resource pool or a frequency-domain resource of the second resource pool.

A resource in the first resource pool is capable of transmitting a first control channel, the first control channel being used for transmission of SCI. A resource in the second resource pool is capable of transmitting a first data channel, the first data channel being used for transmission of SL data.

The embodiments of the disclosure provide a device for a resource configuration, which may include an acquisition unit.

The acquisition unit may be configured to acquire first configuration information, the first configuration information being used to determine at least one of: a time-domain resource of a first resource pool, a frequency-domain resource of the first resource pool, a time-domain resource of a second resource pool or a frequency-domain resource of the second resource pool.

A resource in the first resource pool is capable of transmitting a first control channel, the first control channel being used for transmission of SCI. A resource in the second resource pool is capable of transmitting a first data channel, the first data channel being used for transmission of SL data.

The embodiments of the disclosure provide a communication device, which may include a processor and a memory having stored therein a computer program, and the processor may be configured to call and run the computer program stored in the memory to execute the method for control information transmission.

The embodiments of the disclosure provide a chip, which may be configured to implement the method for control information transmission.

Specifically, the chip may include a processor, configured to call and run a computer program in a memory to enable a device installed with the chip to execute the method for control information transmission.

The embodiments of the disclosure provide a computer-readable storage medium having stored therein a computer program that when being executed by a computer, performs the method for control information transmission.

The embodiments of the disclosure provide a computer program product, which may include a computer program instruction, the computer program instruction enabling a computer to execute the method for control information transmission.

The embodiments of the disclosure provide a computer program, which may run in a computer to enable the computer to execute the method for control information transmission.

Through the technical solutions, a format applied to SL control signaling in a V2X system is designed, scheduling of a Physical Sidelink Shared Channel (PSSCH) (i.e., the first data channel) is implemented, and a delay is reduced by time division transmission of a Physical Sidelink Control Channel (PSCCH) (i.e., the first control channel) and the PSSCH.

Through the technical solutions, a format applied to Down Link (DL) control signaling in the V2X system is designed, scheduling of the PSCCH (i.e., the first control channel) and the PSSCH (i.e., the first data channel) is implemented, and the delay is reduced by time division transmission of the PSCCH and the PSSCH.

Through the technical solutions, a resource pool for transmission of the PSCCH (i.e., the first control channel) and/or a resource pool for transmission of the PSSCH (i.e., the first data channel) are/is configured, time division being adopted for the resource pools for the PSCCH and the PSSCH, so that the purpose of reducing the delay is achieved.

BRIEF DESCRIPTION OF THE DRAWINGS

FIG. 4(b) is a third schematic diagram of resources for control information and data.

FIG. 5(a) is a first schematic diagram of resource pools for a PSCCH and a PSSCH.

FIG. 5(b) is a second schematic diagram of resource pools for a PSCCH and a PSSCH.

FIG. 6(a) is a first flowchart of a method for control information transmission according to an embodiment of the disclosure.

FIG. 6(b) is a second flowchart of a method for control information transmission according to an embodiment of the disclosure.

FIG. 6(c) is a flowchart of a method for a resource configuration according to an embodiment of the disclosure.

FIG. 7(a) is a schematic diagram of resource scheduling according to an embodiment of the disclosure.

FIG. 7(b) is a schematic diagram of a resource for a PSCCH according to an embodiment of the disclosure.

FIG. 8(a) is a first structure composition diagram of a device for control information transmission according to an embodiment of the disclosure.

DETAILED DESCRIPTION

In order to make the characteristics and technical contents of the embodiments of the disclosure understood in more detail, implementation of the embodiments of the disclosure will be described below in combination with the drawings in detail. The appended drawings are only adopted for description as references and not intended to limit the embodiments of the disclosure.

For conveniently understanding the technical solutions of the embodiments of the disclosure, a mode 3 and mode 4 in V2X will be explained and described below respectively.

Figure 1:
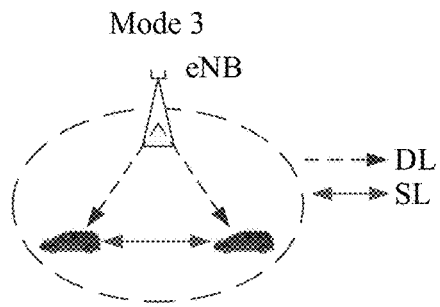
FIG. 1 is a schematic diagram of a scenario of a mode 3 in V2X.

Mode 3: as illustrated in FIG. 1, a transmission resource of a vehicle terminal is allocated by a base station (for example, an Evolved NodeB (eNB) in LTE). Specifically, the base station transmits a control message used to indicate a grant resource to the vehicle terminal through a DL, and then the vehicle terminal transmits data in an SL according to the resource allocated by the base station. In the mode 3, the base station may allocate a resource for single transmission to the vehicle terminal and may also allocate a resource for semi-persistent transmission to the terminal.

Figure 2:
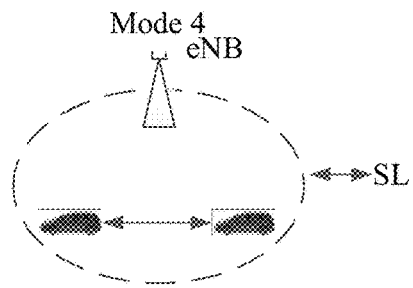
FIG. 2 is a schematic diagram of a scenario of a mode 4 in V2X.

Mode 4: as illustrated in FIG. 2, the vehicle terminal adopts a transmission manner combining sensing and reservation. The vehicle terminal acquires an available transmission resource set in a resource pool in a sensing manner, and the vehicle terminal randomly selects a resource from the transmission resource set for data transmission. Since services in a V2X system is periodic, the vehicle terminal usually adopts a semi-persistent transmission manner, namely the vehicle terminal, after selecting a transmission resource, may keep using the resource in multiple transmission cycles, so that probabilities of resource reselection and resource conflict are reduced. The vehicle terminal may carry information of reserving a resource for next transmission in control information transmitted this time such that another terminal may detect the control information of the vehicle terminal to judge whether this resource is reserved for the vehicle terminal to use or not to achieve the purpose of reducing resource conflicts.

It is to be noted that, in LTE-V2X, the mode 3 is adopted to represent that the transmission resource of the vehicle terminal is allocated by the base station and the mode 4 is adopted to represent that the transmission resource of the vehicle terminal is independently selected by the terminal, while in NR-V2X, a new transmission mode may be defined. There are no limits made thereto in the disclosure.

Figure 3:
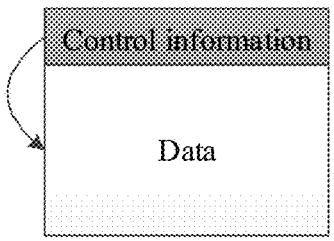
FIG. 3 is a first schematic diagram of resources for control information and data.

Referring to FIG. 3, in LTE-V2X, Frequency Division Multiplexing (FDM) is adopted for data and control information corresponding to the data. Specifically, two configuration manners are adopted for resource pools for the control information and the data: frequency-domain adjacent manner and frequency-domain non-adjacent manner. Specific relationships are illustrated in FIG. 4(a) and FIG. 4(b).

Figure 4A:
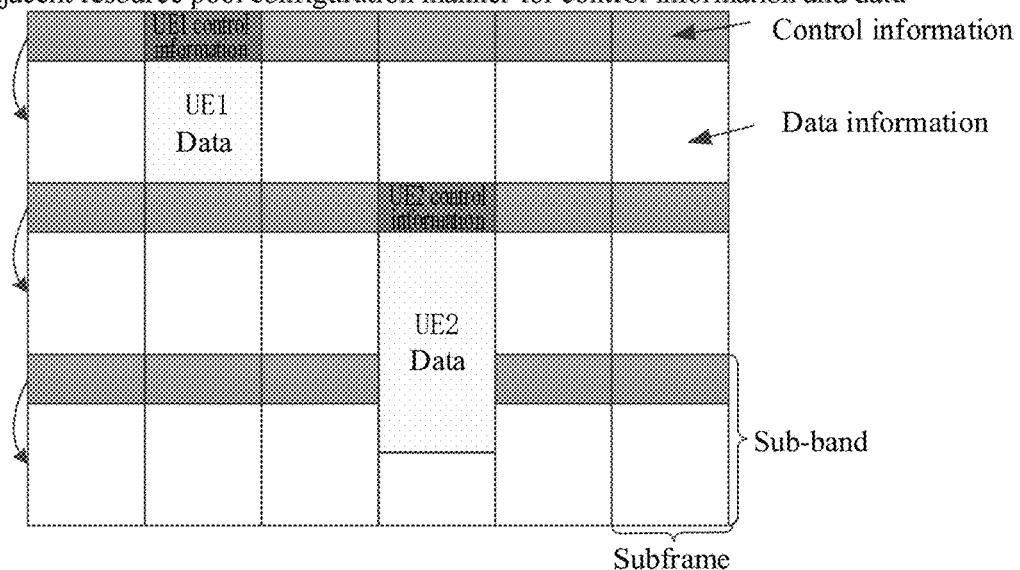
FIG. 4(a) is a second schematic diagram of resources for control information and data.

The frequency-domain adjacent manner, referring to FIG. 4(a): the control information and the data corresponding the control information are adjacent in a frequency domain. A whole system bandwidth takes sub-band as a granularity. Each sub-band includes multiple continuous Physical Resource Blocks (PRBs), first and second PRBs in each sub-band are available control information resources (each piece of control information occupies two PRBs adjacent in the frequency domain), and the other PRBs are available data resources. The data resources correspond to the control resources one to one, and a starting position of the data resource is determined by the control resource corresponding to data resource. The data resource may occupy one sub-band (for example, User Equipment (UE) 1) and may also cross multiple sub-bands (for example, UE2). When the data occupies multiple sub-bands, the data is continuous in the frequency domain in the multiple sub-bands and may occupy control information resources in other sub-bands, and the control information corresponding to the data is in a control information resource in the first sub-band. For example, in the figure, data of the UE2 occupies two adjacent sub-bands, and thus corresponding control information thereof is in a control information resource in a first sub-band.

The frequency-domain non-adjacent manner, referring to FIG. 4(b): the control information and the corresponding data thereof are non-adjacent in the frequency domain. The data resource pool and the control resource pool are independently configured, but positions of data resources correspond to positions of control resources one to one. A starting position of the data resource may be determined by the position of the corresponding control information resource. The data resource may occupy one sub-band (for example, UE1) and may also occupy multiple sub-bands (for example, UE2). When the data occupies multiple sub-bands, the data is continuous in the frequency domain in the multiple sub-bands, and the control information corresponding to the data is in the control information resource in the first sub-band. For example, in the figure, data of UE2 occupies two adjacent sub-bands, and thus the corresponding control information thereof is in the control information resource in the first sub-band.

In NR-V2X, for reducing a delay, a time division transmitting manner may be adopted for a PSCCH and a PSSCH, referring to FIG. 5(a) and FIG. 5(b). In FIG. 5(a), first k (k is an integer greater than or equal to 1) symbols of each subframe are configured for PSCCH transmission, and other symbols in the subframe may be configured for PSSCH transmission. In another possible implementation, the last k symbols of each subframe are configured for PSCCH transmission, and the other symbols or part of symbols in the subframe may be configured for PSSCH transmission. The PSCCH may schedule the PSSCH in the corresponding subframe and may also schedule the PSSCH in other subframe. In FIG. 5(b), structures of resource pools for a PSCCH and a PSSCH are the same as structures of resource pool in existing LTE-V2X (as illustrated in FIG. 4(a)), the difference is that the PSCCH is configured to schedule the PSSCH in a next subframe or a pth (p is an integer greater than or greater than or equal to 1) subsequent subframe, and furthermore, resources for the PSCCH and the scheduled PSSCH may form a one-to-one correspondence. In the embodiments, a granularity of time-domain resources may be a short Transmission Time Interval (sTTI) or a time-domain symbol, so that the purpose of reducing the delay may be achieved.

How to schedule a time-frequency resource for a PSSCH is a problem that may be solved in the embodiments of the disclosure. All the technical solutions of the embodiments of the disclosure are not only applied to a V2X system but also applied to other D2D communication systems. The terminal in the embodiments of the disclosure may be a vehicle terminal, a handheld terminal, a Personal Digital Assistant (PDA), a wearable terminal and the like. The network in the embodiments of the disclosure may be an NR network, an LTE network and the like.

FIG. 6(a) is a first flowchart of a method for control information transmission according to an embodiment of the disclosure. As illustrated in FIG. 6(a), the method for control information transmission includes the following step.

In 6011, a first terminal performs transmission of first control information between the first terminal and a second terminal, the first control information being carried in a first control channel and being used to schedule transmission of a first data channel, the first data channel being used for data transmission between the first terminal and the second terminal, and transmission of the first data channel and the first control channel being time division.

In the embodiment of the disclosure, the operation that the first terminal performs transmission of first control information between the first terminal and the second terminal may include the following two implementations: 1) the first terminal receives the first control information sent by the second terminal; or, 2) the first terminal transmits the first control information to the second terminal.

In an implementation, a link between the first terminal and the second terminal is called an SL, the first control information transmitted between the first terminal and the second terminal is called SCI, and the SCI is configured to schedule transmission of a corresponding data channel (i.e., the first data channel). Herein, the first data channel is used for transmission of the data between the first terminal and the second terminal.

In an implementation, the first control channel is called a PSCCH, the first data channel is called a PSSCH, and transmission of the first data channel and the first control channel is time division, so that a delay may be reduced. Under the condition that transmission of the first data channel and the first control channel is time division, scheduling of transmission of the first data channel by the first control information may be implemented through the following SCI format.

In the embodiment of the disclosure, the first control information includes frequency-domain resource information of the first data channel and/or time-domain resource information of the first data channel.

1) The frequency-domain resource information of the first data channel may be implemented through the following manners.

A first manner: the first control information includes a first bitmap, the first bitmap is used to determine a frequency-domain resource for the first data channel, each bit in the first bitmap corresponds to a frequency-domain unit in a system, and whether the frequency-domain unit corresponding to each bit is configured for transmission of the first data channel or not is determined through a value of the bit in the first bitmap. For any first bit in the first bitmap, if the value of the first bit is a first value, the frequency-domain unit corresponding to the first bit is configured for transmission of the first data channel; and if the value of the first bit is a second value, the frequency-domain unit corresponding to the first bit is not configured for transmission of the first data channel.

Herein, a granularity of the frequency-domain unit is one of: PRB, Resource Block Group (RBG) or sub-band. If the granularity of the frequency-domain unit is RBG or sub-band, an RBG or a sub-band includes K continuous PRBs.

For example, a system bandwidth is 20 MHz, there are totally 100 PRBs, the granularity of the frequency-domain unit is sub-band, and each sub-band includes 5 PRBs. In such case, the first bitmap includes 20 bits corresponding to the 20 sub-bands respectively. When the value of a certain bit in the first bitmap is 1, it is indicated that the sub-band corresponding to the bit is configured for transmission of the PSSCH. When the value of a certain bit in the first bitmap is 0, it is indicated that the sub-band corresponding to the bit is not configured for transmission of the PSSCH. The sub-bands for transmission of the PSSCH may be continuous in a frequency domain or discontinuous in the frequency domain.

A second manner: the first control information includes a first parameter, and the first parameter is used to determine a starting position of the frequency-domain resource for the first data channel and/or a length of the frequency-domain resource for the first data channel. The frequency-domain resource is continuously allocated.

In an implementation, when a frequency-domain starting position of the first control channel is the same as a frequency-domain starting position of the first data channel or there has a one-to-one correspondence between a frequency-domain starting position of the first control channel and a frequency-domain starting position of the first data channel, the first parameter is used to determine the length of the frequency-domain resource corresponding to the first data channel. In another implementation, when frequency-domain ending position of the first control channel is the same as a frequency-domain ending position of the first data channel, the first parameter is used to determine the length of the frequency-domain resource corresponding to the first data channel. For example, when a frequency-domain starting position of the PSCCH carrying SCI is the same as a frequency-domain starting position of PSSCH corresponding to the PSCCH, the frequency-domain starting position of the PSSCH may be determined based on the frequency-domain starting position of the PSCCH, and a length of a frequency-domain resource for the PSSCH is represented through the first parameter.

In an implementation, when the first control information is used to schedule transmission of multiple data channels, the multiple data channels at least include the first data channel and a second data channel, and the first parameter is used to determine lengths of frequency-domain resources corresponding to the multiple data channels and a starting position of the frequency-domain resource corresponding to the second data channel. In the embodiment, if the starting position of the frequency-domain resource for the first data channel and a starting position of a frequency-domain resource of the first control channel have a one-to-one correspondence, the starting position of the frequency-domain resource for the first data channel may be determined through the starting position of the frequency-domain resource for the first control channel; and if the starting position of the frequency-domain resource for the first data channel and the starting position of the frequency-domain resource for the first control channel do not has a one-to-one correspondence, the first control information includes another parameter configured to indicate the starting position of the frequency-domain resource for the first data channel. For example, when the SCI schedules two transmissions of the PSSCH (one is initial transmission and the other is retransmission), the first parameter indicates the length of the frequency-domain resource for the PSSCH and a starting position of the other transmission of the PSSCH. For SCI corresponding to the first transmission of the PSSCH, the first parameter indicates a frequency-domain length of the PSSCH and a frequency-domain starting position of the second transmission of the PSSCH. For SCI corresponding to the second transmission of the PSSCH, the first parameter indicates the frequency-domain length of the PSSCH and a frequency-domain starting position of the first transmission of the PSSCH. For another example, when the SCI schedules four transmissions of the PSSCH (one is initial transmission and the other three are retransmissions), the first parameter includes frequency-domain starting positions of the four transmissions and lengths of frequency-domain resources of the four transmissions. If the lengths of the frequency-domain resources for the four transmissions are the same, the first parameter is only required to indicate the length of one frequency-domain resource, otherwise is required to indicate the lengths of the frequency-domain resources for the four transmissions respectively. If the starting position of the frequency-domain resource for the PSSCH may be determined through the position of the frequency-domain resource for the PSCCH carrying the SCI (for example, frequency-domain starting positions of the PSSCH for the four transmissions are the same and the frequency-domain starting position of the PSSCH for the first transmission forms a one-to-one correspondence with the frequency-domain starting position of the corresponding PSCCH), the first parameter may not include the frequency-domain starting positions for the four transmissions. If the frequency-domain starting positions for the four transmissions are the same or a frequency-hopping manner is adopted for the four transmissions (namely the frequency-domain starting positions of the subsequent three transmissions may be determined through the frequency-domain starting position of the first transmission and a frequency-hopping criterion), the first parameter may include only one frequency-domain starting position.

In an embodiment, the first parameter is determined by the starting position and length of the frequency-domain resource for the first data channel. For example, the first parameter is a Resource Indication Value (RIV), and the value corresponds to an index (n_PRB_start) of a starting PRB of the frequency-domain resource for the PSSCH and the number (L_PRB) of continuously allocated PRBs. The RIV is determined through the following formula.

If $(L\_PRB-1) \leq \lfloor (L\_PRB)/2 \rfloor$, $RIV = N\_PRB(L\_PRB-1) + n\_PRB\_start$ otherwise $RIV = N\_PRB(N\_PRB - L\_PRB + 1) + (N\_PRB - 1 - n\_PRB\_start)$ N_PRB represents the total number of PRBs in a resource pool. In the embodiment, N_PRB may also represent the total number of PRBs in a Band Width Part (BWP) or the total number of PRBs in a carrier, and no limits are made thereto in the embodiment. In the embodiment, the granularity of the frequency-domain resource may also be RBG or sub-band, and no limits are made thereto in the embodiment.

A third manner: the first control information includes first index information, the first index information is used to determine a first frequency-domain resource corresponding to the first index information in first configuration information, and the first configuration information includes at least one correspondence between index information and a frequency-domain resource. The first configuration information is pre-configured or configured by a network. When the first configuration information is configured by the network, the network may transmit the first configuration information through Radio Resource Control (RRC) signaling, or broadcast information or DL control signaling.

For example, the SCI includes an index in a table, and each index in the table corresponds to an allocated frequency-domain resource, for example, a frequency-domain resource determined through a length and a starting position, or a frequency-domain resource determined through one or more frequency-domain unit indexes, or a frequency-domain resource determined through a bitmap or a frequency-domain resource determined in another manner. Therefore, the corresponding frequency-domain resource may be determined according to the index in the SCI.

2) For the frequency-domain resource for the first data channel, the first control information further includes first indication information, and the first indication information being used to indicate an allocation type of the frequency-domain resource for the first data channel.

In an implementation, the first indication information is represented through N bits in the first control information, N is an integer greater than or equal to 1, and different values of the N bits correspond to different allocation types of frequency-domain resources. For example, the first indication information is represented through one bit, when a value of the bit is 1, it is indicated that the allocation type of frequency-domain resource for the first data channel is type0; and when the value of the bit is 0, it is indicated that the allocation type of frequency-domain resource for the first data channel is type1. Type0 represents that the frequency-domain resource is discrete and type1 represents that the frequency-domain resource is continuous. In case that there are multiple allocation types of frequency-domain resources, the first indication information may be represented through multiple bits.

3) The time-domain resource information of the first data channel may be implemented through the following manners.

A first manner: the time-domain resource information of the first data channel includes time-domain starting position information and/or time-domain length information, the time-domain starting position information is determined through a first indication field in the first control information, and the time-domain length information is determined through a second indication field in the first control information.

Herein, if time-domain resources for the first data channel and time-domain resources for the first control channel are continuous or the time-domain resources for the first data channel and time-domain resources for the first control channel have a correspondence, a time-domain starting position of the first data channel may be determined based on a time-domain starting position of the first control channel, so that the time-domain starting position of the first data channel is not required to be determined through the first indication field in the first control information. If the time-domain resource for the first data channel and the time-domain resource for the first control channel are discontinuous, and the time-domain resources for the first data channel and the time-domain resources for the first control channel do not have the correspondence, the time-domain starting position of the first data channel is required to be determined through the first indication field in the first control information.

Herein, that the time-domain starting position information is determined through the first indication field in the first control information may be implemented through the following manners.

a) The first indication field includes time offset information, and the time offset information is used to determine a time offset of the time-domain resource for the first data channel relative to the time-domain resource for the first control channel.

Herein, a granularity of a time unit is one of: a time-domain symbol, a subframe, a slot, a short Transmission Time Interval (sTTI), or a fixed time length. A granularity of the time offset is one of: a time-domain symbol, a subframe, a slot, an sTTI, or a fixed time length. Not limited thereto, the granularity of the time unit or the time offset may also be another parameter representing a time length.

The time-domain resource for the first data channel may be determined through the time offset information and the time-domain resource for the first control channel. Herein, the time-domain resource includes the time-domain starting position and/or a time length (i.e., the number of time units that are occupied).

For example, referring to FIG. 7(a), the PSCCH and the PSSCH scheduled by it are not in the same subframe, first three symbols in each subframe are PSCCH resources, and other symbols are PSSCH resources. In such case, the SCI may carry a subframe offset of the PSSCH relative to the PSCCH, and thus a subframe position of the PSSCH may be determined according to a detected subframe where the PSCCH is located and a subframe offset carried therein. The first three symbols in the subframe of the PSSCH are candidate PSCCH resources, so that the PSSCH starts from the fourth symbol, and furthermore, a specific starting subframe and starting symbol position of the PSSCH may be determined. Optionally, if the starting position of the PSSCH in a subframe is unfixed, the time offset information further includes offset information or index information of a time-domain symbol for the PSSCH in the subframe. The time-domain starting position of the PSSCH may be determined in combination with the subframe offset carried in the PSCCH and the offset information or index information of the time-domain symbol in the subframe.

b) The first indication field includes time index information, and the time index information is used to determine the time-domain starting position of the first data channel.

For example, the time index information may be a subframe number in a radio frame or a subframe number in a radio frame period, etc., and the time-domain starting position of the first data channel may be directly determined through the time index information. For example, referring to FIG. 7(a), the PSCCH and the PSSCH scheduled by PSCCH are not in the same subframe, the first three symbols in each subframe are PSCCH resources, and the other symbols are PSSCH resources. In such case, the SCI may carry a subframe number for the PSSCH in a radio frame. The radio frame includes 10 subframes, so that a range of the subframe number is [0, 9]. If the subframe number carried in the SCI is 7, the SCI is configured to schedule the PSSCH in a subframe 7 in the radio frame. In the subframe 7, first three symbols are candidate PSCCH resources, so that the PSSCH starts from the fourth symbol, and furthermore, the specific starting subframe and starting symbol position of the PSSCH may be determined. Furthermore, considering a processing delay of the terminal, if the terminal receives the SCI in a subframe 6, the processing delay is 2 ms and the subframe number carried in the SCI is 7, the terminal successfully detects the SCI in a subframe 8 and may schedule the PSSCH in a subframe 7 in a next radio frame.

In an implementation, the first control information is used to schedule multiple first data channels, and the first indication field includes multiple pieces of time offset information or multiple pieces of time index information. Time-domain resources for the multiple first data channels may be determined through the multiple pieces of time offset information or the multiple pieces of time index information. For example, the first control information is used to schedule two first data channels, the first indication field includes two pieces of time offset information, the first time offset information is used to determine a time-domain resource for the first data channel 1, and the second time offset information is used to determine a time-domain resource for the first data channel 2. The time offset information is relative to the first control channel, or the time-domain starting position in the radio frame, or the time-domain starting position in the radio frame period.

For the time-domain resource for the first data channel, the time-domain resource for the first data channel occupies one time unit or multiple continuous time units. Herein, that the time-domain length information of the first data channel is determined through the second indication field in the first control information may be implemented through the following manner.

a) The second indication field is used to determine a number of time units occupied by the time-domain resource for the first data channel and/or a number of time-domain symbols occupied by the time-domain resource for the first data channel.

Herein, the granularity of the time unit is one of: a time-domain symbol, a subframe, a slot, an sTTI, or a fixed time length. Not limited thereto, the granularity of the time unit may also be another parameter representing a time length.

For example, in FIG. 5, a subframe includes 14 symbols, the PSCCH occupies the first four symbols of the subframe, the other symbols in the subframe may be configured for transmission of the PSSCH, and the PSSCH may occupy one or more subframes, so that the second indication field may indicate the number of the subframes occupied by the PSSCH, or the second indication field may indicate the number of the symbols occupied by the PSSCH. For example, if the time unit takes subframe as the granularity, the time-domain resource for the PSCCH and the time-domain resource for the corresponding PSSCH are continuous, the second indication field indicates that the PSSCH occupies two time units, and in such case, the PSSCH scheduled by the SCI occupies the subframe where the SCI is located and a next adjacent subframe.

In an implementation, when the time-domain resource for the first data channel occupies multiple continuous time units, the multiple time units include a first time unit and at least one second time unit. If the second time unit includes a control channel resource, the time-domain resource for the first data channel occupies the control channel resource in the second time unit. For example, when the PSSCH occupies multiple continuous time units, the PSSCH may occupy PSCCH resources of the other time units except the first time unit. As illustrated in FIG. 5, the PSSCH scheduled in a third subframe occupies two subframes, and the PSSCH may occupy a PSCCH resource of a fourth subframe.

In an implementation, the first control channel indicates a time unit where the first data channel is located, and the time-domain resource for the first data channel in the time unit may be determined by pre-configuration or by configuration by the network. For example, a resource pool for a data channel is pre-configured or configured by the network, and configuration information of the resource pool indicates that a time-domain resource for the data channel in each subframe is all time-domain symbols from a fifth time-domain symbol in the subframe. A subframe corresponding to the first data channel may be determined through the first control channel, and the time-domain resource for the first data channel in the subframe may be determined in combination with resource pool configuration information.

A second manner: the time-domain resource information of the first data channel includes the time-domain starting position information and/or the time-domain length information, and the time-domain starting position information and/or the time-domain length information are/is determined through a third indication field in the first control information.

Herein, that the time-domain starting position information and/or the time-domain length information are/is determined through the third indication field in the first control information may be implemented through the following manners.

a) The third indication field in the first control information includes a second parameter, and the second parameter is used to determine the time-domain starting position and time-domain length of the first data channel.

Herein, the second parameter may be calculated according to the time-domain starting position and time-domain length of the first data channel, different second parameters are calculated according to different time-domain starting positions and different time-domain lengths, and the corresponding time-domain starting position and time-domain length of the first data channel may be determined according to the second parameter.

b) The third indication field in the first control information includes a second bitmap, each bit in the second bitmap corresponds to a time unit, and whether the time unit corresponding to each bit is configured for transmission of the first data channel or not is determined through a value of the bit in the second bitmap. For any second bit in the second bitmap, if the value of the second bit is the first value, the time unit corresponding to the second bit is configured for transmission of the first data channel; and if the value of the second bit is the second value, the time unit corresponding to the second bit is not configured for transmission of the first data channel.

Herein, the granularity of the time unit is one of: a time-domain symbol, a subframe, a slot, an sTTI, or a fixed time length. Not limited thereto, the granularity of the time unit may also be another parameter representing a time length.

For example, when the value of a certain bit in the second bitmap is 1, it is indicated that the time-domain unit corresponding to the bit is configured for transmission of the PSSCH; and when the value of a certain bit in the second bitmap is 0, it is indicated that the time-domain unit corresponding to the bit is not configured for transmission of the PSSCH.

c) The third indication field in the first control information includes second index information, the second index information is used to determine a first time-domain resource corresponding to the second index information from second configuration information, and the second configuration information includes at least one correspondence between index information and a time-domain resource. The second configuration information is pre-configured or configured by the network. When the second configuration information is configured by the network, the network may transmit the second configuration information through the RRC signaling, or the broadcast information or the DL control signaling.

For example, the SCI includes an index in a table, and each index in the table corresponds to an allocated time-domain resource, for example, a time-domain resource determined through a length and a starting position of the time-domain resource, or a time-domain resource determined through one or more time unit indexes, or a time-domain resource determined through a bitmap or a time-domain resource determined in another manner. Therefore, the index in the SCI corresponds to one time-domain resource.

It should be understood that the abovementioned implementations may be used independently and may also be combined for use. For example, the first control information includes the first indication field and the third indication field, the first indication field includes the time index information configured to determine the subframe where the first data channel is located, the third indication field includes the second parameter, the second parameter is used to determine a starting position of time-domain symbols for the first data channel in the subframe and the number of the time-domain symbols that are occupied by the time-domain symbols, and the subframe position of the first data channel and information about the starting position of the time-domain symbols that are occupied in the subframe and the number of the time-domain symbols may be determined in combination with the first indication field and the third indication field.

In the solution of the embodiment of the disclosure, the number of PRBs available to the terminal on a transmission resource for the first data channel that is scheduled may be a multiple of 2, 3 and 5.

In the solution of the embodiment of the disclosure, a last time-domain symbol of a last time unit occupied by the first data channel is not configured for data transmission but as a Guard Period (GP).

Herein, for the condition that the first data channel occupies continuous time units, a last symbol of the last time unit is not configured for data transmission. For the condition that the first data channel occupies discontinuous time units, a last symbol of each time unit is not configured for data transmission.

In the solution of the embodiment of the disclosure, that transmission of the first data channel and the first control channel is time division may include the following three implementations.

a) Transmission of the first data channel and the first control channel is time division in a time unit, the first control channel occupying A time-domain symbols in the time unit, the first data channel occupying B time-domain symbols in the time unit and the time-domain resource for the first control channel and the time-domain resource for the first data channel not overlapping, $1 \le A < C$, $1 \le B < C$ and $A+B \le C$, where C is a number of time-domain symbols in one time unit, the granularity of the time unit being slot, subframe, sTTI or another fixed time length.

For example, as illustrated in FIG. 5($a$), a time unit includes C=14 time-domain symbols, the first data channel and the first control channel occupy the same time unit, the first control channel occupies first to second time-domain symbols of the time unit, and the first data channel occupies third to fourteenth time-domain symbols of the time unit. It is to be noted that, under the condition that the time-domain resource for the first data channel and the time-domain resource for the first control channel do not overlap, continuous time-domain symbols may be occupied and discontinuous time-domain symbols may also be occupied. For example, the first control channel occupies the first to second time-domain symbols of the time unit and the first data channel occupies the fifth to fourteenth time-domain symbols of the time unit.

b) Transmission of the first data channel is in the first time unit, and transmission of the first control channel is in the second time unit, the first control channel occupying A time-domain symbols in the first time unit and the first data channel occupying B time-domain symbols in the second time unit, $1 \le A \le C$ and $1 \le B \le C$, where C is a number of time-domain symbols in one time unit, the granularity of the time unit being slot, subframe, sTTI or another fixed time length.

For example, as illustrated in FIG. 7($a$), a time unit includes C=14 time-domain symbols, the first data channel and the first control channel occupy different time units, the first control channel occupies first to second time-domain symbols of the first time unit, and the first data channel occupies third to fourteenth time-domain symbols of the second time unit. It is to be noted that the first data channel and the first control channel occupies continuous time-domain symbols and may also occupy discontinuous time-domain symbols.

For another example, as illustrated in FIG. 5($b$), a time unit includes C=14 time-domain symbols, the first data channel and the first control channel occupy different time units, the first control channel occupies all time-domain symbols of the first time unit, and the first data channel occupies all time-domain symbols of the second time unit.

c) The transmission of the first data channel and the first control channel is partially time division. The transmission of the first data channel and the first control channel being partially time division includes that: the time-domain resource occupied by the first control channel at least partially overlaps the time-domain resource occupied by the first data channel.

For example, there is made such a hypothesis that: E represents a control channel, F represents a data channel, and time-domain resource for E and time-domain resource for F at least partially overlap. Furthermore, time-domain starting position of E and time-domain starting position of F may be the same, or the starting position of E is after F, or the starting position of E is before F.

Herein, there may be the following conditions for at least partial overlapping of the time-domain resource for E and the time-domain resource for F: 1) the time-domain resource for E is a subset of the time-domain resource for F; or, 2) the time-domain resource for E partially overlaps the time-domain resource for F, namely part of the time-domain resource for E does not overlap part of the time-domain resource for F, while the other part of the time-domain resource for E overlaps the other part of the time-domain resource for F.

For c), the first control channel occupies A time-domain symbols in one time unit, the first data channel occupies B time-domain symbols in the time unit, and the time-domain resource for the first control channel and the time-domain resource for the first data channel at least partially overlap, $1 \leq A \leq C$ and $1 \leq B \leq C$, where C is a number of time-domain symbols in one time unit.

In addition, the first control information in the embodiment of the disclosure further includes at least one of:
second indication information, the second indication information being used to determine transmission times of the first data channel;
redundancy version information of the first data channel;
codebook information for the first data channel;
transmission scheme information for the first data channel, for example, single-antenna-port transmission, transmission diversity and beamforming;
Demodulation Reference Signal (DMRS) pattern information for the first data channel;
power information of the first data channel;
information of a power difference between the first data channel and the first control channel;
a Carrier Indicator Field (CIF), the CIF being configured to determine carrier information for transmission of the first data channel;
BWP indication information, the BWP indication information being used to determine BWP information for transmission of the first data channel, wherein there may be a cross-BWP scheduling condition when a carrier supports configuration of multiple BWPs and thus the BWP indication information is used to indicate information about BWP(s) scheduled by the present SCI;
third indication information, the third indication information being used to determine a transmission resource for a feedback channel, for example, a time-domain resource and/or frequency-domain resource for the feedback channel, or a maximum delay of feedback information and the present PSSCH;
fourth indication information, the fourth indication information being used to determine a transmission mode for the first data channel;
fifth indication information, the fifth indication information being used to determine whether frequency-hopping transmission is adopted for the first data channel or not;
sixth indication information, the sixth indication information being used to indicate an MCS for the first data channel; and
seventh indication information, the seventh indication information being used to determine whether the time-domain resource for the first control channel and the time-domain resource for the first data channel overlap.

In an embodiment, the first control information may schedule multiple PSSCH transmissions, including a first transmission and retransmissions, and the SCI includes the second indication information configured to indicate the number of PSSCH transmissions scheduled by the SCI. Furthermore, the SCI may carry the redundancy version information configured to indicate a redundancy version of the presently scheduled PSSCH. Under the condition that multiple PSSCH transmissions are supported, a redundancy version number corresponding to each transmission may be predefined or configured by the network, so that the specific serial number of a present PSSCH transmission may be determined through the redundancy version information carried in the SCI, and the transmissions may be merged at a receiver. In another embodiment, the SCI may carry the specific serial number of the present transmission in the multiple transmissions.

In an embodiment, one of multiple candidate transmission schemes may be selected for transmission of the PSSCH, and the transmission scheme includes single-antenna-port transmission, transmission diversity, beamforming and another possible multi-antenna transmission scheme. The SCI may carry the transmission scheme information configured to indicate the transmission scheme adopted for the PSSCH scheduled by the SCI. Furthermore, transmission diversity may include Space Frequency Block Coding (SFBC), Space Time Block Coding (STBC), Cyclic Delay Diversity (CDD) and the like. Furthermore, the SCI may carry the codebook information under the transmission scheme.

In an embodiment, the PSSCH may support multiple DMRS patterns, and the SCI may carry indication information configured to indicate the DMRS pattern information for the PSSCH scheduled by the SCI, so that the receiver may adopt the corresponding DMRS pattern to demodulate the PSSCH.

In an embodiment, the SCI may carry the power information, and the power information is used to indicate transmitting power of the PSSCH scheduled by the SCI or a power difference between the PSSCH and the corresponding PSCCH.

In an embodiment, an SL supports multi-carrier transmission and also supports cross-carrier scheduling, namely the SCI sent in a first carrier schedules the PSSCH in a second carrier, and the SCI carries the carrier indication information configured to indicate the specific carrier where the PSSCH scheduled by the SCI is located.

In an embodiment, a carrier of the SL is divided into multiple BWPs, cross-BWP scheduling is supported, namely the SCI sent on a first BWP schedules the PSSCH on a second BWP, and the SCI carries the BWP indication information configured to indicate the specific BWP where the PSSCH scheduled by the SCI is located.

In an embodiment, the first terminal transmits the SCI and the PSSCH scheduled by the SCI, and the second terminal receives the PSSCH and is required to feed back information. How to determine the transmission resource for the feedback information is also a problem needing to be solved. The SCI may carry the third indication information, and the third indication information is used to determine the transmission resource for the feedback information. For example, the third indication information may be a piece of index information, the index information is used to determine the transmission resource for the feedback channel corresponding to the index information from third configuration information, and the third configuration information includes at least one correspondence between index information and a transmission resource for the feedback channel.

In an implementation, the first control information includes the fourth indication information, and the fourth indication information is used to determine the transmission mode for the first data channel. The transmission mode includes unicast transmission, multicast transmission and broadcast transmission. A receiver of unicast transmission is only one terminal, a receiver of multicast transmission is a group of terminals, and a receiver of broadcast transmission is all terminals. When a transmission resource for the first data channel is indicated through the first control information, a transmission mode corresponding to the transmission resource may be indicated at the same time. Specifically, the fourth indication information may be carried in one of the following manners.

a) The SCI includes an information field, and the information field explicitly indicates the transmission mode for the first data channel.
b) The fourth indication information is carried through a Radio Network Temporary Identity (RNTI): different RNTIs correspond to different transmission modes, the SCI carries RNTI information by explicitly or implicitly manner, and the corresponding transmission mode may be determined through the RNTI information carried in the SCI.
c) The fourth indication information is carried through different scrambling sequences: different scrambling sequences correspond to different transmission modes, the scrambling sequence being used to scramble the SCI, so that the corresponding transmission mode may be determined through the scrambling sequence scrambling the SCI.

In an implementation, the first control information includes the fifth indication information, and the fifth indication information is used to determine whether frequency-hopping transmission is adopted for the first data channel or not. When the first control information is used to schedule multiple first data channels and the fifth indication information indicates that a frequency-hopping manner is adopted, the multiple first data channels are transmitted in the frequency-hopping manner.

In an implementation, the first control information includes the sixth indication information, and the sixth indication information is used to indicate the MCS for the first data channel. When the first control information indicates the time-domain and/or frequency-domain resources for the first data channel, the MCS for the first data channel may be indicated at the same time.

In an implementation, the first control information includes the seventh indication information, and the seventh indication information is used to determine whether the time-domain resource for the first control channel and the time-domain resource for the first data channel overlap. Optionally, the seventh indication information is used to indicate a resource multiplexing manner for the first control channel and the first data channel. For example, in a first resource multiplexing manner, the first control channel and the first data channel do not overlap in a time domain. In a second resource multiplexing manner, the first control channel and the first data channel partially overlap in the time domain. In a third resource multiplexing manner, the first control channel and the first data channel completely overlap in the time domain.

According to the technical solution of the embodiment of the disclosure, the PSSCH is scheduled through the SCI in the PSCCH, so that time division transmission of the PSCCH and the PSSCH is implemented without increasing the detection complexity of a Rel-15 receiver and influencing a resource sensing and selecting process of a Rel-14 terminal.

Figure 8B:
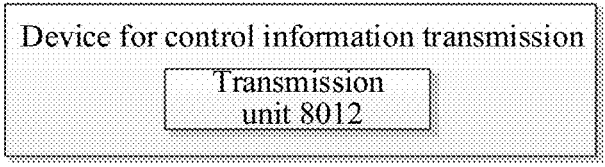
FIG. 8(b) is a second structure composition diagram of a device for control information transmission according to an embodiment of the disclosure.

FIG. 8(a) is a first structure composition diagram of a device for control information transmission according to an embodiment of the disclosure. The device for control information transmission is applied to a first terminal, and as illustrated in FIG. 8(a), includes a transmission unit 8011.

The transmission unit 8011 is configured to perform transmission of first control information between the first terminal and a second terminal, the first control information being carried in a first control channel and being used to schedule transmission of a first data channel, the first data channel being used for data transmission between the first terminal and the second terminal, and transmission of the first data channel and the first control channel being time division.

In the embodiment of the disclosure, the transmission unit 8011 is configured to receive the first control information sent by the second terminal or transmit the first control information to the second terminal.

In an implementation, a link between the first terminal and the second terminal is called an SL, the first control information transmitted between the first terminal and the second terminal is called SCI, and the SCI is configured to schedule transmission of a corresponding data channel (i.e., the first data channel). Herein, the first data channel is used for transmission of the data between the first terminal and the second terminal.

In an implementation, the first control channel is called a PSCCH, the first data channel is called a PSSCH, and transmission of the first data channel and the first control channel is time division, so that a delay may be reduced. Under the condition that transmission of the first data channel and the first control channel is time division, scheduling of transmission of the first data channel by the first control information may be implemented through the following SCI format.

In the embodiment of the disclosure, the first control information includes frequency-domain resource information of the first data channel and/or time-domain resource information of the first data channel.

1) The frequency-domain resource information of the first data channel may be implemented through the following manners.

A first manner: the first control information includes a first bitmap, the first bitmap is used to determine a frequency-domain resource for the first data channel, each bit in the first bitmap corresponds to a frequency-domain unit in a system, and whether the frequency-domain unit corresponding to each bit is configured for transmission of the first data channel or not is determined through a value of the bit in the first bitmap. For any first bit in the first bitmap, if the value of the first bit is a first value, the frequency-domain unit corresponding to the first bit is configured for transmission of the first data channel; and if the value of the first bit is a second value, the frequency-domain unit corresponding to the first bit is not configured for transmission of the first data channel.

Herein, a granularity of the frequency-domain unit is one of: PRB, RBG or sub-band. If the granularity of the frequency-domain unit is RBG or sub-band, an RBG or a sub-band includes K continuous PRBs.

For example, a system bandwidth is 20 MHz, there are totally 100 PRBs, the granularity of the frequency-domain unit is sub-band, and each sub-band includes 5 PRBs. In such case, the first bitmap includes 20 bits corresponding to the 20 sub-bands respectively. When the value of a certain bit in the first bitmap is 1, it is indicated that the sub-band corresponding to the bit is configured for transmission of the PSSCH. When the value of a certain bit in the first bitmap is 0, it is indicated that the sub-band corresponding to the bit is not configured for transmission of the PSSCH. The sub-bands for transmission of the PSSCH may be continuous in a frequency domain or discontinuous in the frequency domain.

A second manner: the first control information includes a first parameter, and the first parameter is used to determine a starting position of the frequency-domain resource for the first data channel and/or a length of the frequency-domain resource for the first data channel. The frequency-domain resource is continuously allocated.

In an implementation, when frequency-domain starting positions of the first control channel is the same as a frequency-domain starting position of the first data channel or there has a one-to-one correspondence between a frequency-domain starting position of the first control channel and a frequency-domain starting position of the first data channel, the first parameter is used to determine the length of the frequency-domain resource corresponding to the first data channel. In another implementation, when frequency-domain ending position of the first control channel is the same as a frequency-domain ending position of the first data channel, the first parameter is used to determine the length of the frequency-domain resource corresponding to the first data channel. For example, when a frequency-domain starting position of the PSCCH carrying SCI is the same as a frequency-domain starting position of PSSCH corresponding to the PSCCH, the frequency-domain starting position of the PSSCH may be determined based on the frequency-domain starting position of the PSCCH, and a length of a frequency-domain resource for the PSSCH is represented through the first parameter.

In an implementation, when the first control information is used to schedule transmission of multiple data channels, the multiple data channels at least include the first data channel and a second data channel, and the first parameter is used to determine lengths of frequency-domain resources corresponding to the multiple data channels and a starting position of the frequency-domain resource corresponding to the second data channel. For example, when the SCI schedules two transmissions of the PSSCH (one is initial transmission and the other is retransmission), the first parameter indicates the length of the frequency-domain resource for the PSSCH and a starting position of the other transmission of the PSSCH. For SCI corresponding to the first transmission of the PSSCH, the first parameter indicates a frequency-domain length of the PSSCH and a frequency-domain starting position of the second transmission of the PSSCH. For SCI corresponding to the second transmission of the PSSCH, the first parameter indicates the frequency-domain length of the PSSCH and a frequency-domain starting position of the first transmission of the PSSCH. For another example, when the SCI schedules four transmissions of the PSSCH (one is initial transmission and the other three are retransmissions), the first parameter includes frequency-domain starting positions of the four transmissions and lengths of frequency-domain resources of the four transmissions. If the lengths of the frequency-domain resources for the four transmissions are the same, the first parameter is only required to indicate the length of one frequency-domain resource, otherwise is required to indicate the lengths of the frequency-domain resources for the four transmissions respectively. If the starting position of the frequency-domain resource for the PSSCH may be determined through the position of the frequency-domain resource for the PSCCH carrying the SCI (for example, frequency-domain starting position of the PSSCH for the four transmissions are the same and the frequency-domain starting position of the PSSCH for the first transmission forms a one-to-one correspondence with the frequency-domain starting position of the corresponding PSCCH), the first parameter may not include the frequency-domain starting positions for the four transmissions. If the frequency-domain starting positions for the four transmissions are the same or a frequency-hopping manner is adopted for the four transmissions (namely the frequency-domain starting positions of the subsequent three transmissions may be determined through the frequency-domain starting position of the first transmission and a frequency-hopping criterion), the first parameter may include only one frequency-domain starting position.

In an embodiment, the first parameter is determined by the starting position and length of the frequency-domain resource for the first data channel. For example, the first parameter is an RIV, and the value corresponds to an index (n_PRB_start) of a starting PRB of the frequency-domain resource for the PSSCH and the number (L_PRB) of continuously allocated PRBs. The RIV is determined through the following formula.

If $(L\_PRB-1) \leq \lfloor (L\_PRB)/2 \rfloor$, $RIV = N\_PRB(L\_PRB-1) + n\_PRB\_start$ otherwise $RIV = N\_PRB(N\_PRB-L\_PRB+1) + (N\_PRB-1-n\_PRB\_start)$ N_PRB represents the total number of PRBs in a resource pool. In the embodiment, N_PRB may also represent the total number of PRBs in a BWP or the total number of PRBs in a carrier, and no limits are made thereto in the embodiment. In the embodiment, the granularity of the frequency-domain resource may also be RBG or sub-band, and no limits are made thereto in the embodiment.

A third manner: the first control information includes first index information, the first index information is used to determine a first frequency-domain resource corresponding to the first index information in first configuration information, and the first configuration information includes at least one correspondence between index information and a frequency-domain resource. The first configuration information is pre-configured or configured by a network. When the first configuration information is configured by the network, the network may transmit the first configuration information through Radio Resource Control (RRC) signaling, or broadcast information or DL control signaling.

For example, the SCI includes an index in a table, and each index in the table corresponds to an allocated frequency-domain resource, for example, a frequency-domain resource determined through a length and a starting position, or a frequency-domain resource determined through one or more frequency-domain unit indexes, or a frequency-domain resource determined through a bitmap or a frequency-domain resource determined in another manner. Therefore, the corresponding frequency-domain resource may be determined according to the index in the SCI.

2) For the frequency-domain resource for the first data channel, the first control information further includes first indication information, and the first indication information being used to indicate an allocation type of the frequency-domain resource for the first data channel.

In an implementation, the first indication information is represented through N bits in the first control information, N is an integer greater than or equal to 1, and different values of the N bits correspond to different allocation types of frequency-domain resources. For example, the first indication information is represented through one bit, when a value of the bit is 1, it is indicated that the allocation type of frequency-domain resource for the first data channel is type0; and when the value of the bit is 0, it is indicated that the allocation type of frequency-domain resource for the first data channel is type1. Type0 represents that the frequency-domain resource is discrete and type1 represents that the frequency-domain resource is continuous. In case that there are multiple allocation types of frequency-domain resources, the first indication information may be represented through multiple bits.

3) The time-domain resource information of the first data channel may be implemented through the following manners.

A first manner: the time-domain resource information of the first data channel includes time-domain starting position information and/or time-domain length information, the time-domain starting position information is determined through a first indication field in the first control information, and the time-domain length information is determined through a second indication field in the first control information.

Herein, if time-domain resource for the first data channel and time-domain resource for the first control channel are continuous or the time-domain resources for the first data channel and time-domain resources for the first control channel have a correspondence, a time-domain starting position of the first data channel may be determined based on a time-domain starting position of the first control channel, so that the time-domain starting position of the first data channel is not required to be determined through the first indication field in the first control information. If the time-domain resource for the first data channel and time-domain resource for the first control channel are discontinuous, and the time-domain resources for the first data channel and the time-domain resources for the first control channel do not have the correspondence, the time-domain starting position of the first data channel is required to be determined through the first indication field in the first control information.

Herein, that the time-domain starting position information is determined through the first indication field in the first control information may be implemented through the following manners.

a) The first indication field includes time offset information, and the time offset information is used to determine a time offset of the time-domain resource for the first data channel relative to the time-domain resource for the first control channel.

Herein, a granularity of a time unit is one of: a time-domain symbol, a subframe, a slot, an sTTI, or a fixed time length. A granularity of the time offset is one of: a time-domain symbol, a subframe, a slot, an sTTI, or a fixed time length. Not limited thereto, the granularity of the time unit or the time offset may also be another parameter representing a time length.

The time-domain resource for the first data channel may be determined through the time offset information and the time-domain resource for the first control channel. Herein, the time-domain resource includes the time-domain starting position and/or a time length (i.e., the number of time units that are occupied).

For example, referring to FIG. 7(a), the PSCCH and the PSSCH scheduled by it are not in the same subframe, first three symbols in each subframe are PSCCH resources, and other symbols are PSSCH resources. In such case, the SCI may carry a subframe offset of the PSSCH relative to the PSCCH, and thus a subframe position of the PSSCH may be determined according to a detected subframe where the PSCCH is located and a subframe offset carried therein. The first three symbols in the subframe of the PSSCH are candidate PSCCH resources, so that the PSSCH starts from the fourth symbol, and furthermore, a specific starting subframe and starting symbol position of the PSSCH may be determined. Optionally, if the starting position of the PSSCH in a subframe is unfixed, the time offset information further includes offset information or index information of a time-domain symbol for the PSSCH in the subframe. The time-domain starting position of the PSSCH may be determined in combination with the subframe offset carried the PSCCH and the offset information or index information of the time-domain symbol in the subframe.

b) The first indication field includes time index information, and the time index information is used to determine the time-domain starting position of the first data channel.

For example, the time index information may be a subframe number in a radio frame or a subframe number in a radio frame period, etc., and the time-domain starting position of the first data channel may be directly determined through the time index information. For example, referring to FIG. 7(a), the PSCCH and the PSSCH scheduled by PSCCH are not in the same subframe, the first three symbols in each subframe are PSCCH resources, and the other symbols are PSSCH resources. In such case, the SCI may carry a subframe number for the PSSCH in a radio frame. The radio frame includes 10 subframes, so that a range of the subframe number is [0, 9]. If the subframe number carried in the SCI is 7, the SCI is configured to schedule the PSSCH in a subframe 7 in the radio frame. In the subframe 7, first three symbols are candidate PSCCH resources, so that the PSSCH starts from the fourth symbol, and furthermore, the specific starting subframe and starting symbol position of the PSSCH may be determined. Furthermore, considering a processing delay of the terminal, if the terminal receives the SCI in a subframe 6, the processing delay is 2 ms and the subframe number carried in the SCI is 7, the terminal successfully detects the SCI in a subframe 8 and may schedule the PSSCH in a subframe 7 in a next radio frame.

In an implementation, the first control information is used to schedule multiple first data channels, and the first indication field includes multiple pieces of time offset information or multiple pieces of time index information. Time-domain resources for the multiple first data channels may be determined through the multiple pieces of time offset information or the multiple pieces of time index information. For example, the first control information is used to schedule two first data channels, the first indication field includes two pieces of time offset information, the first time offset information is used to determine a time-domain resource for the first data channel 1, and the second time offset information is used to determine a time-domain resource for the first data channel 2. The time offset information is relative to the first control channel, or the time-domain starting position in the radio frame, or the time-domain starting position in the radio frame period.

For the time-domain resource for the first data channel, the time-domain resource for the first data channel occupies one time unit or multiple continuous time units. Herein, that the time-domain length information of the first data channel is determined through the second indication field in the first control information may be implemented through the following manner.

a) The second indication field is used to determine a number of time units occupied by the time-domain resource for the first data channel and/or a number of time-domain symbols occupied by the time-domain resource for the first data channel.

Herein, the granularity of the time unit is one of: a time-domain symbol, a subframe, a slot, an sTTI, or a fixed time length. Not limited thereto, the granularity of the time unit may also be another parameter representing a time length.

For example, in FIG. 5, a subframe includes 14 symbols, the PSCCH occupies the first four symbols of the subframe, the other symbols in the subframe may be configured for transmission of the PSSCH, and the PSSCH may occupy one or more subframes, so that the second indication field may indicate the number of the subframes occupied by the PSSCH, or the second indication field may indicate the number of the symbols occupied by the PSSCH. For example, if the time unit takes subframe as the granularity, the time-domain resource for the PSCCH and the time-domain resource for the corresponding PSSCH are continuous, the second indication field indicates that the PSSCH occupies two time units, and in such case, the PSSCH scheduled by the SCI occupies the subframe where the SCI is located and a next adjacent subframe.

In an implementation, when the time-domain resource for the first data channel occupies multiple continuous time units, the multiple time units include a first time unit and at least one second time unit. If the second time unit includes a control channel resource, the time-domain resource for the first data channel occupies the control channel resource in the second time unit. For example, when the PSSCH occupies multiple continuous time units, the PSSCH may occupy PSCCH resources of the other time units except the first time unit. As illustrated in FIG. 5, the PSSCH scheduled in a third subframe occupies two subframes, and the PSSCH may occupy a PSCCH resource of a fourth subframe.

In an implementation, the first control channel indicates a time unit where the first data channel is located, and the time-domain resource for the first data channel in the time unit may be determined by pre-configuration or by configuration by the network. For example, a resource pool for a data channel is pre-configured or configured by the network, and configuration information of the resource pool indicates that a time-domain resource for the data channel in each subframe is all time-domain symbols from a fifth time-domain symbol in the subframe. A subframe corresponding to the first data channel may be determined through the first control channel, and the time-domain resource for the first data channel in the subframe may be determined in combination with resource pool configuration information.

A second manner: the time-domain resource information of the first data channel includes the time-domain starting position information and/or the time-domain length information, and the time-domain starting position information and/or the time-domain length information are/is determined through a third indication field in the first control information.

Herein, that the time-domain starting position information and/or the time-domain length information are/is determined through the third indication field in the first control information may be implemented through the following manners.

a) The third indication field in the first control information includes a second parameter, and the second parameter is used to determine the time-domain starting position and time-domain length of the first data channel.

Herein, the second parameter may be calculated according to the time-domain starting position and time-domain length of the first data channel, different second parameters are calculated according to different time-domain starting positions and time-different domain lengths, and the corresponding time-domain starting position and time-domain length of the first data channel may be determined according to the second parameter.

b) The third indication field in the first control information includes a second bitmap, each bit in the second bitmap corresponds to a time unit, and whether the time unit corresponding to each bit is configured for transmission of the first data channel or not is determined through a value of the bit in the second bitmap. For any second bit in the second bitmap, if the value of the second bit is the first value, the time unit corresponding to the second bit is configured for transmission of the first data channel; and if the value of the second bit is the second value, the time unit corresponding to the second bit is not configured for transmission of the first data channel.

Herein, the granularity of the time unit is one of: a time-domain symbol, a subframe, a slot, an sTTI, or a fixed time length. Not limited thereto, the granularity of the time unit may also be another parameter representing a time length.

For example, when the value of a certain bit in the second bitmap is 1, it is indicated that the time-domain unit corresponding to the bit is configured for transmission of the PSSCH; and when the value of a certain bit in the second bitmap is 0, it is indicated that the time-domain unit corresponding to the bit is not configured for transmission of the PSSCH.

c) The third indication field in the first control information includes second index information, the second index information is used to determine a first time-domain resource corresponding to the second index information from second configuration information, and the second configuration information includes at least one correspondence between index information and a time-domain resource. The second configuration information is pre-configured or configured by the network. When the second configuration information is configured by the network, the network may transmit the second configuration information through the RRC signaling, or the broadcast information or the DL control signaling.

For example, the SCI includes an index in a table, and each index in the table corresponds to an allocated time-domain resource, for example, a time-domain resource determined through a length and a starting position of the time-domain resource, or a time-domain resource determined through one or more time unit indexes, or a time-domain resource determined through a bitmap or a time-domain resource determined in another manner. Therefore, the index in the SCI corresponds to one time-domain resource.

It should be understood that the abovementioned implementations may be used independently and may also be combined for use. For example, the first control information includes the first indication field and the third indication field, the first indication field includes the time index information configured to determine the subframe where the first data channel is located, the third indication field includes the second parameter, the second parameter is used to determine a starting position of time-domain symbols for the first data channel in the subframe and the number of the time-domain symbols that are occupied by the time-domain symbols, and the subframe position of the first data channel and information about the starting position of the time-domain symbols that are occupied in the subframe and the number of the time-domain symbols may be determined in combination with the first indication field and the third indication field.

In the solution of the embodiment of the disclosure, a last time-domain symbol of a last time unit occupied by the first data channel is not configured for data transmission but as a GP.

Herein, for the condition that the first data channel occupies continuous time units, a last symbol of the last time unit is not configured for data transmission. For the condition that the first data channel occupies discontinuous time units, a last symbol of each time unit is not configured for data transmission.

In the solution of the embodiment of the disclosure, that transmission of the first data channel and the first control channel is time division may include the following three implementations.

a) Transmission of the first data channel and the first control channel is time division in a time unit, the first control channel occupying A time-domain symbols in the time unit, the first data channel occupying B time-domain symbols in the time unit and the time-domain resource for the first control channel and the time-domain resource for the first data channel not overlapping, 1≤A<C, 1≤B<C and A+B≤C, where C is a number of time-domain symbols in one time unit, the granularity of the time unit being slot, subframe, sTTI or another fixed time length.

For example, as illustrated in FIG. 5(a), a time unit includes C=14 time-domain symbols, the first data channel and the first control channel occupy the same time unit, the first control channel occupies first to second time-domain symbols of the time unit, and the first data channel occupies third to fourteenth time-domain symbols of the time unit. It is to be noted that, under the condition that the time-domain resource for the first data channel and the time-domain resource for the first control channel do not overlap, continuous time-domain symbols may be occupied and discontinuous time-domain symbols may also be occupied. For example, the first control channel occupies the first to second time-domain symbols of the time unit and the first data channel occupies the fifth to fourteenth time-domain symbols of the time unit.

b) Transmission of the first data channel is in the first time unit, and transmission of the first control channel is in the second time unit, the first control channel occupying A time-domain symbols in the first time unit and the first data channel occupying B time-domain symbols in the second time unit, 1≤A≤C and 1≤B≤C, where C is a number of time-domain symbols in one time unit, the granularity of the time unit being slot, subframe, sTTI or another fixed time length.

For example, as illustrated in FIG. 7(a), a time unit includes C=14 time-domain symbols, the first data channel and the first control channel occupy different time units, the first control channel occupies first to second time-domain symbols of the first time unit, and the first data channel occupies third to fourteenth time-domain symbols of the second time unit. It is to be noted that the first data channel and the first control channel occupies continuous time-domain symbols and may also occupy discontinuous time-domain symbols.

For another example, as illustrated in FIG. 5(b), a time unit includes C=14 time-domain symbols, the first data channel and the first control channel occupy different time units, the first control channel occupies all time-domain symbols of the first time unit, and the first data channel occupies all time-domain symbols of the second time unit.

c) The transmission of the first data channel and the first control channel is partially time division. The transmission of the first data channel and the first control channel being partially time division includes that: the time-domain resource occupied by the first control channel at least partially overlaps the time-domain resource occupied by the first data channel.

For example, there is made such a hypothesis that: E represents a control channel, F represents a data channel and time-domain resource for E and time-domain resource for F at least partially overlap. Furthermore, time-domain starting position of E and time-domain starting position of F may be the same, or the starting position of E is after F, or the starting position of E is before F.

Herein, there may be the following conditions for at least partial overlapping of the time-domain resource for E and the time-domain resource for F: 1) the time-domain resource for E is a subset of the time-domain resource for F; or, 2) the time-domain resource for E partially overlaps the time-domain resource for F, namely part of the time-domain resource for E do not overlap part of the time-domain resource for F while the other part of the time-domain resource for E overlaps other part of the time-domain resource for F.

For c), the first control channel occupies A time-domain symbols in one time unit, the first data channel occupies B time-domain symbols in the time unit, and the time-domain resource for the first control channel and the time-domain resource for the first data channel at least partially overlap, 1≤A≤C and 1≤B≤C, where C is a number of time-domain symbols in one time unit.

In addition, the first control information in the embodiment of the disclosure further includes at least one of:
second indication information, the second indication information being used to determine transmission times of the first data channel;
redundancy version information of the first data channel;
codebook information for the first data channel;
transmission scheme information for the first data channel, for example, single-antenna-port transmission, transmission diversity and beamforming;
DMRS pattern information for the first data channel;
power information of the first data channel;
information of a power difference between the first data channel and the first control channel;
a CIF, the CIF being configured to determine carrier information for transmission of the first data channel;
BWP indication information, the BWP indication information being used to determine BWP information for transmission of the first data channel, wherein there may be a cross-BWP scheduling condition when a carrier supports configuration of multiple BWPs and thus the BWP indication information is used to indicate information about BWP(s) scheduled by the present SCI;
third indication information, the third indication information being used to determine a transmission resource for a feedback channel, for example, a time-domain resource and/or frequency-domain resource for the feedback channel, or a maximum delay of feedback information and the present PSSCH;

fourth indication information, the fourth indication information being used to determine a transmission mode for the first data channel;

fifth indication information, the fifth indication information being used to determine whether frequency-hopping transmission is adopted for the first data channel or not;

sixth indication information, the sixth indication information being used to indicate an MCS for the first data channel; and seventh indication information, the seventh indication information being used to determine whether the time-domain resource for the first control channel and the time-domain resource for the first data channel overlap.

In an embodiment, the first control information may schedule multiple PSSCH transmissions, including a first transmission and retransmissions, and the SCI includes the second indication information configured to indicate the number of PSSCH transmissions scheduled by the SCI. Furthermore, the SCI may carry the redundancy version information configured to indicate a redundancy version of the presently scheduled PSSCH. Under the condition that multiple PSSCH transmissions are supported, a redundancy version number corresponding to each transmission may be predefined or configured by the network, so that the specific serial number of a present PSSCH transmission may be determined through the redundancy version information carried in the SCI, and the transmissions may be merged at a receiver. In another embodiment, the SCI may carry the specific serial number of the present transmission in the multiple transmissions.

In an embodiment, one of multiple candidate transmission schemes may be selected for transmission of the PSSCH, and the transmission scheme includes single-antenna-port transmission, transmission diversity, beamforming and another possible multi-antenna transmission scheme. The SCI may carry the transmission scheme information, configured to indicate the transmission scheme adopted for the PSSCH scheduled by the SCI. Furthermore, transmission diversity may include SFBC, STBC, CDD and the like. Furthermore, the SCI may carry the codebook information under the transmission scheme.

In an embodiment, the PSSCH may support multiple DMRS patterns, and the SCI may carry indication information configured to indicate the DMRS pattern information for the PSSCH scheduled by the SCI, so that the receiver may adopt the corresponding DMRS pattern to demodulate the PSSCH.

In an embodiment, the SCI may carry the power information, and the power information is used to indicate transmitting power of the PSSCH scheduled by the SCI or a power difference between the PSSCH and the corresponding PSCCH.

In an embodiment, an SL supports multi-carrier transmission and also supports cross-carrier scheduling, namely the SCI sent in a first carrier schedules the PSSCH in a second carrier, and the SCI carries the carrier indication information, configured to indicate the specific carrier where the PSSCH scheduled by the SCI is located.

In an embodiment, a carrier of the SL is divided into multiple BWPs, cross-BWP scheduling is supported, namely the SCI sent on a first BWP schedules the PSSCH on a second BWP, and the SCI carries the BWP indication information, configured to indicate the specific BWP where the PSSCH scheduled by the SCI is located.

In an embodiment, the first terminal transmits the SCI and the PSSCH scheduled by the SCI, and the second terminal receives the PSSCH and is required to feed back information. How to determine the transmission resource for the feedback information is also a problem needing to be solved. The SCI may carry the third indication information, and the third indication information is used to determine the transmission resource for the feedback information. For example, the third indication information may be a piece of index information, the index information is used to determine the transmission resource for the feedback channel corresponding to the index information from third configuration information, and the third configuration information includes at least one correspondence between index information and a transmission resource for the feedback channel.

In an implementation, the first control information includes the fourth indication information, and the fourth indication information is used to determine the transmission mode for the first data channel. The transmission mode includes unicast transmission, multicast transmission and broadcast transmission. A receiver of unicast transmission is only one terminal, a receiver of multicast transmission is a group of terminals, and a receiver of broadcast transmission is all terminals. When a transmission resource for the first data channel is indicated through the first control information, a transmission mode corresponding to the transmission resource may be indicated at the same time. Specifically, the fourth indication information may be carried in one of the following manners.

a) The SCI includes an information field, and the information field explicitly indicates the transmission mode for the first data channel.

b) The fourth indication information is carried through an RNTI: different RNTIs correspond to different transmission modes, the SCI carries RNTI information by explicitly or implicitly manner, and the corresponding transmission mode may be determined through the RNTI information carried in the SCI.

c) The fourth indication information is carried through different scrambling sequences: different scrambling sequences correspond to different transmission modes, the scrambling sequence being used to scramble the SCI, so that the corresponding transmission mode may be determined through the scrambling sequence scrambling the SCI.

In an implementation, the first control information includes the fifth indication information, and the fifth indication information is used to determine whether frequency-hopping transmission is adopted for the first data channel or not. When the first control information is used to schedule multiple first data channels and the fifth indication information indicates that a frequency-hopping manner is adopted, the multiple first data channels are transmitted in the frequency-hopping manner.

In an implementation, the first control information includes the sixth indication information, and the sixth indication information is used to indicate the MCS for the first data channel. When the first control information indicates the time-domain and/or frequency-domain resources for the first data channel, the MCS for the first data channel may be indicated at the same time.

In an implementation, the first control information includes the seventh indication information, and the seventh indication information is used to determine whether the time-domain resource for the first control channel and the time-domain resource for the first data channel overlap. Optionally, the seventh indication information is used to indicate a resource multiplexing manner for the first control channel and the first data channel. For example, in a first resource multiplexing manner, the first control channel and the first data channel do not overlap in a time domain. In a second resource multiplexing manner, the first control channel and the first data channel partially overlap in the time domain. In a third resource multiplexing manner, the first control channel and the first data channel completely overlap in the time domain.

It should be understood by those skilled in the art that the related descriptions about the device for control information transmission of the embodiments of the disclosure may be understood with reference to the related descriptions about the method for control information transmission of the embodiments of the disclosure.

FIG. 6(b) is a second flowchart of a method for control information transmission according to an embodiment of the disclosure. As illustrated in FIG. 6(b), the method for control information transmission includes the following step.

In 6012, a first terminal performs transmission of first control information between the first terminal and a second device, the first control information being carried in a second control channel, the first control information being used to schedule transmission of a first control channel and/or a first data channel, the first control channel being used for transmission of SCI, the first data channel being used for transmission of SL data, and transmission of the first data channel and the first control channel is time division.

In the embodiment of the disclosure, the operation that the first terminal performs transmission of first control information between the first terminal and a second device may include the following two implementations: 1) the first device is a first terminal, the second device is a base station, and the first terminal receives the first control information sent by the base station; or, 2) the first device is the base station, the second device is the first terminal, and the base station transmits the first control information to the first terminal.

In an implementation, a link between the first terminal and the second terminal is called an SL, the first control information transmitted between the first terminal and the second terminal is called SCI, and the SCI is configured to schedule transmission of a corresponding data channel (i.e., the first data channel). Herein, the first data channel is used for data transmission between the first terminal and the second terminal.

In an implementation, a frequency-domain resource and/or time-domain resource for the first data channel may be scheduled (namely explicitly indicated) through the second control channel, and a frequency-domain resource and/or time-domain resource for the first control channel may be scheduled (namely explicitly indicated) through the second control channel.

In an implementation, the time-domain resource for the first data channel may be determined based on the time-domain resource for the first control channel or the time-domain resource for the second control channel, and/or, the frequency-domain resource for the first data channel may be determined based on the frequency-domain resource for the first control channel and is not required to be explicitly indicated.

In an implementation, the time-domain resource for the first control channel may be determined based on the time-domain resource for the second control channel or the time-domain resource for the first data channel, and/or, the frequency-domain resource for the first control channel may be determined based on the frequency-domain resource for the first data channel and is not required to be explicitly indicated.

In an implementation, the first control information is carried in the second control channel. Herein, the second control channel is configured to transmit Downlink Control Information (DCI). The first control channel is configured to transmit the SCI, and is called a PSCCH. The first data channel is configured to transmit SL data, and is called a PSSCH. Transmission of the first data channel and the first control channel is time division, so that a delay may be reduced.

In the solution of the embodiment of the disclosure, that transmission of the first data channel and the first control channel being time division may include the following three implementations.

1) Transmission of the first data channel and the first control channel is time division in a time unit, the first control channel occupying A time-domain symbols in the time unit, the first data channel occupying B time-domain symbols in the time unit and the time-domain resource for the first control channel and the time-domain resource for the first data channel not overlapping, $1 \leq A < C$, $1 \leq B < C$ and $A+B \leq C$, where C is a number of time-domain symbols in one time unit, a granularity of the time unit being slot, subframe, sTTI or another fixed time length.

For example, as illustrated in FIG. 5(a), a time unit includes C=14 time-domain symbols, the first data channel and the first control channel occupy the same time unit, the first control channel occupies the first to second time-domain symbols of the time unit, and the first data channel occupies the third to fourteenth time-domain symbols of the time unit. It is to be noted that, under the condition that the time-domain resource for the first data channel and the time-domain resource for the first control channel do not overlap, continuous time-domain symbols may be occupied and discontinuous time-domain symbols may also be occupied. For example, the first control channel occupies the first to second time-domain symbols of the time unit and the first data channel occupies the fifth to fourteenth time-domain symbols of the time unit.

2) Transmission of the first data channel is in a first time unit, and transmission of the first control channel is in a second time unit, the first control channel occupying A time-domain symbols in the first time unit and the first data channel occupying B time-domain symbols in the second time unit, $1 \leq A \leq C$ and $1 \leq B \leq C$, where C is a number of time-domain symbols in one time unit, the granularity of the time unit being slot, subframe, sTTI or another fixed time length.

For example, as illustrated in FIG. 7(a), a time unit includes C=14 time-domain symbols, the first data channel and the first control channel occupy different time units, the first control channel occupies first to second time-domain symbols of the first time unit, and the first data channel occupies third to fourteenth time-domain symbols of the second time unit. It is to be noted that the first data channel and the first control channel occupies continuous time-domain symbols and may also occupy discontinuous time-domain symbols.

For another example, as illustrated in FIG. 5(b), a time unit includes C=14 time-domain symbols, the first data channel and the first control channel occupy different time units, the first control channel occupies all time-domain symbols of the first time unit, and the first data channel occupies all time-domain symbols of the second time unit.

3) The transmission of the first data channel and the first control channel is partially time division. The transmission of the first data channel and the first control channel being partially time division includes that: the time-domain resource occupied by the first control channel at least partially overlaps the time-domain resource occupied by the first data channel.

For example, there is made such a hypothesis that E represents a control channel, F represents a data channel, and time-domain resource for E and time-domain resource for F at least partially overlap. Furthermore, time-domain starting position of E and time-domain starting position of F may be the same, or the starting position of E is after F, or the starting position of E is before F.

Herein, there may be the following conditions for at least partial overlapping of the time-domain resource for E and the time-domain resource for F: 1) the time-domain resource for E is a subset of the time-domain resource for F; or, 2) the time-domain resource for E partially overlaps the time-domain resource for F, namely part of the time-domain resource for E does not overlap part of the time-domain resource for F while the other part of the time-domain resource for E overlaps the other part of the time-domain resource for F.

For c), the first control channel occupies A time-domain symbols in one time unit, the first data channel occupies B time-domain symbols in the time unit, and the time-domain resource for the first control channel and the time-domain resource for the first data channel at least partially overlap, $1 \leq A \leq C$ and $1 \leq B \leq C$, where C is a number of time-domain symbols in one time unit.

Under the condition that transmission of the first data channel and the first control channel is time division, scheduling of transmission of the first control channel and/or the first data channel by the first control information may be implemented through the following DCI format.

In the embodiment of the disclosure, the first control information includes frequency-domain resource information of the first control channel and/or time-domain resource information of the first control channel and/or frequency-domain resource information of the first data channel and/or time-domain resource information of the first data channel.

1) The frequency-domain resource information of the first control channel may be implemented through the following manners.

A first manner: the first control information includes a first bitmap, the first bitmap is used to determine the frequency-domain resource for the first control channel, each bit in the first bitmap corresponds to a frequency-domain unit in a system, and whether the frequency-domain unit corresponding to each bit is configured for transmission of the first control channel or not is determined through a value of the bit in the first bitmap. For any first bit in the first bitmap, if the value of the first bit is a first value, the frequency-domain unit corresponding to the first bit is configured for transmission of the first control channel; and if the value of the first bit is a second value, the frequency-domain unit corresponding to the first bit is not configured for transmission of the first control channel.

Herein, a granularity of the frequency-domain unit is one of: PRB, RBG or sub-band. If the granularity of the frequency-domain unit is RBG or sub-band, an RBG or a sub-band includes K continuous PRBs.

For example, a system bandwidth is 20 MHz, there are totally 100 PRBs, the granularity of the frequency-domain unit is sub-band, and sub-band includes 10 PRBs. In such case, the first bitmap includes 10 bits corresponding to the 10 sub-bands respectively. When the value of a certain bit in the first bitmap is 1, it is indicated that the sub-band corresponding to the bit is configured for transmission of the PSCCH. When the value of a certain bit in the first bitmap is 0, it is indicated that the sub-band corresponding to the bit is not configured for transmission of the PSCCH.

A second manner: the first control information includes a first parameter, and the first parameter is used to determine a starting position of the frequency-domain resource for the first control channel and/or a length of the frequency-domain resource for the first control channel. The frequency-domain resource is continuously allocated.

For example, the first parameter is an MV, and the MV corresponds to an index of a starting PRB of the frequency-domain resource for the PSCCH and the number of continuously allocated PRBs. A frequency-domain starting position and frequency-domain length of the PSCCH may be determined through the MV.

In an implementation, the length of the frequency-domain resource occupied by the PSCCH is pre-configured or configured by a network, and in such case, the first parameter is used to indicate the frequency-domain starting position of the PSCCH. Specifically, the first parameter may be a frequency-domain offset, the frequency-domain offset is used to indicate a frequency-domain offset of the frequency-domain starting position of the PSCCH relative to a frequency-domain position. The frequency-domain position may be a lowest or highest PRB position, or a starting position of a carrier or a BWP, or a starting position of a resource pool, or a frequency-domain starting position of an SL synchronization signal, or a frequency-domain starting position of an SL broadcast channel or another determined frequency-domain position. Optionally, the first parameter may be an index value of a frequency-domain unit, and the starting position of the frequency-domain resource may be determined through the index value.

A third manner: the first control information includes first index information, the first index information is used to determine a first frequency-domain resource corresponding to the first index information from first configuration information, and the first configuration information includes at least one correspondence between index information and a frequency-domain resource. The first configuration information is pre-configured or configured by the network. When the first configuration information is configured by the network, the network may transmit the first configuration information through RRC signaling, or broadcast information or DL control signaling.

For example, the DCI includes an index in a table, and each index in the table corresponds to an allocated frequency-domain resource, for example, a frequency-domain resource determined through a length and a starting position, or a frequency-domain resource determined through one or more frequency-domain unit indexes, or a frequency-domain resource determined through a bitmap or a frequency-domain resource determined in another manner. Therefore, the corresponding frequency-domain resource may be determined according to the index in the DCI.

In another example, the system bandwidth is 20 MHz, there are totally 100 PRBs, the granularity of the frequency-domain unit is sub-band, each sub-band includes 10 PRBs, each sub-band may be represented with a value of 4-bit index, and 4-bit index information is indicated in the first control information to indicate that the sub-band corresponding to this index is configured to transmit the first control channel.

In the solution, the frequency-domain resource information of the first control channel is explicitly indicated through the DCI, and not limited thereto, the frequency-domain resource information of the first control channel may also be predefined or configured by the network. For example, the length of the frequency-domain resource occupied by the first control channel may be determined in a manner of predefinition or configuration by the network. Specifically, the network configures through configuration information that the first control channel occupies 8 sub-bands, each sub-band including 10 PRBs.

In the solution, when the first control information is used to schedule multiple first control channels, the first control information includes multiple first bitmaps, or multiple first parameters or multiple pieces of first index information. Each first bitmap, or each first parameter or each piece of first index information being used to determine a frequency-domain resource for one first control channel.

2) The time-domain resource information of the first control channel may be implemented through the following manners.

A first manner: the time-domain resource information of the first control channel includes time-domain starting position information and/or time-domain length information. The time-domain starting position information is determined through a first indication field in the first control information, and the time-domain length information is determined through a second indication field in the first control information.

Herein, that the time-domain starting position information is determined through the first indication field in the first control information may be implemented through the following manners.

1: The first indication field includes first time offset information, and the first time offset information is used for the first device or the second device to determine the time-domain resource for the first control channel according to the first time offset information and/or the time-domain resource for the second control channel.

Herein, a granularity of a time unit is one of: a time-domain symbol, a subframe, a slot, an sTTI, or a fixed time length. A granularity of a time offset is one of: a time-domain symbol, a subframe, a slot, an sTTI, or a fixed time length. Not limited thereto, the granularity of the time unit or the time offset may also be another parameter representing a time length.

The time-domain resource for the first control channel may be determined through the first time offset information and the time-domain resource for the second control channel. Herein, the time-domain resource includes a time-domain starting position and/or a time length (i.e., the number of time units that are occupied). Optionally, the time-domain position of the first control channel in one time unit may be pre-configured or configured by the network.

For example, the first time offset information is used to indicate a time offset of a time-domain starting position of the first control channel relative to a time-domain starting position of the second control channel. For example, the time offset is four subframes. When the terminal receives the DCI carrying the offset information in a subframe n, the first control channel is sent in a subframe n+4. Furthermore, it is determined through pre-configuration information that the first control channel occupies first time-domain symbol to fourth time-domain symbol in one time unit, and thus it may be determined that the first control channel occupies first four time-domain symbols of the subframe n+4.

In an implementation, the first time offset information is used to indicate a time offset of the time-domain starting position of the first control channel relative to a starting position of a radio frame (for example, including 10 subframes), or, the first time offset information is used to indicate a time offset of the time-domain starting position of the first control channel relative to a starting position of a radio frame period (for example, including 10,240 subframes), or, the first time offset information is used to indicate a time offset of the time-domain starting position of the first control channel relative to a starting position of a resource pool.

In an implementation, the first control information is used to schedule multiple first control channels, and the first indication field includes multiple pieces of time offset information. Time-domain resources for the multiple first control channels may be determined through the multiple pieces of time offset information. For example, the first control information is used to schedule two first control channels, the first indication field includes two pieces of time offset information, the first time offset information is used to determine a time-domain resource for the first control channel 1, and the second time offset information is used to determine a time-domain resource for the first control channel 2. The time offset information is relative to the second control channel, or the time-domain starting position in the radio frame, or the time-domain starting position in the radio frame period.

In an implementation, the first control information is used to schedule multiple first control channels, a time-domain resource for the first control channel 1 may be explicitly or implicitly determined, and time-domain resources for the other first control channels may be determined through the time-domain resource for the first control channel 1 and the first time offset information. For example, the first control information is used to schedule two first control channels. A time-domain resource for the first control channel 1 may be implicitly determined. For example, a subframe corresponding to the first control channel 1 may form a determined relationship with a subframe where the first control information is received, the first control information is received in a subframe n, and the first control channel 1 is sent in a subframe n+4. A time-domain resource for the first control channel 2 is determined by adding the first time offset information to the time-domain resource for the first control channel 1. For example, if the first time offset information is p, a subframe corresponding to the first control channel 2 is n+4+p. For another example, the first control information is used to schedule two first control channels, the first control information includes two pieces of time offset information p1 and p2, the first control information is received in the subframe n, the first control channel 1 is sent in a subframe n+p1, and the first control channel 2 is sent in a subframe n+p2.

2: The first indication field includes second index information, and the second index information is used to determine a time unit occupied by the starting position of the first control channel.

Herein, the second index information may be a subframe number in a radio frame or a subframe number in a radio frame period, etc., and the time-domain starting position of the first control channel may be directly determined through the second index information.

For example, the DCI carries a subframe number of the PSCCH in a radio frame, the radio frame including 10 subframes, so that a range of the subframe number is [0, 9]. If the subframe number carried in the DCI is 7, the PSCCH scheduled by the DCI is transmitted in the subframe 7 in the radio frame. Furthermore, considering a processing delay of the terminal, if the terminal receives the DCI in a subframe 6, the processing delay is 2 ms and the subframe number carried in the DCI is 7, the terminal successfully detects the DCI in a subframe 8 and may schedule the PSCCH in a subframe 7 in a next radio frame.

It is to be noted that the radio frame or the radio frame period may be determined based on a DL or determined based on an SL.

In an implementation, the first indication field includes multiple pieces of index information. The first control information is used to schedule multiple first control channels, and time-domain resources for the multiple first control channels may be determined through the multiple pieces of index information. For example, the first control information is used to schedule two first control channels, the first indication field includes two pieces of index information, the first index information is used to determine a time-domain resource for the first control channel 1, and the second index information is used to determine a time-domain resource for the first control channel 2. Optionally, the index information is a subframe number in a radio frame or a subframe number in a radio frame period.

3: The first indication field includes a bitmap, each bit in the bitmap corresponds to a time unit, and whether the time unit corresponding to each bit is configured for transmission of the first control channel or not is determined through a value of the bit in the bitmap. For any bit in the bitmap, if the value of the bit is the first value, the time unit corresponding to the bit is configured for transmission of the first control channel; and if the value of the bit is the second value, the time unit corresponding to the bit is not configured for transmission of the first control channel.

For example, the first indication field includes a bitmap, and the bitmap includes 10 bits corresponding to 10 subframes respectively. When a certain bit is 1, it is indicated that the subframe is configured to transmit the first control channel. Furthermore, a resource for the first control channel in each subframe may be determined in the manner of pre-configuration or configuration by the network. For example, the first control channel occupies four symbols from a first symbol, and the time-domain resource for the first control channel may be determined through bitmap information and the configuration information. Furthermore, multiple bits of the bitmap may be set to be 1 to configure time-domain transmission resources for multiple first control channels.

For the time-domain resource for the first control channel, the time-domain resource for the first control channel occupies one time-domain symbol or multiple continuous time-domain symbols. Herein, the time-domain length information of the first control channel is determined through a second indication field in the first control information. Specifically, the second indication field in the first control information represents the number of time units occupied by the time-domain resource for the first control channel. The time unit may be a time-domain symbol, or an sTTI, or a subframe, or a slot or another fixed time length.

In the implementation, the time units for transmission the first control channel may be determined through the first indication field, and the time-domain resource for the first control channel in the time unit may be determined in the manner of pre-configuration or configuration by the network. For example, it is pre-configured or configured by the network that the first control channel occupies first k time-domain symbols in one time unit. In such case, in combination with the first indication field, the time unit where the first control channel is located may be determined, and the time-domain resource for the first control channel in the time unit may be determined.

A second manner: the time-domain resource information of the first control channel includes the time-domain starting position information and/or the time-domain length information, and the time-domain starting position information and/or the time-domain length information are/is determined through a third indication field in the first control information.

Herein, that the time-domain starting position information and/or the time-domain length information are/is determined through the third indication field in the first control information may be implemented through the following manners.

1: The third indication field in the first control information includes a second parameter, and the second parameter is used to determine the time-domain starting position and time-domain length of the first control channel.

Herein, the second parameter may be calculated according to the time-domain starting position and time-domain length of the first control channel, different second parameters are calculated according to different time-domain starting positions and different time-domain lengths, and the corresponding time-domain starting position and time-domain length of the first control channel may be determined according to the second parameter.

2: The third indication field in the first control information includes a second bitmap, each bit in the second bitmap corresponds to a time unit, and whether the time unit corresponding to each bit is configured for transmission of the first control channel or not is determined through a value of the bit in the second bitmap. For any second bit in the second bitmap, if the value of the second bit is the first value, the time unit corresponding to the second bit is configured for transmission of the first control channel; and if the value of the second bit is the second value, the time unit corresponding to the second bit is not configured for transmission of the first control channel.

For example, if the time unit is a time-domain symbol, when the value of a certain bit in the second bitmap is 1, it is indicated that the time-domain symbol corresponding to the bit is configured for transmission of the PSCCH; and when the value of a certain bit in the second bitmap is 0, it is indicated that the time-domain symbol corresponding to the bit is not configured for transmission of the PSCCH.

3: The third indication field in the first control information includes third index information, the third index information is used to determine a first time-domain resource corresponding to the third index information from second configuration information, and the second configuration information includes at least one correspondence between index information and a time-domain resource. The second configuration information is pre-configured or configured by the network.

For example, the DCI includes an index in a table, and each index in the table corresponds to an allocated time-domain resource, for example, a time-domain resource determined through a length of the time-domain resource and a starting position of the time-domain resource, or a time-domain resource determined through one or more time unit indexes, or a time-domain resource determined through a bitmap or a time-domain resource determined in another manner.

In the solution, the time-domain resource information of the first control channel is explicitly indicated through the DCI, and not limited thereto, the time-domain resource information of the first control channel may also be implicitly indicated through the DCI. Specifically, the time-domain resource for the first control channel is determined based on the time-domain resource for the second control channel. For example, the terminal determines a transmission moment of the PSCCH according to a moment when the DCI is received. For example, the DCI is received in a subframe n, and the PSCCH is sent in a subframe n+4. Each PSCCH starts from a first symbol of the subframe, or each PSCCH ends at a last symbol of the subframe. The number of symbols occupied by each PSCCH may be pre-configured or configured by the network.

In an implementation, the first control information may explicitly indicate the time-domain resource and/or frequency-domain resource for the first data channel, and the time-domain resource for the first control channel may be implicitly determined through the time-domain resource for the first data channel or the time-domain resource for the second control channel, or, the frequency-domain resource for the first control channel may be implicitly determined through the frequency-domain resource for the first data channel. In such case, the first control information does not include time-domain resource indication information for the first control channel or frequency-domain resource indication information for the first control channel.

In the solution of the embodiment of the disclosure, the first control information includes frequency-domain resource information corresponding to one first control channel and/or time-domain resource information corresponding to one first control channel, or, the first control information includes frequency-domain resource information corresponding to multiple first control channels and/or time-domain resource information corresponding to multiple first control channels.

In an implementation, the time-domain resource for the first data channel may be determined based on the time-domain resource for the first control channel or the time-domain resource for the second control channel and is not required to be explicitly indicated. The first control information may include the frequency-domain resource for the first data channel and/or time-domain resource for the first data channel and may also not include the frequency-domain resource for the first data channel and/or time-domain resource for the first data channel. Under the condition that the first control information includes the frequency-domain resource for the first data channel and/or time-domain resource for the first data channel, the frequency-domain resource for the first data channel and/or time-domain resource for the first data channel may be determined in the following manners.

3) The frequency-domain resource information of the first data channel may be implemented through the following manners.

A first manner: the first control information includes a third bitmap, the third bitmap is used to determine the frequency-domain resource for the first data channel, each bit in the third bitmap corresponds to a frequency-domain unit in the system, and whether the frequency-domain unit corresponding to each bit is configured for transmission of the first data channel or not is determined through a value of the bit in the third bitmap. For any third bit in the third bitmap, if the value of the third bit is the first value, the frequency-domain unit corresponding to the third bit is configured for transmission of the first data channel; and if the value of the third bit is the second value, the frequency-domain unit corresponding to the third bit is not configured for transmission of the first data channel.

Herein, the granularity of the frequency-domain unit is one of: PRB, RBG or sub-band. If the granularity of the frequency-domain unit is RBG or sub-band, an RBG or a sub-band includes K continuous PRBs.

For example, the system bandwidth is 20 MHz, there are totally 100 PRBs, the granularity of the frequency-domain unit is sub-band, and each sub-band includes 5 PRBs. In such case, the third bitmap includes 20 bits corresponding to the 20 sub-bands respectively. When the value of a certain bit in the third bitmap is 1, it is indicated that the frequency-domain unit corresponding to the bit is configured for transmission of the PSSCH. When the value of a certain bit in the third bitmap is 0, it is indicated that the frequency-domain unit corresponding to the bit is not configured for transmission of the PSSCH. The sub-bands for transmission of the PSSCH may be continuous in the frequency domain or discontinuous in the frequency domain.

A second manner: the first control information includes a third parameter, and the third parameter is used to determine a starting position of the frequency-domain resource for the first data channel and/or a length of the frequency-domain resource for the first data channel. The frequency-domain resource is continuously allocated.

In an implementation, when a frequency-domain starting position of the first control channel is the same as a frequency-domain starting position of the first data channel, or the frequency-domain starting position of the first control channel and the frequency-domain starting position of the first data channel have a one-to-one correspondence, the third parameter is used to determine the length of the frequency-domain resource corresponding to the first data channel. In another implementation, when a frequency-domain ending position of the first control channel is the same as a frequency-domain ending position of the first data channel, the third parameter is used to determine the length of the frequency-domain resource corresponding to the first data channel. For example, when a frequency-domain starting position of the PSCCH and a frequency-domain starting position of the corresponding PSSCH are the same, the frequency-domain starting position of the PSSCH may be determined based on the frequency-domain starting position of the PSCCH, and the length of the frequency-domain resource for the PSSCH is represented through the third parameter.

In an implementation, when the first control information is used to schedule transmission of multiple data channels, the multiple data channels at least include the first data channel and a second data channel, and the third parameter is used to determine lengths of frequency-domain resources corresponding to the multiple data channels and a starting position of the frequency-domain resource corresponding to the second data channel. In the embodiment, if the starting position of the frequency-domain resource for the first data channel and the starting position of the frequency-domain resource of the first control channel have a one-to-one correspondence, the starting position of the frequency-domain resource for the first data channel may be determined through the starting position of the frequency-domain resource for the first control channel; and if the starting position of the frequency-domain resource for the first data channel and the starting position of the frequency-domain resource for the first control channel do not has a one-to-one correspondence, the first control information includes another parameter configured to indicate the starting position of the frequency-domain resource for the first data channel. For example, when the DCI schedules two transmissions of the PSSCH (one is initial transmission and the other is retransmission), the third parameter represents the length of the frequency-domain resource for the PSSCH and a starting position of the other transmission of the PSSCH, the third parameter is determined by the length of the frequency-domain resource for the PSSCH and the starting position of the second transmission of the PSSCH, and in such case, the DCI includes another field configured to indicate a starting position of a frequency-domain resource for the first transmission of the PSSCH. For another example, when the DCI schedules four transmissions of the PSSCH (one is initial transmission and the other three are retransmissions), the third parameter includes frequency-domain starting positions of the four transmissions and lengths of frequency-domain resources. If the lengths of the frequency-domain resources for the four transmissions are the same, the third parameter is only required to indicate the length of one frequency-domain resource, otherwise is required to indicate the lengths of the frequency-domain resources for the four transmissions respectively. If the starting position of the frequency-domain resource for the PSSCH may be determined through the position of the frequency-domain resource for the PSCCH corresponding to the PSSCH (for example, frequency-domain starting positions of the four transmissions of the PSSCH are the same and the frequency-domain starting position of the first transmission of the PSSCH and the frequency-domain starting position of the corresponding PSCCH have a one-to-one correspondence), the third parameter may not include the frequency-domain starting positions of the four transmissions. If the frequency-domain starting positions of the four transmissions are the same or a frequency-hopping manner is adopted for the four transmissions (namely the frequency-domain starting positions of the subsequent three transmissions may be determined through the frequency-domain starting position of the first transmission and a frequency-hopping criterion), the third parameter may include only one frequency-domain starting position.

In an embodiment, the third parameter is determined by the starting position and length of the frequency-domain resource for the first data channel. For example, the third parameter is an MV, and the MV corresponds to an index (n_PRB_start) of a starting PRB of the frequency-domain resource for the PSSCH and the number (L_PRB) of continuously allocated PRBs. The MV is determined through the following formula.

If $(L\_PRB-1) \leq \lfloor (L\_PRB)/2 \rfloor$, $RIV = N\_PRB(L\_PRB-1) + n\_PRB\_start$ otherwise $RIV = N\_PRB(N\_PRB-L\_PRB+1) + (N\_PRB-1-n\_PRB\_start)$ N_PRB represents the total number of PRBs in a resource pool. In the embodiment, N_PRB may also represent the total number of PRBs in a BWP or the total number of PRBs in a carrier, and no limits are made thereto in the embodiment. In the embodiment, the granularity of the frequency-domain resource may also be RBG or sub-band, and no limits are made thereto in the embodiment.

A third manner: the first control information includes fourth index information, the fourth index information is used to determine a second frequency-domain resource corresponding to the fourth index information from third configuration information, and the third configuration information includes at least one correspondence between index information and a frequency-domain resource. The third configuration information is pre-configured or configured by the network. The third configuration information is pre-configured or configured by the network, when the third configuration information is configured by the network, the network may transmit the third configuration information through the RRC signaling, or the broadcast information or the DL control signaling.

For example, the DCI includes an index in a table, and each index in the table corresponds to an allocated frequency-domain resource, for example, a frequency-domain resource determined through a length and a starting position, or a frequency-domain resource determined through one or more frequency-domain unit indexes, or a frequency-domain resource determined through a bitmap or a frequency-domain resource determined in another manner.

4) For the frequency-domain resource for the first data channel, the first control information further includes first indication information, and the first indication information being used to indicate an allocation type of the frequency-domain resource for the first data channel.

In an implementation, the first indication information is represented through N bits in the first control information, N is an integer greater than or equal to 1, and different values of the N bits correspond to different allocation types of frequency-domain resources. For example, the first indication information is represented through one bit, when a value of the bit is 1, it is indicated that the allocation type of frequency-domain resource for the first data channel is type0, and when the value of the bit is 0, it is indicated that the allocation type of frequency-domain resource for the first data channel is type1. Type0 represents that the frequency-domain resource is discrete and type1 represents that the frequency-domain resource is continuous. In case of more frequency-domain resource allocation types, the first indication information may be represented through more bits.

5) The time-domain resource information of the first data channel may be implemented through the following manners.

A first manner: the time-domain resource information of the first data channel includes time-domain starting position information and/or time-domain length information, the time-domain starting position information is determined through a fourth indication field in the first control information, and the time-domain length information is determined through a fifth indication field in the first control information.

Herein, if the time-domain resources for the first data channel and the first control channel and/or the second control channel are continuous, or the time-domain resources for the first data channel and the first control channel and/or the second control channel have a correspondence, a time-domain starting position of the first data channel may be determined based on the time-domain starting position of the first control channel and/or the second control channel, so that the time-domain starting position of the first data channel is not required to be determined through the fourth indication field in the first control information. If the time-domain resources for the first data channel and the first control channel and/or the second control channel are discontinuous and the time-domain resources for the first data channel and the first control channel and/or the second control channel do not have a correspondence, the time-domain starting position of the first data channel is required to be determined through the fourth indication field in the first control information.

Herein, that the time-domain starting position information is determined through the fourth indication field in the first control information may be implemented through the following manners.

1: The fourth indication field includes second time offset information, and the second time offset information is used to determine a time offset of the time-domain resource for the first data channel relative to the time-domain resource for the second control channel or the first control channel.

Herein, the granularity of the time unit is one of: a time-domain symbol, a subframe, a slot, an sTTI, or a fixed time length. The granularity of the time offset is one of: a time-domain symbol, a subframe, a slot, an sTTI, or a fixed time length. Not limited thereto, the granularity of the time unit or the time offset may also be another parameter representing a time length.

The time-domain resource for the first data channel may be determined through the second time offset information and the time-domain resource for the first control channel/ the second control channel. Herein, the time-domain resource includes the time-domain starting position and/or the time length (i.e., the number of time units that are occupied).

For example, referring to FIG. 7(a), the PSCCH and the PSSCH scheduled by PSCCH are not in the same subframe, first three symbols in each subframe are PSCCH resources, and other symbols are PSSCH resources. In such case, the DCI may carry a subframe offset of the PSSCH relative to the PSCCH, and thus a subframe position of the PSSCH may be determined according to a subframe allocated for the PSCCH in the DCI and the subframe offset carried therein. The first three symbols in the subframe corresponding to the PSSCH are candidate PSCCH resources, so that the PSSCH starts from the fourth symbol, and furthermore, a specific starting subframe and starting symbol position of the PSSCH may be determined. Optionally, if the starting position of the PSSCH in a subframe is unfixed, the time offset information further includes offset information or index information of a time-domain symbol for the PSSCH in the subframe. The time-domain starting position of the PSSCH may be determined in combination with the subframe offset in the DCI and the offset information or index information of the time-domain symbol in the subframe.

2: The fourth indication field includes time index information, and the time index information is used to determine the time-domain starting position of the first data channel.

For example, the time index information may be a time unit number in a radio frame or a time unit number in a radio frame period, etc., the time unit is a time-domain symbol or a subframe or a slot or an sTTI or a fixed time length, and the time-domain starting position of the first data channel may be directly determined through the time index information. For example, referring to FIG. 7(a), the PSCCH and the PSSCH scheduled by PSCCH are not in the same subframe, the first three symbols in each subframe are PSCCH resources, and the other symbols are PSSCH resources. In such case, the DCI may carry a subframe number for the PSSCH in a radio frame. The radio frame includes 10 subframes, so that a range of the subframe number is [0, 9]. If the subframe number carried in the DCI is 7, the DCI is configured to schedule the PSSCH in a subframe 7 in the radio frame. In the subframe 7, first three symbols are candidate PSCCH resources, so that the PSSCH starts from the fourth symbol, and furthermore, the specific starting subframe and starting symbol position of the PSSCH may be determined. Furthermore, considering a processing delay of the terminal, if the terminal receives the DCI in a subframe 6, the processing delay is 2 ms and the subframe number carried in the DCI is 7, the terminal successfully detects the DCI in a subframe 8 and may schedule the PSSCH in a subframe 7 in a next radio frame.

For the time-domain resource for the first data channel, the time-domain resource for the first data channel occupies one time unit or multiple continuous time units. Herein, that the time-domain length information of the first data channel is determined through the fifth indication field in the first control information may be implemented through the following manner.

The fifth indication field is used to determine the number of time units occupied by the time-domain resource for the first data channel. Herein, the granularity of the time unit is one of: a time-domain symbol, a subframe, a slot, an sTTI, or a fixed time length. Not limited thereto, the granularity of the time unit may also be another parameter representing a time length.

For example, in FIG. 5(a), a subframe includes 14 symbols, the PSCCH occupies the first four symbols of the subframe, the other symbols in the subframe may be configured for transmission of the PSSCH, and the PSSCH may occupy one or more subframes, so that the fifth indication field may indicate the number of the subframes occupied by the PSSCH, or the fifth indication field may indicate the number of the symbols occupied by the PSSCH. For example, if the time unit takes subframe as the granularity and the fifth indication field indicates that the PSSCH occupies two time units, the PSSCH scheduled by the DCI occupies two continuous adjacent subframes, and the time-domain resource occupied by the PSSCH may be determined in combination with the starting position of the time-domain resource for the PSSCH.

In an implementation, the first control information is used to schedule multiple first data channels, and the fourth indication field includes multiple pieces of time offset information or multiple pieces of time index information. Time-domain resources for the multiple first data channels may be determined through the multiple pieces of time offset information or the multiple pieces of time index information. For example, the first control information is used to schedule two first data channels, the first indication field includes two pieces of time offset information, the first time offset information is used to determine a time-domain resource for the first data channel 1, and the second time offset information is used to determine a time-domain resource for the first data channel 2. The time offset information is relative to the second control channel, or the first control channel, or the time-domain starting position in the radio frame, or the time-domain starting position in the radio frame period.

In an implementation, when the time-domain resource for the first data channel occupies multiple continuous time units, the multiple time units include a first time unit and at least one second time unit. If the second time unit includes a control channel resource, the time-domain resource for the first data channel occupies the control channel resource in the second time unit. For example, when the PSSCH occupies multiple continuous time units, the PSSCH may occupy PSCCH resources of the other time units except the first time unit. As illustrated in FIG. 5, the PSSCH scheduled in a third subframe occupies two subframes, and the PSSCH may occupy a PSCCH resource of a fourth subframe.

A second manner: the time-domain resource information of the first data channel includes the time-domain starting position information and/or the time-domain length information, and the time-domain starting position information and/or the time-domain length information are/is determined through a sixth indication field in the first control information.

Herein, that the time-domain starting position information and/or the time-domain length information are/is determined through the sixth indication field in the first control information may be implemented through the following manners.

1: The sixth indication field in the first control information includes a fourth parameter, and the fourth parameter is used to determine the time-domain starting position and time-domain length of the first data channel.

Herein, the fourth parameter may be calculated according to the time-domain starting position and time-domain length of the first data channel, different fourth parameters are calculated according to different time-domain starting positions and different time-domain lengths, and the corresponding time-domain starting position and time-domain length of the first data channel may be determined according to the fourth parameter.

2: The sixth indication field in the first control information includes a fourth bitmap, each bit in the fourth bitmap corresponds to a time unit, and whether the time unit corresponding to each bit is configured for transmission of the first data channel or not is determined through a value of the bit in the fourth bitmap. For any fourth bit in the fourth bitmap, if the value of the fourth bit is the first value, the time unit corresponding to the fourth bit is configured for transmission of the first data channel; and if the value of the fourth bit is the second value, the time unit corresponding to the fourth bit is not configured for transmission of the first data channel.

Herein, the granularity of the time unit is one of: a time-domain symbol, a subframe, a slot, an sTTI, or a fixed time length. Not limited thereto, the granularity of the time unit may also be another parameter representing a time length.

For example, when the value of a certain bit in the fourth bitmap is 1, it is indicated that the time-domain unit corresponding to the bit is configured for transmission of the PSSCH; and when the value of a certain bit in the fourth bitmap is 0, it is indicated that the time-domain unit corresponding to the bit is not configured for transmission of the PSSCH.

3: The sixth indication field in the first control information includes fifth index information, the fifth index information is used to determine a second time-domain resource corresponding to the fifth index information from fourth configuration information, and the fourth configuration information includes at least one correspondence between index information and a time-domain resource. The fourth configuration information is pre-configured or configured by the network. When the fourth configuration information is configured by the network, the network may transmit the fourth configuration information through the RRC signaling, or the broadcast information or the DL control signaling.

For example, the DCI includes an index in a table, and each index in the table corresponds to an allocated time-domain resource, for example, a time-domain resource determined through a length and a starting position of the time-domain resource, or a time-domain resource determined through one or more time unit indexes, or a time-domain resource determined through a bitmap or a time-domain resource determined in another manner.

In the implementation, the time unit for transmission of the first data channel may be determined through the fourth indication field or the sixth indication field, and the time-domain resource for the first data channel in the time unit may be determined in the manner of pre-configuration or configuration by the network. For example, it is pre-configured or configured by the network that the first data channel occupies last m time-domain symbols in one time unit. In such case, in combination with the first indication field, the time unit where the first data channel is located may be determined, and the time-domain resource for the first data channel in the time unit may be determined.

In the solution of the embodiment of the disclosure, the number of PRBs available to the terminal on a transmission resource for the first data channel that is scheduled may be a multiple of 2, 3 and 5.

Optionally, in the solution of the embodiment of the disclosure, a last time-domain symbol of a last time unit occupied by the first data channel is not configured for data transmission but as a GP.

Herein, for the condition that the first data channel occupies continuous time units, a last symbol of the last time unit is not configured for data transmission. For the condition that the first data channel occupies discontinuous time units, a last symbol of each time unit is not configured for data transmission.

In the solution of the embodiment of the disclosure, the first control information includes frequency-domain resource information corresponding to one first data channel and/or time-domain resource information corresponding to one first data channel, or, the first control information includes frequency-domain resource information corresponding to multiple first data channels and/or time-domain resource information corresponding to multiple first data channels.

In addition, the first control information in the embodiment of the disclosure further includes at least one of:
second indication information, the second indication information being used to determine transmission times of the first data channel;
redundancy version information of the first data channel;
codebook information for the first data channel;
transmission scheme information for the first data channel, for example, single-antenna-port transmission, transmission diversity and beamforming;
DMRS pattern information for the first data channel;
power information of the first data channel;
information of a power difference between the first data channel and the first control channel;
a CIF, the CIF being configured to determine carrier information for transmission of the first control channel and/or the first data channel;
BWP indication information, the BWP indication information being used to determine BWP information for transmission of the first control channel and/or the first data channel;
resource pool indication information, the resource pool indication information being used to determine resource pool information for transmission of the first control channel and/or the first data channel;
third indication information, the third indication information being used to determine a transmission resource for a feedback channel, for example, a time-domain resource and/or frequency-domain resource for the feedback channel, or a maximum delay of feedback information and the present PSSCH;
fourth indication information, the fourth indication information being used to determine a transmission mode for an Uplink (UL) control channel (for example, a Physical Uplink Control Channel (PUCCH));

fifth indication information, the fifth indication information being used to determine a transmission mode for the first control channel and/or the first data channel;

sixth indication information, the sixth indication information being used to determine whether frequency-hopping transmission is adopted for the first data channel or not;

seventh indication information, the seventh indication information being used to indicate an MCS for the first data channel; and eighth indication information, the eighth indication information being used to determine transmission times of the first control channel.

In an implementation, the first control information may schedule multiple PSSCH transmissions, including a first transmission and retransmissions, and the DCI includes the second indication information, configured to indicate the number of PSSCH transmissions scheduled by the DCI. Furthermore, the DCI may carry the redundancy version information configured to indicate a redundancy version of the presently scheduled PSSCH. Under the condition that multiple PSSCH transmissions are supported, a redundancy version number corresponding to each transmission may be predefined or configured by the network, so that the specific serial number of a present PSSCH transmission may be determined through the redundancy version information carried in the DCI, and the transmissions may be merged at a receiver. In another embodiment, the DCI may carry the specific serial number of the present transmission in the multiple transmissions.

In an implementation, the first control information may schedule multiple PSCCH transmissions, including a first transmission and retransmissions, and the DCI includes the eighth indication information configured to indicate the number of PSCCH transmissions scheduled by the DCI.

In an implementation, one of multiple candidate transmission schemes may be selected for transmission of the PSSCH, and the transmission scheme includes single-antenna-port transmission, transmission diversity, beamforming and another possible multi-antenna transmission scheme. The DCI may carry the transmission scheme information configured to indicate the transmission scheme adopted for the PSSCH scheduled by the DCI. Furthermore, transmission diversity may include SFBC, STBC, CDD and the like. Furthermore, the DCI may carry the codebook information under the transmission scheme.

In an implementation, the PSSCH may support multiple DMRS patterns, and the DCI may carry indication information configured to indicate the DMRS pattern information adopted for the PSSCH scheduled by the DCI, so that the receiver may adopt the corresponding DMRS pattern to demodulate the PSSCH.

In an implementation, the DCI may carry the power information, and the power information is used to indicate transmitting power of the PSSCH scheduled by the DCI or a power difference between the PSSCH and the corresponding PSCCH.

In an implementation, the SL supports multi-carrier transmission, and the DCI may carry the carrier indication information used to indicate carrier information for the PSCCH and PSSCH scheduled by the DCI. Furthermore, if cross-carrier scheduling is supported in multiple carriers of the SL, namely SCI sent in a first carrier schedules the PSSCH in a second carrier, the DCI carries first carrier indication information and second carrier indication information, the first carrier indication information being used to indicate a carrier for PSCCH transmission scheduled by the DCI and the second carrier indication information being used to indicate a carrier for PSSCH transmission scheduled by the DCI.

In an implementation, a carrier of the SL is divided into multiple BWPs, and the DCI may carry the BWP indication information used to indicate the BWP information for the PSCCH and PSSCH scheduled by the DCI. Furthermore, if cross-BWP scheduling is supported in the SL, namely SCI sent in a first BWP schedules the PSSCH in a second BWP, the DCI carries first BWP indication information and second BWP indication information, the first BWP indication information being used to indicate a BWP for PSCCH transmission scheduled by the DCI and the second BWP indication information being used to indicate a BWP for PSSCH transmission scheduled by the DCI.

In an embodiment, multiple resource pools are configured in the SL, and the DCI may carry the resource pool indication information used to indicate the resource pool information for the PSCCH and PSSCH scheduled by the DCI.

In an implementation, the first terminal transmits the SCI and the PSSCH scheduled by SCI, and the second terminal receives the PSSCH and is required to feed back information. How to determine the transmission resource for the feedback information is also a problem needing to be solved. The DCI may carry the third indication information, and the third indication information is used to determine the transmission resource for the feedback information. For example, the third indication information may be a piece of index information, the index information is used to determine the transmission resource for the feedback channel corresponding to the index information from third configuration information, and the third configuration information includes at least one correspondence between index information and a transmission resource for the feedback channel.

In an implementation, the network allocates the transmission resources transmitting the PSCCH and the PSSCH to the first terminal, the first terminal transmits the PSCCH and the PSSCH to the second terminal in a unicast manner according to the resources allocated by the network; the second terminal receives the PSSCH and transmits the feedback information to the first terminal; and the first terminal is required to transmit the feedback information to the network, to assist the network to allocate resource for new data or retransmitted data. Therefore, the network simultaneously carries the fourth indication information in the DCI for allocating the transmission resources transmitting the PSCCH and the PSSCH to the first terminal, the indication information being used to indicate the transmission resource for the UL control channel and the UL control channel being used for the first terminal to transmit the feedback information transmitted by the SL. Optionally, the network transmits configurations of multiple UL control channels to the first terminal through the RRC signaling, the broadcast information and the like, and the fourth indication information is used for the first terminal to determine the UL control channel for transmission of the feedback information of the SL in combination with the fourth indication information and configuration information, sent by the network, of the UL control channels. The fourth indication information may be carried in one of the following manners.

1: The DCI includes one or more information fields, the one or more information fields being configured to determine the transmission resource for the UL control channel.

2: The fourth indication information is carried through an RNTI: different RNTIs correspond to different transmission resources for the UL control channel, the DCI carries RNTI information explicitly or implicitly, and the corresponding transmission resource for the UL control channel may be determined through the RNTI information carried in the DCI.

3: The fourth indication information is carried through different scrambling sequences: different scrambling sequences correspond to different transmission resources for the UL control channel, the scrambling sequence being used to scramble the DCI, so that the corresponding transmission resources for the UL control channel may be determined through different scrambling sequences scrambling the DCI.

In an implementation, the first control information includes the fifth indication information, and the fifth indication information is used to determine the transmission mode for the first control channel and/or the first data channel. The transmission mode includes unicast transmission, multicast transmission and broadcast transmission. A receiver of unicast transmission is only one terminal, a receiver of multicast transmission is a group of terminals, and a receiver of broadcast transmission is all terminals. When the network allocates the transmission resource of the SL to the terminal, the transmission mode corresponding to the transmission resource may be indicated at the same time. For example, the network allocates the transmission resources for the PSCCH and the PSSCH to the first terminal and indicates that the resource is configured for unicast transmission, so that the first terminal may transmit the PSCCH and the PSSCH to a target receiving terminal (i.e., the second terminal) of unicast transmission on the transmission resources allocated by the network. Optionally, when the network allocates the transmission resources for the PSCCH and the PSSCH to the first terminal, the fifth indication information indicating the transmission mode may be carried at the same time, and the first terminal transmits the PSCCH and the PSSCH according to the transmission mode indicated by the fifth indication information. Specifically, the fifth information may be carried in one of the following manners.

1: The DCI includes an information field, and the information field explicitly indicates the transmission mode for the SL.
2: The fifth indication information is carried through an RNTI: different RNTIs correspond to different transmission modes, the DCI carries RNTI information explicitly or implicitly, and the corresponding transmission mode may be determined through the RNTI information carried in the DCI.
3: The fifth indication information is carried through different scrambling sequences: different scrambling sequences correspond to different transmission modes, the scrambling sequence being used to scramble the DCI, so that the corresponding transmission modes may be determined through different scrambling sequences scrambling the DCI.

In an implementation, the first control information includes the sixth indication information, and the sixth indication information is used to determine whether frequency-hopping transmission is adopted for the first data channel or not. When the first control information is used to schedule multiple first data channels and the sixth indication information indicates that a frequency-hopping manner is adopted, the multiple first data channels are transmitted in the frequency-hopping manner.

In an implementation, the first control information includes the seventh indication information, and the seventh indication information is used to indicate the MCS used for the first data channel. When the network allocates the time-domain and/or frequency-domain resources for the first data channel, the MCS used for the first data channel may be indicated at the same time.

According to the technical solution of the embodiment of the disclosure, the PSCCH and/or the PSSCH are/is scheduled through the DCI in a Physical Downlink Control Channel (PDCCH), so that time division transmission of the PSCCH and the PSSCH is implemented without increasing the detection complexity of a Rel-15 receiver and influencing a resource sensing and selecting process of a Rel-14 terminal.

FIG. 8(*b*) is a structure composition diagram of a device for control information transmission according to an embodiment of the disclosure. The device for control information transmission is applied to a first device, and as illustrated in FIG. 8(*b*), includes a transmission unit 8012.

The transmission unit 8012 is configured to perform transmission of first control information between the first terminal and a second device, the first control information being carried in a second control channel, the first control information being used to schedule transmission of a first control channel and/or a first data channel, the first control channel being used for transmission of SCI, the first data channel being used for transmission of SL data, and transmission of the first data channel and the first control channel is time division.

In the embodiment of the disclosure, the first device is a first terminal, the second device is a base station, and the transmission unit 8012 is configured to receive the first control information sent by the base station; or, the first device is the base station, the second device is the first terminal, and the transmission unit 8012 is configured to transmit the first control information to the first terminal.

In an implementation, a link between the first terminal and a second terminal is called an SL, the first control information transmitted between the first terminal and the second terminal is called SCI, and the SCI is configured to schedule transmission of a corresponding data channel (i.e., the first data channel). Herein, the first data channel is used for data transmission between the first terminal and the second terminal.

In an implementation, a frequency-domain resource and/or time-domain resource for the first data channel may be scheduled (namely explicitly indicated) through the second control channel, and a frequency-domain resource and/or time-domain resource for the first control channel may be scheduled (namely explicitly indicated) through the second control channel.

In an implementation, the time-domain resource for the first data channel may be determined based on the time-domain resource for the first control channel or the time-domain resource for the second control channel, and/or, the frequency-domain resource for the first data channel may be determined based on the frequency-domain resource for the first control channel and is not required to be explicitly indicated.

In an implementation, the time-domain resource for the first control channel may be determined based on the time-domain resource for the second control channel or the time-domain resource for the first data channel, and/or, the frequency-domain resource for the first control channel may be determined based on the frequency-domain resource for the first data channel and is not required to be explicitly indicated.

In an implementation, the first control information is carried in the second control channel. Herein, the second control channel is configured to transmit DCI. The first control channel is configured to transmit the SCI, and is called a PSCCH. The first data channel is configured to transmit SL data, and is called a PSSCH. Transmission of the first data channel and the first control channel is time division, so that a delay may be reduced.

In the solution of the embodiment of the disclosure, that transmission of the first data channel and the first control channel being time division may include the following three implementations.

1) transmission of the first data channel and the first control channel is time division in a time unit, the first control channel occupying A time-domain symbols in the time unit, the first data channel occupying B time-domain symbols in the time unit and the time-domain resource for the first control channel and the time-domain resource for the first data channel not overlapping, 1≤A<C, 1≤B<C and A+B≤C, where C is a number of time-domain symbols in one time unit, a granularity of the time unit being slot, subframe, sTTI or another fixed time length.

For example, as illustrated in FIG. 5(a), a time unit includes C=14 time-domain symbols, the first data channel and the first control channel occupy the same time unit, the first control channel occupies the first to second time-domain symbols of the time unit, and the first data channel occupies the third to fourteenth time-domain symbols of the time unit. It is to be noted that, under the condition that the time-domain resource for the first data channel and the time-domain resource for the first control channel do not overlap, continuous time-domain symbols may be occupied and discontinuous time-domain symbols may also be occupied. For example, the first control channel occupies the first to second time-domain symbols of the time unit and the first data channel occupies the fifth to fourteenth time-domain symbols of the time unit.

2) Transmission of the first data channel is in a first time unit, and transmission of the first control channel is in a second time unit, the first control channel occupying A time-domain symbols in the first time unit and the first data channel occupying B time-domain symbols in the second time unit, 1≤A≤C and 1≤B≤C, where C is a number of time-domain symbols in one time unit, the granularity of the time unit being slot, subframe, sTTI or another fixed time length.

For example, as illustrated in FIG. 7(a), a time unit includes C=14 time-domain symbols, the first data channel and the first control channel occupy different time units, the first control channel occupies first to second time-domain symbols of the first time unit, and the first data channel occupies third to fourteenth time-domain symbols of the second time unit. It is to be noted that the first data channel and the first control channel occupies continuous time-domain symbols and may also occupy discontinuous time-domain symbols.

For another example, as illustrated in FIG. 5(b), a time unit includes C=14 time-domain symbols, the first data channel and the first control channel occupy different time units, the first control channel occupies all time-domain symbols of the first time unit, and the first data channel occupies all time-domain symbols of the second time unit.

3) The transmission of the first data channel and the first control channel is partially time division. The transmission of the first data channel and the first control channel being partially time division includes that: the time-domain resource occupied by the first control channel at least partially overlaps the time-domain resource occupied by the first data channel.

For example, there is made such a hypothesis that E represents a control channel, F represents a data channel, and time-domain resource for E and time-domain resource for F at least partially overlap. Furthermore, time-domain starting position of E and time-domain starting position of F may be the same, or the starting position of E is after F, or the starting position of E is before F.

Herein, there may be the following conditions for at least partial overlapping of the time-domain resource for E and the time-domain resource for F: 1) the time-domain resource for E is a subset of the time-domain resource for F; or, 2) the time-domain resource for E partially overlaps the time-domain resource for F, namely part of the time-domain resource for E does not overlap part of the time-domain resource for F while the other part of the time-domain resource for E overlaps other part of the time-domain resource for F.

For c), the first control channel occupies A time-domain symbols in one time unit, the first data channel occupies B time-domain symbols in the time unit, and the time-domain resource for the first control channel and the time-domain resource for the first data channel at least partially overlap, 1≤A≤C and 1≤B≤C, where C is a number of time-domain symbols in one time unit.

Under the condition that transmission of the first data channel and the first control channel is time division, scheduling of transmission of the first control channel and/or the first data channel by the first control information may be implemented through the following DCI format.

In the embodiment of the disclosure, the first control information includes frequency-domain resource information of the first control channel and/or time-domain resource information of the first control channel and/or frequency-domain resource information of the first data channel and/or time-domain resource information of the first data channel.

1) The frequency-domain resource information of the first control channel may be implemented through the following manners.

A first manner: the first control information includes a first bitmap, the first bitmap is used to determine the frequency-domain resource for the first control channel, each bit in the first bitmap corresponds to a frequency-domain unit in a system, and whether the frequency-domain unit corresponding to each bit is configured for transmission of the first control channel or not is determined through a value of the bit in the first bitmap. For any first bit in the first bitmap, if the value of the first bit is a first value, the frequency-domain unit corresponding to the first bit is configured for transmission of the first control channel; and if the value of the first bit is a second value, the frequency-domain unit corresponding to the first bit is not configured for transmission of the first control channel.

Herein, a granularity of the frequency-domain unit is one of: PRB, RBG or sub-band. If the granularity of the frequency-domain unit is RBG or sub-band, an RBG or a sub-band includes K continuous PRBs.

For example, a system bandwidth is 20 MHz, there are totally 100 PRBs, the granularity of the frequency-domain unit is sub-band, and each sub-band includes 10 PRBs. In such case, the first bitmap includes 10 bits corresponding to the 10 sub-bands respectively. When the value of a certain bit in the first bitmap is 1, it is indicated that the sub-band corresponding to the bit is configured for transmission of the PSCCH. When the value of a certain bit in the first bitmap is 0, it is indicated that the sub-band corresponding to the bit is not configured for transmission of the PSCCH.

A second manner: the first control information includes a first parameter, and the first parameter is used to determine a starting position of the frequency-domain resource for the first control channel and/or a length of the frequency-domain resource for the first control channel. The frequency-domain resource is continuously allocated.

For example, the first parameter is an RIV, and the RIV corresponds to an index of a starting PRB of the frequency-domain resource for the PSCCH and the number of continuously allocated PRBs. A frequency-domain starting position and frequency-domain length of the PSCCH may be determined through the RIV.

In an implementation, the length of the frequency-domain resource occupied by the PSCCH is pre-configured or configured by a network, and in such case, the first parameter is used to indicate the frequency-domain starting position of the PSCCH. Specifically, the first parameter may be a frequency-domain offset, the frequency-domain offset is used to indicate a frequency-domain offset of the frequency-domain starting position of the PSCCH relative to a frequency-domain position. The frequency-domain position may be a lowest or highest PRB position, or a starting position of a carrier or a BWP, or a starting position of a resource pool, or a frequency-domain starting position of an SL synchronization signal, or a frequency-domain starting position of an SL broadcast channel or another determined frequency-domain position. Optionally, the first parameter may be an index value of a frequency-domain unit, and the starting position of the frequency-domain resource may be determined through the index value.

A third manner: the first control information includes first index information, the first index information is used to determine a first frequency-domain resource corresponding to the first index information from first configuration information, and the first configuration information includes at least one correspondence between index information and a frequency-domain resource. The first configuration information is pre-configured or configured by the network. When the first configuration information is configured by the network, the network may transmit the first configuration information through RRC signaling, or broadcast information or DL control signaling.

For example, the DCI includes an index in a table, and each index in the table corresponds to an allocated frequency-domain resource, for example, a frequency-domain resource determined through a length and a starting position, or a frequency-domain resource determined through one or more frequency-domain unit indexes, or a frequency-domain resource determined through a bitmap or a frequency-domain resource determined in another manner. Therefore, the corresponding frequency-domain resource may be determined according to the index in the DCI.

In another example, the system bandwidth is 20 MHz, there are totally 100 PRBs, the granularity of the frequency-domain unit is sub-band, each sub-band includes 10 PRBs, each sub-band may be represented with a value of 4-bit index, and 4-bit index information is indicated in the first control information to indicate that the sub-band corresponding to this index is configured to transmit the first control channel.

In the solution, the frequency-domain resource information of the first control channel is explicitly indicated through the DCI, and not limited thereto, the frequency-domain resource information of the first control channel may also be predefined or configured by the network. For example, the length of the frequency-domain resource occupied by the first control channel may be determined in a manner of predefinition or configuration by the network. Specifically, the network configures through configuration information that the first control channel occupies 8 sub-bands, each sub-band including 10 PRBs.

In the solution, when the first control information is used to schedule multiple first control channels, the first control information includes multiple first bitmaps, or multiple first parameters or multiple pieces of first index information. Each first bitmap, or each first parameter or each piece of first index information being used to determine a frequency-domain resource for one first control channel.

2) The time-domain resource information of the first control channel may be implemented through the following manners.

A first manner: the time-domain resource information of the first control channel includes time-domain starting position information and/or time-domain length information. The time-domain starting position information is determined through a first indication field in the first control information, and the time-domain length information is determined through a second indication field in the first control information.

Herein, that the time-domain starting position information is determined through the first indication field in the first control information may be implemented through the following manners.

1: The first indication field includes first time offset information, and the first time offset information is used for the first device or the second device to determine the time-domain resource for the first control channel according to the first time offset information and/or the time-domain resource for the second control channel.

Herein, the granularity of the time unit is one of: a time-domain symbol, a subframe, a slot, an sTTI, or a fixed time length. The granularity of the time offset is one of: a time-domain symbol, a subframe, a slot, an sTTI, or a fixed time length. Not limited thereto, the granularity of the time unit or the time offset may also be another parameter representing a time length.

The time-domain resource for the first control channel may be determined through the first time offset information and the time-domain resource for the second control channel. Herein, the time-domain resource includes the time-domain starting position and/or the time length (i.e., the number of time units that are occupied). Optionally, the time-domain position of the first control channel in one time unit may be pre-configured or configured by the network.

For example, the first time offset information is used to indicate a time offset of a time-domain starting position of the first control channel relative to a time-domain starting position of the second control channel. For example, the time offset is four subframes. When the terminal receives the DCI carrying the offset information in a subframe n, the first control channel is sent in a subframe n+4. Furthermore, it is determined through pre-configuration information that the first control channel occupies first time-domain symbol to fourth time-domain symbol in one time unit, and thus it may be determined that the first control channel occupies first four time-domain symbols of the subframe n+4.

In an implementation, the first time offset information is used to indicate a time offset of the time-domain starting position of the first control channel relative to a starting position of a radio frame (for example, including 10 subframes), or, the first time offset information is used to indicate a time offset of the time-domain starting position of the first control channel relative to a starting position of a radio frame period (for example, including 10,240 subframes), or, the first time offset information is used to indicate a time offset of the time-domain starting position of the first control channel relative to a starting position of a resource pool.

In an implementation, the first control information is used to schedule multiple first control channels, and the first indication field includes multiple pieces of time offset information. Time-domain resources for the multiple first control channels may be determined through the multiple pieces of time offset information. For example, the first control information is used to schedule two first control channels, the first indication field includes two pieces of time offset information, the first time offset information is used to determine a time-domain resource for the first control channel 1, and the second time offset information is used to determine a time-domain resource for the first control channel 2. The time offset information is relative to the second control channel, or the time-domain starting position in the radio frame, or the time-domain starting position in the radio frame period.

In an implementation, the first control information is used to schedule multiple first control channels, a time-domain resource for the first control channel 1 may be explicitly or implicitly determined, and time-domain resources for the other first control channels may be determined through the time-domain resource for the first control channel 1 and the first time offset information. For example, the first control information is used to schedule two first control channels. A time-domain resource for the first control channel 1 may be implicitly determined. For example, a subframe corresponding to the first control channel 1 may form a determined relationship with a subframe where the first control information is received, the first control information is received in a subframe n, and the first control channel 1 is sent in a subframe n+4. A time-domain resource for the first control channel 2 is determined by adding the first time offset information to the time-domain resource for the first control channel 1. For example, if the first time offset information is p, a subframe corresponding to the first control channel 2 is n+4+p. For another example, the first control information is used to schedule two first control channels, the first control information includes two pieces of time offset information p1 and p2, the first control information is received in the subframe n, the first control channel 1 is sent in a subframe n+p1, and the first control channel 2 is sent in a subframe n+p2.

2: The first indication field includes second index information, and the second index information is used to determine a time unit occupied by the starting position of the first control channel.

Herein, the second index information may be a subframe number in a radio frame or a subframe number in a radio frame period, etc., and the time-domain starting position of the first control channel may be directly determined through the second index information.

For example, the DCI carries a subframe number of the PSCCH in a radio frame, the radio frame including 10 subframes, so that a range of the subframe number is [0, 9]. If the subframe number carried in the DCI is 7, the PSCCH scheduled by the DCI is transmitted in the subframe 7 in the radio frame. Furthermore, considering a processing delay of the terminal, if the terminal receives the DCI in a subframe 6, the processing delay is 2 ms and the subframe number carried in the DCI is 7, the terminal successfully detects the DCI in a subframe 8 and may schedule the PSCCH in a subframe 7 in a next radio frame.

It is to be noted that the radio frame or the radio frame period may be determined based on a DL or determined based on an SL.

In an implementation, the first indication field includes multiple pieces of index information. The first control information is used to schedule multiple first control channels, and time-domain resources for the multiple first control channels may be determined through the multiple pieces of index information. For example, the first control information is used to schedule two first control channels, the first indication field includes two pieces of index information, the first index information is used to determine a time-domain resource for the first control channel 1, and the second index information is used to determine a time-domain resource for the first control channel 2. Optionally, the index information is a subframe number in a radio frame or a subframe number in a radio frame period.

3: The first indication field includes a bitmap, each bit in the bitmap corresponds to a time unit, and whether the time unit corresponding to each bit is configured for transmission of the first control channel or not is determined through a value of the bit in the bitmap. For any bit in the bitmap, if the value of the bit is the first value, the time unit corresponding to the bit is configured for transmission of the first control channel; and if the value of the bit is the second value, the time unit corresponding to the bit is not configured for transmission of the first control channel.

For example, the first indication field includes a bitmap, and the bitmap includes 10 bits corresponding to 10 subframes respectively. When a certain bit is 1, it is indicated that the subframe is configured to transmit the first control channel. Furthermore, a resource for the first control channel in each subframe may be determined in the manner of pre-configuration or configuration by the network. For example, the first control channel occupies four symbols from a first symbol, and the time-domain resource for the first control channel may be determined through bitmap information and the configuration information. Furthermore, multiple bits of the bitmap may be set to be 1 to configure time-domain transmission resources for multiple first control channels.

For the time-domain resource for the first control channel, the time-domain resource for the first control channel occupies one time-domain symbol or multiple continuous time-domain symbols. Herein, the time-domain length information of the first control channel is determined through a second indication field in the first control information. Specifically, the second indication field in the first control information represents the number of time units occupied by the time-domain resource for the first control channel. The time unit may be a time-domain symbol, or an sTTI, or a subframe, or a slot or another fixed time length.

In the implementation, the time units for transmission of the first control channel may be determined through the first indication field, and the time-domain resource for the first control channel in the time unit may be determined in the manner of pre-configuration or configuration by the network. For example, it is pre-configured or configured by the network that the first control channel occupies first k time-domain symbols in one time unit. In such case, in combination with the first indication field, the time unit where the first control channel is located may be determined, and the time-domain resource for the first control channel in the time unit may be determined.

A second manner: the time-domain resource information of the first control channel includes the time-domain starting position information and/or the time-domain length information, and the time-domain starting position information and/or the time-domain length information are/is determined through a third indication field in the first control information.

Herein, that the time-domain starting position information and/or the time-domain length information are/is determined through the third indication field in the first control information may be implemented through the following manners.

1: The third indication field in the first control information includes a second parameter, and the second parameter is used to determine the time-domain starting position and time-domain length of the first control channel.

Herein, the second parameter may be calculated according to the time-domain starting position and time-domain length of the first control channel, different second parameters are calculated according to different time-domain starting positions and different time-domain lengths, and the corresponding time-domain starting position and time-domain length of the first control channel may be determined according to the second parameter.

2: The third indication field in the first control information includes a second bitmap, each bit in the second bitmap corresponds to a time unit, and whether the time unit corresponding to each bit is configured for transmission of the first control channel or not is determined through a value of the bit in the second bitmap. For any second bit in the second bitmap, if the value of the second bit is the first value, the time unit corresponding to the second bit is configured for transmission of the first control channel; and if the value of the second bit is the second value, the time unit corresponding to the second bit is not configured for transmission of the first control channel.

For example, if the time unit is a time-domain symbol, when the value of a certain bit in the second bitmap is 1, it is indicated that the time-domain symbol corresponding to the bit is configured for transmission of the PSCCH; and when the value of a certain bit in the second bitmap is 0, it is indicated that the time-domain symbol corresponding to the bit is not configured for transmission of the PSCCH.

3: The third indication field in the first control information includes third index information, the third index information is used to determine a first time-domain resource corresponding to the third index information from second configuration information, and the second configuration information includes at least one correspondence between index information and a time-domain resource. The second configuration information is pre-configured or configured by the network.

For example, the DCI includes an index in a table, and each index in the table corresponds to an allocated time-domain resource, for example, a time-domain resource determined through a length of the time-domain resource and a starting position of the time-domain resource, or a time-domain resource determined through one or more time unit indexes, or a time-domain resource determined through a bitmap or a time-domain resource determined in another manner.

In the solution, the time-domain resource information of the first control channel is explicitly indicated through the DCI, and not limited thereto, the time-domain resource information of the first control channel may also be implicitly indicated through the DCI. Specifically, the time-domain resource for the first control channel is determined based on the time-domain resource for the second control channel. For example, the terminal determines a transmission moment of the PSCCH according to a moment when the DCI is received. For example, the DCI is received in a subframe n, and the PSCCH is sent in a subframe n+4. Each PSCCH starts from a first symbol of the subframe, or each PSCCH ends at a last symbol of the subframe. The number of symbols occupied by each PSCCH may be pre-configured or configured by the network.

In an implementation, the first control information may explicitly indicate the time-domain resource and/or frequency-domain resource for the first data channel, and the time-domain resource for the first control channel may be implicitly determined through the time-domain resource for the first data channel or the time-domain resource for the second control channel, or, the frequency-domain resource for the first control channel may be implicitly determined through the frequency-domain resource for the first data channel. In such case, the first control information does not include time-domain resource indication information for the first control channel or frequency-domain resource indication information for the first control channel.

In the solution of the embodiment of the disclosure, the first control information includes frequency-domain resource information corresponding to one first control channel and/or time-domain resource information corresponding to one first control channel, or, the first control information includes frequency-domain resource information corresponding to multiple first control channels and/or time-domain resource information corresponding to multiple first control channels.

In an implementation, the time-domain resource for the first data channel may be determined based on the time-domain resource for the first control channel or the time-domain resource for the second control channel and is not required to be explicitly indicated. The first control information may include the frequency-domain resource for the first data channel and/or time-domain resource for the first data channel and may also not include the frequency-domain resource for the first data channel and/or time-domain resource for the first data channel. Under the condition that the first control information includes the frequency-domain resource for the first data channel and/or time-domain resource for the first data channel, the frequency-domain resource for the first data channel and/or time-domain resource for the first data channel may be determined in the following manners.

3) The frequency-domain resource information of the first data channel may be implemented through the following manners.

A first manner: the first control information includes a third bitmap, the third bitmap is used to determine the frequency-domain resource for the first data channel, each bit in the third bitmap corresponds to a frequency-domain unit in the system, and whether the frequency-domain unit corresponding to each bit is configured for transmission of the first data channel or not is determined through a value of the bit in the third bitmap. For any third bit in the third bitmap, if the value of the third bit is the first value, the frequency-domain unit corresponding to the third bit is configured for transmission of the first data channel; and if the value of the third bit is the second value, the frequency-domain unit corresponding to the third bit is not configured for transmission of the first data channel.

Herein, the granularity of the frequency-domain unit is one of: PRB, RBG or sub-band. If the granularity of the frequency-domain unit is RBG or sub-band, an RBG or a sub-band includes K continuous PRBs.

For example, the system bandwidth is 20 MHz, there are totally 100 PRBs, the granularity of the frequency-domain unit is sub-band, and each sub-band includes 5 PRBs. In such case, the third bitmap includes 20 bits corresponding to the 20 sub-bands respectively. When the value of a certain bit in the third bitmap is 1, it is indicated that the frequency-domain unit corresponding to the bit is configured for transmission of the PSSCH. When the value of a certain bit in the third bitmap is 0, it is indicated that the frequency-domain unit corresponding to the bit is not configured for transmission of the PSSCH. The sub-bands for transmission of the PSSCH may be continuous in the frequency domain or discontinuous in the frequency domain.

A second manner: the first control information includes a third parameter, and the third parameter is used to determine a starting position of the frequency-domain resource for the first data channel and/or a length of the frequency-domain resource for the first data channel. The frequency-domain resource is continuously allocated.

In an implementation, when a frequency-domain starting position of the first control channel is the same as a frequency-domain starting position of the first data channel, or the frequency-domain starting position of the first control channel and the frequency-domain starting position of the first data channel have a one-to-one correspondence, the third parameter is used to determine the length of the frequency-domain resource corresponding to the first data channel. In another implementation, when a frequency-domain ending position of the first control channel is the same as a frequency-domain ending position of the first data channel, the third parameter is used to determine the length of the frequency-domain resource corresponding to the first data channel. For example, when a frequency-domain starting position of the PSCCH and a frequency-domain starting position of the corresponding PSSCH are the same, the frequency-domain starting position of the PSSCH may be determined based on the frequency-domain starting position of the PSCCH, and the length of the frequency-domain resource for the PSSCH is represented through the third parameter.

In an implementation, when the first control information is used to schedule transmission of multiple data channels, the multiple data channels at least include the first data channel and a second data channel, and the third parameter is used to determine lengths of frequency-domain resources corresponding to the multiple data channels and a starting position of the frequency-domain resource corresponding to the second data channel. In the embodiment, if the starting position of the frequency-domain resource for the first data channel and the starting position of the frequency-domain resource of the first control channel have a one-to-one correspondence, the starting position of the frequency-domain resource for the first data channel may be determined through the starting position of the frequency-domain resource for the first control channel; and if the starting position of the frequency-domain resource for the first data channel and the starting position of the frequency-domain resource for the first control channel do not has a one-to-one correspondence, the first control information includes another parameter configured to indicate the starting position of the frequency-domain resource for the first data channel. For example, when the DCI schedules two transmissions of the PSSCH (one is initial transmission and the other is retransmission), the third parameter represents the length of the frequency-domain resource for the PSSCH and a starting position of the other transmission of the PSSCH, the third parameter is determined by the length of the frequency-domain resource for the PSSCH and the starting position of the second transmission of the PSSCH, and in such case, the DCI includes another field configured to indicate a starting position of a frequency-domain resource for the first transmission of the PSSCH. For another example, when the DCI schedules four transmissions of the PSSCH (one is initial transmission and the other three are retransmissions), the third parameter includes frequency-domain starting positions of the four transmissions and lengths of frequency-domain resources. If the lengths of the frequency-domain resources for the four transmissions are the same, the third parameter is only required to indicate the length of one frequency-domain resource, otherwise is required to indicate the lengths of the frequency-domain resources for the four transmissions respectively. If the starting position of the frequency-domain resource for the PSSCH may be determined through the position of the frequency-domain resource for the PSCCH corresponding to the PSSCH (for example, frequency-domain starting positions of the four transmissions of the PSSCH are the same and the frequency-domain starting position of the first transmission of the PSSCH and the frequency-domain starting position of the corresponding PSCCH have a one-to-one correspondence), the third parameter may not include the frequency-domain starting positions of the four transmissions. If the frequency-domain starting positions of the four transmissions are the same or a frequency-hopping manner is adopted for the four transmissions (namely the frequency-domain starting positions of the subsequent three transmissions may be determined through the frequency-domain starting position of the first transmission and a frequency-hopping criterion), the third parameter may include only one frequency-domain starting position.

In an embodiment, the third parameter is determined by the starting position and length of the frequency-domain resource for the first data channel. For example, the third parameter is an RIV, and the RIV corresponds to an index (n_PRB_start) of a starting PRB of the frequency-domain resource for the PSSCH and the number (L_PRB) of continuously allocated PRBs. The RIV is determined through the following formula.

If $(L\_PRB-1) \leq \lfloor (L\_PRB)/2 \rfloor$, $RIV = N\_PRB(L\_PRB-1) + n\_PRB\_start$ otherwise $RIV = N\_PRB(N\_PRB - L\_PRB + 1) + (N\_PRB - 1 - n\_PRB\_start)$ N_PRB represents the total number of PRBs in a resource pool. In the embodiment, N_PRB may also represent the total number of PRBs in a BWP or the total number of PRBs in a carrier, and no limits are made thereto in the embodiment. In the embodiment, the granularity of the frequency-domain resource may also be RBG or sub-band, and no limits are made thereto in the embodiment.

A third manner: the first control information includes fourth index information, the fourth index information is used to determine a second frequency-domain resource corresponding to the fourth index information from third configuration information, and the third configuration information includes at least one correspondence between index information and a frequency-domain resource. The third configuration information is pre-configured or configured by the network. The third configuration information is pre-configured or configured by the network, when the third configuration information is configured by the network, the network may transmit the third configuration information through the RRC signaling, or the broadcast information or the DL control signaling.

For example, the DCI includes an index in a table, and each index in the table corresponds to an allocated frequency-domain resource, for example, a frequency-domain resource determined through a length and a starting position, or a frequency-domain resource determined through one or more frequency-domain unit indexes, or a frequency-domain resource determined through a bitmap or a frequency-domain resource determined in another manner.

4) For the frequency-domain resource for the first data channel, the first control information further includes first indication information, and the first indication information being used to indicate an allocation type of the frequency-domain resource for the first data channel.

In an implementation, the first indication information is represented through N bits in the first control information, N is an integer greater than or equal to 1, and different values of the N bits correspond to different allocation types of frequency-domain resources. For example, the first indication information is represented through one bit, when a value of the bit is 1, it is indicated that the allocation type of frequency-domain resource for the first data channel is type0, and when the value of the bit is 0, it is indicated that the allocation type of frequency-domain resource for the first data channel is type1. Type0 represents that the frequency-domain resource is discrete and type1 represents that the frequency-domain resource is continuous. In case of more frequency-domain resource allocation types, the first indication information may be represented through more bits.

5) The time-domain resource information of the first data channel may be implemented through the following manners.

A first manner: the time-domain resource information of the first data channel includes time-domain starting position information and/or time-domain length information, the time-domain starting position information is determined through a fourth indication field in the first control information, and the time-domain length information is determined through a fifth indication field in the first control information.

Herein, if the time-domain resources for the first data channel and the first control channel and/or the second control channel are continuous or the time-domain resources for the first data channel and the first control channel and/or the second control channel have a correspondence, a time-domain starting position of the first data channel may be determined based on the time-domain starting position of the first control channel and/or the second control channel, so that the time-domain starting position of the first data channel is not required to be determined through the fourth indication field in the first control information. If the time-domain resources for the first data channel and the first control channel and/or the second control channel are discontinuous and the time-domain resources for the first data channel and the first control channel and/or the second control channel do not have the correspondence, the time-domain starting position of the first data channel is required to be determined through the fourth indication field in the first control information.

Herein, that the time-domain starting position information is determined through the fourth indication field in the first control information may be implemented through the following manners.

1: The fourth indication field includes second time offset information, and the second time offset information is used to determine a time offset of the time-domain resource for the first data channel relative to the time-domain resource for the second control channel or the first control channel.

Herein, the granularity of the time unit is one of: a time-domain symbol, a subframe, a slot, an sTTI, or a fixed time length. The granularity of the time offset is one of: a time-domain symbol, a subframe, a slot, an sTTI, or a fixed time length. Not limited thereto, the granularity of the time unit or the time offset may also be another parameter representing a time length.

The time-domain resource for the first data channel may be determined through the second time offset information and the time-domain resource for the first control channel/the second control channel. Herein, the time-domain resource includes the time-domain starting position and/or the time length (i.e., the number of time units that are occupied).

For example, referring to FIG. 7(a), the PSCCH and the PSSCH scheduled by PSCCH are not in the same subframe, first three symbols in each subframe are PSCCH resources, and other symbols are PSSCH resources. In such case, the DCI may carry a subframe offset of the PSSCH relative to the PSCCH, and thus a subframe position of the PSSCH may be determined according to a subframe allocated for the PSCCH in the DCI and the subframe offset carried therein. The first three symbols in the subframe corresponding to the PSSCH are candidate PSCCH resources, so that the PSSCH starts from the fourth symbol, and furthermore, a specific starting subframe and starting symbol position of the PSSCH may be determined. Optionally, if the starting position of the PSSCH in a subframe is unfixed, the time offset information further includes offset information or index information of a time-domain symbol for the PSSCH in the subframe. The time-domain starting position of the PSSCH may be determined in combination with the subframe offset in the DCI and the offset information or index information of the time-domain symbol in the subframe.

2: The fourth indication field includes time index information, and the time index information is used to determine the time-domain starting position of the first data channel.

For example, the time index information may be a time unit number in a radio frame or a time unit number in a radio frame period, etc., the time unit is a time-domain symbol or a subframe or a slot or an sTTI or a fixed time length, and the time-domain starting position of the first data channel may be directly determined through the time index information. For example, referring to FIG. 7(a), the PSCCH and the PSSCH scheduled by PSCCH are not in the same subframe, the first three symbols in each subframe are PSCCH resources, and the other symbols are PSSCH resources. In such case, the DCI may carry a subframe number for the PSSCH in a radio frame. The radio frame includes 10 subframes, so that a range of the subframe number is [0, 9]. If the subframe number carried in the DCI is 7, the DCI is configured to schedule the PSSCH in a subframe 7 in the radio frame. In the subframe 7, first three symbols are candidate PSCCH resources, so that the PSSCH starts from the fourth symbol, and furthermore, the specific starting subframe and starting symbol position of the PSSCH may be determined. Furthermore, considering a processing delay of the terminal, if the terminal receives the DCI in a subframe 6, the processing delay is 2 ms and the subframe number carried in the DCI is 7, the terminal successfully detects the DCI in a subframe 8 and may schedule the PSSCH in a subframe 7 in a next radio frame.

For the time-domain resource for the first data channel, the time-domain resource for the first data channel occupies one time unit or multiple continuous time units. Herein, that the time-domain length information of the first data channel is determined through the fifth indication field in the first control information may be implemented through the following manner.

The fifth indication field is used to determine the number of time units occupied by the time-domain resource for the first data channel. Herein, the granularity of the time unit is one of: a time-domain symbol, a subframe, a slot, an sTTI, or a fixed time length. Not limited thereto, the granularity of the time unit may also be another parameter representing a time length.

For example, in FIG. 5(a), a subframe includes 14 symbols, the PSCCH occupies the first four symbols of the subframe, the other symbols in the subframe may be configured for transmission of the PSSCH, and the PSSCH may occupy one or more subframes, so that the fifth indication field may indicate the number of the subframes occupied by the PSSCH, or the fifth indication field may indicate the number of the symbols occupied by the PSSCH. For example, if the time unit takes subframe as the granularity and the fifth indication field indicates that the PSSCH occupies two time units, the PSSCH scheduled by the DCI occupies two continuous adjacent subframes, and the time-domain resource occupied by the PSSCH may be determined in combination with the starting position of the time-domain resource for the PSSCH.

In an implementation, the first control information is used to schedule multiple first data channels, and the fourth indication field includes multiple pieces of time offset information or multiple pieces of time index information. Time-domain resources for the multiple first data channels may be determined through the multiple pieces of time offset information or the multiple pieces of time index information. For example, the first control information is used to schedule two first data channels, the first indication field includes two pieces of time offset information, the first time offset information is used to determine a time-domain resource for the first data channel 1, and the second time offset information is used to determine a time-domain resource for the first data channel 2. The time offset information is relative to the second control channel, or the first control channel, or the time-domain starting position in the radio frame, or the time-domain starting position in the radio frame period.

In an implementation, when the time-domain resource for the first data channel occupies multiple continuous time units, the multiple time units include a first time unit and at least one second time unit. If the second time unit includes a control channel resource, the time-domain resource for the first data channel occupies the control channel resource in the second time unit. For example, when the PSSCH occupies multiple continuous time units, the PSSCH may occupy PSCCH resources of the other time units except the first time unit. As illustrated in FIG. 5, the PSSCH scheduled in a third subframe occupies two subframes, and the PSSCH may occupy a PSCCH resource of a fourth subframe.

A second manner: the time-domain resource information of the first data channel includes the time-domain starting position information and/or the time-domain length information, and the time-domain starting position information and/or the time-domain length information are/is determined through a sixth indication field in the first control information.

Herein, that the time-domain starting position information and/or the time-domain length information are/is determined through the sixth indication field in the first control information may be implemented through the following manners:

1: The sixth indication field in the first control information includes a fourth parameter, and the fourth parameter is used to determine the time-domain starting position and time-domain length of the first data channel.

Herein, the fourth parameter may be calculated according to the time-domain starting position and time-domain length of the first data channel, different fourth parameters are calculated according to different time-domain starting positions and different time-domain lengths, and the corresponding time-domain starting position and time-domain length of the first data channel may be determined according to the fourth parameter.

2: The sixth indication field in the first control information includes a fourth bitmap, each bit in the fourth bitmap corresponds to a time unit, and whether the time unit corresponding to each bit is configured for transmission of the first data channel or not is determined through a value of the bit in the fourth bitmap. For any fourth bit in the fourth bitmap, if the value of the fourth bit is the first value, the time unit corresponding to the fourth bit is configured for transmission of the first data channel; and if the value of the fourth bit is the second value, the time unit corresponding to the fourth bit is not configured for transmission of the first data channel.

Herein, the granularity of the time unit is one of: a time-domain symbol, a subframe, a slot, an sTTI, or a fixed time length. Not limited thereto, the granularity of the time unit may also be another parameter representing a time length.

For example, when the value of a certain bit in the fourth bitmap is 1, it is indicated that the time-domain unit corresponding to the bit is configured for transmission of the PSSCH; and when the value of a certain bit in the fourth bitmap is 0, it is indicated that the time-domain unit corresponding to the bit is not configured for transmission of the PSSCH.

3: The sixth indication field in the first control information includes fifth index information, the fifth index information is used to determine a second time-domain resource corresponding to the fifth index information from fourth configuration information, and the fourth configuration information includes at least one correspondence between index information and a time-domain resource. The fourth configuration information is pre-configured or configured by the network. When the fourth configuration information is used by the network, the network may transmit the fourth configuration information through the RRC signaling, or the broadcast information or the DL control signaling.

For example, the DCI includes an index in a table, and each index in the table corresponds to an allocated time-domain resource, for example, a time-domain resource determined through a length and a starting position of the time-domain resource, or a time-domain resource determined through one or more time unit indexes, or a time-domain resource determined through a bitmap or a time-domain resource determined in another manner.

In the implementation, the time units for transmission the first data channel may be determined through the fourth indication field or the sixth indication field, and the time-domain resource for the first data channel in the time unit may be determined in the manner of pre-configuration or configuration by the network. For example, it is pre-configured or configured by the network that the first data channel occupies last m time-domain symbols in one time unit. In such case, in combination with the first indication field, the time unit where the first data channel is located may be determined, and the time-domain resource for the first data channel in the time unit may be determined.

In the solution of the embodiment of the disclosure, the number of PRBs available to the terminal on a transmission resource for the first data channel that is scheduled may be a multiple of 2, 3 and 5.

Optionally, in the solution of the embodiment of the disclosure, a last time-domain symbol of a last time unit occupied by the first data channel is not configured for data transmission but as a GP.

Herein, for the condition that the first data channel occupies continuous time units, a last symbol of the last time unit is not configured for data transmission. For the condition that the first data channel occupies discontinuous time units, a last symbol of each time unit is not configured for data transmission.

In the solution of the embodiment of the disclosure, the first control information includes frequency-domain resource information corresponding to one first data channel and/or time-domain resource information corresponding to one first data channel, or, the first control information includes frequency-domain resource information corresponding to multiple first data channels and/or time-domain resource information corresponding to multiple first data channels.

In addition, the first control information in the embodiment of the disclosure further includes at least one of:
  second indication information, the second indication information being used to determine transmission times of the first data channel;
  redundancy version information of the first data channel;
  codebook information for the first data channel;
  transmission scheme information for the first data channel, for example, single-antenna-port transmission, transmission diversity and beamforming;
  DMRS pattern information for the first data channel;
  power information of the first data channel;
  information of a power difference between the first data channel and the first control channel;
  a CIF, the CIF being configured to determine carrier information for transmission of the first control channel and/or the first data channel;
  BWP indication information, the BWP indication information being used to determine BWP information for transmission of the first control channel and/or the first data channel;
  resource pool indication information, the resource pool indication information being used to determine resource pool information for transmission of the first control channel and/or the first data channel;
  third indication information, the third indication information being used to determine a transmission resource for a feedback channel, for example, a time-domain resource and/or frequency-domain resource for the feedback channel, or a maximum delay of feedback information and the present PSSCH;
  fourth indication information, the fourth indication information being used to determine a transmission mode for an UL control channel (for example, a PUCCH);
  fifth indication information, the fifth indication information being used to determine a transmission mode for the first control channel and/or the first data channel;
  sixth indication information, the sixth indication information being used to determine whether frequency-hopping transmission is adopted for the first data channel or not;
  seventh indication information, the seventh indication information being used to indicate an MCS for the first data channel; and
  eighth indication information, the eighth indication information being used to determine transmission times of the first control channel.

In an implementation, the first control information may schedule multiple PSSCH transmissions, including a first transmission and retransmissions, and the DCI includes the second indication information, configured to indicate the number of PSSCH transmissions scheduled by the DCI. Furthermore, the DCI may carry the redundancy version information, configured to indicate a redundancy version of the presently scheduled PSSCH. Under the condition that multiple PSSCH transmissions are supported, a redundancy version number corresponding to each transmission may be predefined or configured by the network, so that the specific serial number of a present PSSCH transmission may be determined through the redundancy version information carried in the DCI, and the transmissions may be merged at a receiver. In another embodiment, the DCI may carry the specific serial number of the present transmission in the multiple transmissions.

In an implementation, the first control information may schedule multiple PSCCH transmissions, including a first transmission and retransmissions, and the DCI includes the eighth indication information, configured to indicate the number of PSCCH transmissions scheduled by the DCI.

In an implementation, one of multiple candidate transmission schemes may be selected for transmission of the PSSCH, and the transmission scheme includes single-antenna-port transmission, transmission diversity, beamforming and another possible multi-antenna transmission scheme. The DCI may carry the transmission scheme information, configured to indicate the transmission scheme adopted for the PSSCH scheduled by the DCI. Furthermore, transmission diversity may include SFBC, STBC, CDD and the like. Furthermore, the DCI may carry the codebook information under the transmission scheme.

In an implementation, the PSSCH may support multiple DMRS patterns, and the DCI may carry indication information configured to indicate the DMRS pattern information for the PSSCH scheduled by the DCI, so that the receiver may adopt the corresponding DMRS pattern to demodulate the PSSCH.

In an implementation, the DCI may carry the power information, and the power information is used to indicate transmitting power of the PSSCH scheduled by the DCI or a power difference between the PSSCH and the corresponding PSCCH.

In an implementation, the SL supports multi-carrier transmission, and the DCI may carry the carrier indication information used to indicate carrier information for the PSCCH and PSSCH scheduled by the DCI. Furthermore, if cross-carrier scheduling is supported in multiple carriers of the SL, namely SCI sent in a first carrier schedules the PSSCH in a second carrier, the DCI carries first carrier indication information and second carrier indication information, the first carrier indication information being used to indicate a carrier for PSCCH transmission scheduled by the DCI and the second carrier indication information being used to indicate a carrier for PSSCH transmission scheduled by the DCI.

In an implementation, a carrier of the SL is divided into multiple BWPs, and the DCI may carry the BWP indication information used to indicate the BWP information for transmission of the PSCCH and PSSCH scheduled by the DCI. Furthermore, if cross-BWP scheduling is supported in the SL, namely SCI sent in a first BWP schedules the PSSCH in a second BWP, the DCI carries first BWP indication information and second BWP indication information, the first BWP indication information being used to indicate a BWP for PSCCH transmission scheduled by the DCI and the second BWP indication information being used to indicate a BWP for PSSCH transmission scheduled by the DCI.

In an embodiment, multiple resource pools are configured in the SL, and the DCI may carry the resource pool indication information used to indicate the resource pool information for the PSCCH and PSSCH scheduled by the DCI.

In an implementation, the first terminal transmits the SCI and the PSSCH scheduled by SCI, and the second terminal receives the PSSCH and is required to feed back information. How to determine the transmission resource for the feedback information is also a problem needing to be solved. The DCI may carry the third indication information, and the third indication information is used to determine the transmission resource for the feedback information. For example, the third indication information may be a piece of index information, the index information is used to determine the transmission resource for the feedback channel corresponding to the index information from third configuration information, and the third configuration information includes at least one correspondence between index information and a transmission resource for the feedback channel.

In an implementation, the network allocates the transmission resources transmitting the PSCCH and the PSSCH to the first terminal, the first terminal transmits the PSCCH and the PSSCH to the second terminal in a unicast manner according to the resources allocated by the network, the second terminal receives the PSSCH and transmits the feedback information to the first terminal, and the first terminal is required to transmit the feedback information to the network to assist the network in resource allocation for new data or retransmitted data. Therefore, the network simultaneously carries the fourth indication information in the DCI for allocating the transmission resources transmitting the PSCCH and the PSSCH to the first terminal, the indication information being used to indicate the transmission resource for the UL control channel and the UL control channel being used for the first terminal to transmit the feedback information transmitted by the SL. Optionally, the network transmits configurations of multiple UL control channels to the first terminal through the RRC signaling, the broadcast information and the like, and the fourth indication information is used for the first terminal to determine the UL control channel for transmitting the feedback information of the SL in combination with the fourth indication information and configuration information, sent by the network, of the UL control channels. The fourth indication information may be carried in one of the following manners.
1: The DCI includes one or more information fields, the one or more information fields being configured to determine the transmission resource for the UL control channel.
2: The fourth indication information is carried through an RNTI: different RNTIs correspond to different transmission resources for the UL control channel, the DCI carries RNTI information explicitly or implicitly, and the corresponding transmission resource for the UL control channel may be determined through the RNTI information carried in the DCI.
3: The fourth indication information is carried through different scrambling sequences: different scrambling sequences correspond to different transmission resources for the UL control channel, the scrambling sequence being used to scramble the DCI, so that the corresponding transmission resources for the UL control channel may be determined through different scrambling sequences scrambling the DCI.

In an implementation, the first control information includes the fifth indication information, and the fifth indication information is used to determine the transmission mode for the first control channel and/or the first data channel. The transmission mode includes unicast transmission, multicast transmission and broadcast transmission. A receiver of unicast transmission is only one terminal, a receiver of multicast transmission is a group of terminals, and a receiver of broadcast transmission is all terminals. When the network allocates the transmission resource of the SL to the terminal, the transmission mode corresponding to the transmission resource may be indicated at the same time. For example, the network allocates the transmission resources for the PSCCH and the PSSCH to the first terminal and indicates that the resource is configured for unicast transmission, so that the first terminal may transmit the PSCCH and the PSSCH to a target receiving terminal (i.e., the second terminal) of unicast transmission on the transmission resources allocated by the network. Optionally, when the network allocates the transmission resources for the PSCCH and the PSSCH to the first terminal, the fifth indication information indicating the transmission mode may be carried at the same time, and the first terminal transmits the PSCCH and the PSSCH according to the transmission mode indicated by the fifth indication information. Specifically, the fifth information may be carried in one of the following manners.
1: The DCI includes an information field, and the information field explicitly indicates the transmission mode for the SL.
2: The fifth indication information is carried through an RNTI: different RNTIs correspond to different transmission modes, the DCI carries RNTI information explicitly or implicitly, and the corresponding transmission mode may be determined through the RNTI information carried in the DCI.
3: The fifth indication information is carried through different scrambling sequences: different scrambling sequences correspond to different transmission modes, the scrambling sequence being used to scramble the DCI, so that the corresponding transmission modes may be determined through different scrambling sequences scrambling the DCI.

In an implementation, the first control information includes the sixth indication information, and the sixth indication information is used to determine whether frequency-hopping transmission is adopted for the first data channel or not. When the first control information is used to schedule multiple first data channels and the sixth indication information indicates that a frequency-hopping manner is adopted, the multiple first data channels are transmitted in the frequency-hopping manner.

In an implementation, the first control information includes the seventh indication information, and the seventh indication information is used to indicate the MCS used for the first data channel. When the network allocates the time-domain and/or frequency-domain resources for the first data channel, the MCS used for the first data channel may be indicated at the same time.

According to the technical solution of the embodiment of the disclosure, the PSCCH and/or the PSSCH are/is scheduled through the DCI in a PDCCH, so that time division transmission of the PSCCH and the PSSCH is implemented without increasing the detection complexity of a Rel-15 receiver and influencing a resource sensing and selecting process of a Rel-14 terminal.

It should be understood by those skilled in the art that the related descriptions about the device for control information transmission of the embodiments of the disclosure may be understood with reference to the related descriptions about the method for control information transmission of the embodiments of the disclosure.

FIG. 6(c) is a flowchart of a method for resource pool configuration according to an embodiment of the disclosure. As illustrated in FIG. 6(c), the resource pool configuration method includes the following step.

In 6013, a first terminal acquires first configuration information, the first configuration information being used to determine at least one of: a time-domain resource of a first resource pool, a frequency-domain resource of the first resource pool, a time-domain resource of a second resource pool or a frequency-domain resource of the second resource pool, a resource in the first resource pool is capable of transmitting a first control channel, the first control channel being used for transmission of SCI, a resource in the second resource pool is capable of transmitting a first data channel and the first data channel being used for transmission of SL data.

In the embodiment of the disclosure, a link between a terminal and a terminal is called an SL, control information transmitted between a terminal and a terminal is called SCI, the SCI being carried in an SL control channel (i.e., the first control channel), and data transmitted between a terminal and a terminal is SL data, the SL data being carried in an SL data channel (i.e., the first data channel).

In an implementation, the first control channel is called a PSCCH, the first data channel is called a PSSCH, a resource set capable of transmitting the first control channel is called the first resource pool (i.e., a PSCCH resource pool), a resource set capable of transmitting the first data channel is called a second resource pool (i.e., a PSSCH resource pool), and time division is adopted for the first resource pool and the second resource pool.

In the embodiment of the disclosure, the first resource pool or the second resource pool is a set of transmission resources, may be a resource pool in LTE-V2X, and may also be a BWP in an NR system or another physical parameter that may be configured to represent a transmission resource set. No limits are made thereto in the disclosure.

In the embodiment of the disclosure, at least one of the time-domain resource of the first resource pool, frequency-domain resource of the first resource pool, the time-domain resource of the second resource pool, or frequency-domain resource of the second resource pool are configured through the first configuration information. In an implementation, the first configuration information is configured by a network device or is pre-configured. Herein, through the first configuration information, the time-domain resource of the first resource pool and/or frequency-domain resource of the first resource pool may be independently configured; or the time-domain resource of the second resource pool and/or frequency-domain resource of the second resource pool may be independently configured; or the time-domain resources and/or frequency-domain resources of the first resource pool and the second resource pool may be simultaneously configured.

How to configure the time-domain resources and/or frequency-domain resources of the two resource pools through the first configuration information will be described below.

1) The first configuration information is used to determine the time-domain resource of the first resource pool and/or frequency-domain resource of the first resource pool, and the first configuration information includes at least one of:
starting position information of the time-domain resource of the first resource pool;
length information of the time-domain resource of the first resource pool;
density information of the time-domain resource of the first resource pool;
time-domain length information of the first control channel transmitted in the first resource pool;
starting position information of the frequency-domain resource of the first resource pool;
information of a number of frequency-domain units occupied by the frequency-domain resource of the first resource pool;
information of a size of the frequency-domain units corresponding to the frequency-domain resource of the first resource pool; and
information of a number of frequency-domain units occupied by the first control channel transmitted in the first resource pool.

1.1) The starting position information of the time-domain resource of the first resource pool is determined through a first parameter, and the first parameter is used to indicate information of a first time unit in the first resource pool. A granularity of the time unit is one of: a subframe, a slot, an sTTI or a fixed time length. Unless otherwise specified hereinafter, the granularity of the time unit is one of: a subframe, a slot, an sTTI or a fixed time length.

For example, the first parameter is a piece of time index information, each piece of time index information corresponds to a time unit, the time index information may be a subframe number in a radio frame or a subframe number in a radio frame period, etc., and the information of the first time unit in the first resource pool may be determined through the time index information in the first parameter. For example, a radio frame includes 10 subframes, so that a range of the subframe number is [0, 9]. If the first parameter is a subframe number 7, the first time unit in the first resource pool is a subframe 7 in a radio frame. For another example, a radio frame period includes 10,240 subframes, so that the range of the subframe number is [0, 10,239]. If the first parameter is a subframe number 100, the first time unit in the first resource pool is a subframe 100 in a radio frame period.

For another example, the first parameter is a time offset, and the time offset is an offset relative to determined time, for example, relative to a first subframe (i.e., a subframe 0) in a radio frame period.

1.2) The length information of the time-domain resource of the first resource pool is determined through a second parameter, and the second parameter is used to indicate: information of time units for transmission of the first control channel in the first resource pool, or a number of time units for transmission of the first control channel in the first resource pool.

Herein, a length of the time-domain resource of the first resource pool takes time unit as a unit. The time-domain resource of the first resource pool may occupy multiple continuous time units and may also occupy multiple discrete time units. Specific time units including the time-domain resource of the first resource pool or the number of time units of the time-domain resource of the first resource pool may be determined through the second parameter.

For example, the second parameter includes a bitmap, each bit in the bitmap corresponds to a time unit, and a value of each bit indicates whether the time unit corresponding to the bit includes the time-domain resource of the first resource pool or not. For example, when the value of a certain bit is 0, it is indicated that the time unit corresponding to the bit does not include the time-domain resource of the first resource pool. When the value of a certain bit is 1, it is indicated that the time unit corresponding to the bit includes the time-domain resource of the first resource pool. Therefore, the specific time units including the time-domain resource of the first resource pool may be determined based on the bitmap, and the number of the time units including the time-domain resource of the first resource pool may further be determined. Furthermore, the bitmap may periodically repeat, so that all time-domain resources of the first resource pool may be determined. For example, a radio frame period includes 10,240 subframes, the bitmap includes 10 bits corresponding to 10 subframes respectively, and the bitmap may periodically repeat in the radio frame period, so that whether all the subframes in the radio frame period belong to the first resource pool or not may be determined.

For another example, the second parameter is a value used to indicate the number of the time units including the time-domain resource of the first resource pool. For example, a radio frame period includes 10,240 subframes, the second parameter is 1,024, and in such case, it is indicated that 1,024 subframes in the radio frame period belong to the first resource pool. Furthermore, in combination with the starting position information of the time-domain resource of the first resource pool, it is indicated that 1,024 subframes from a starting position of the time-domain resource belong to the first resource pool.

1.3) The density information of the time-domain resource of the first resource pool is determined through a third parameter, and the third parameter is used to indicate that one time unit in every K time units is a time unit for transmission of the first control channel in the first resource pool, K≤1.

For example, K=1 indicates that each time unit includes the time-domain resource of the first resource pool. K=2 indicates that one time unit in every two time units includes the time-domain resource of the first resource pool. For example, the first time unit includes the time-domain resource of the first resource pool, a third time unit includes the time-domain resource of the first resource pool, a fifth time unit includes the time-domain resource of the first resource pool, and so on. The third parameter indicates a density or period of the time-domain resource of the first resource pool.

Optionally, all time units in the first resource pool may be determined in combination with the first parameter and the second parameter. For example, a position of the first time unit of the first resource pool is determined through the first parameter, and it is determined through the third parameter that one time unit in every K time units is configured for transmission of the first control channel. Therefore, in combination with the first parameter and the third parameter, it may be determined that every K time units from the first time unit are configured for transmission of the first control channel.

1.4) The time-domain length information of the first control channel transmitted in the first resource pool is determined through a fourth parameter, and the fourth parameter is used to indicate: a number of time-domain symbols occupied by a time-domain resource for the first control channel transmitted in the first resource pool, or a number of time units occupied by a time-domain resource for the first control channel transmitted in the first resource pool.

After a specific time unit including the time-domain resource of the first resource pool is determined, specific time-domain symbols configured for transmission of the first control channel in the time unit are further required to be determined. Therefore, it is necessary to determine the time-domain length information corresponding to the first control channel and the starting position of the time-domain resource corresponding to the first control channel.

Herein, the time-domain length information of the first control channel transmitted in the first resource pool is determined through the fourth parameter, and the fourth parameter is used to indicate the number of the time-domain symbols occupied by the time-domain resource for the first control channel transmitted in the first resource pool or the number of the time units occupied by the time-domain resource for the first control channel transmitted in the first resource pool. In an implementation, a time unit includes M time-domain symbols, and the first control channel occupies N time-domain symbols, M and N being integers, M>1 and 1≤N<M. For example, the PSCCH may occupy P time-domain symbols in a subframe or a slot, P<14. Preferably, P=2 or P=3 or P=4. For another example, if the granularity of the time unit is sTTI, the PSCCH may occupy a length of an sTTI or occupy Q time-domain symbols, Q being a positive integer less than the number of symbols in the sTTI. For example, if an sTTI includes 7 time-domain symbols, Q may be 3 or 4. If an sTTI includes 3 or 4 time-domain symbols, the PSCCH occupies the length of an sTTI, i.e., 3 or 4 Orthogonal Frequency Division Multiplexing (OFDM) symbols.

In the embodiment of the disclosure, for determining the time-domain resource for the first control channel, it is necessary to determine the number of the time-domain symbols occupied by the time-domain resource for the first control channel, and it is also necessary to determine a starting position or ending position of the time-domain resource for the first control channel. A time-domain starting position or ending position of the first control channel in a time unit may be determined in a manner of pre-configuration or configuration by a network. Specifically, the starting position or ending position of the time-domain resource for the first control channel may be determined in the following manners.

1: The starting position of the time-domain resource for the first control channel transmitted in the first resource pool is at a first time-domain symbol of a time unit.

For example, if K=1 in 1.3), namely each time unit is configured for transmission of the PSCCH, the time-domain resource for the PSCCH starts from a first time-domain symbol of each time unit. Herein, the granularity of the time unit is one of: a subframe, a slot, an sTTI or a fixed time length.

For another example, if the granularity of the time unit is sTTI, an sTTI includes 7 symbols and the PSCCH occupies 3 symbols, the first three symbols in the sTTI are PSCCH resources, and furthermore, every K sTTIs include a PSCCH resource. If an sTTI includes 3 or 4 symbols (in such case, in a subcarrier spacing 15 kHz, 1 ms corresponds to 14 symbols that may be divided into 4 sTTIs), the PSCCH occupies the length of an sTTI, and every K sTTIs include a PSCCH resource, for example, K=4, referring to FIG. 7(b).

2: The ending position of the time-domain resource for the first control channel transmitted in the first resource pool is at a last time-domain symbol of a time unit.

For example, if K=1 in 1.3), namely each time unit is configured for transmission of the PSCCH, the time-domain resource for the PSCCH ends at a last time-domain symbol of each time unit. Herein, the granularity of the time unit is one of: a subframe, a slot, an sTTI or a fixed time length.

For example, the PSCCH may be at last N symbols of a time unit. For example, a subframe includes 14 symbols, and a PSCCH occupies N=4 symbols. In a subframe, the PSCCH may occupy last four symbols of the subframe, and other symbols may be configured for transmission of the PSSCH. Furthermore, the last symbol of the subframe is not configured to transmit the PSCCH or the PSSCH but configured as a GP.

In the embodiment of the disclosure, the time-domain resource of the first resource pool may be determined through each parameter in 1.1) to 1.4). Not limited thereto, the time-domain resource of the first resource pool may also be determined through a bitmap. Specifically, the first configuration information includes the first bitmap, and the first bitmap is used to determine the time units occupied by the first resource pool. Furthermore, the first bitmap periodically repeats in a first time range.

For example, the first time range is a radio frame period (10,240 subframes), the first bitmap includes 10 bits, each bit is configured to indicate whether a subframe may be configured for the first resource pool or not, and the bitmap periodically repeats in the radio frame period, so that the specific subframes available for the first resource pool in the radio frame period are determined.

1.5) A starting position of a frequency-domain resource of the first resource pool is determined through a fifth parameter, and the fifth parameter is used to indicate a frequency-domain offset of the starting position of the frequency-domain resource of the first resource pool relative to a first reference position.

Herein, the first reference position may be a starting position of a carrier or a BWP, or another determined frequency-domain position, for example, a lowest PRB position of a synchronization resource, and the starting position of the frequency-domain resource of the first resource pool may be determined based on the frequency-domain offset and the first reference position. A granularity of the frequency-domain offset is one of: PRB, RBG or sub-band.

For example, the starting position of the frequency-domain resource of the first resource pool may be an offset N_RB_RP relative to the starting position of the carrier or the BWP, and in such case, a starting position of a first PSCCH resource is W*ceil(N_RB_RP/W), where ceil( ) represents a rounding-up operation, and W represents the number of PRBs in a frequency-domain unit.

1.6) The information of the number of the frequency-domain units occupied by the frequency-domain resource of the first resource pool is determined through a sixth parameter, and the sixth parameter is used to indicate the number of the frequency-domain units occupied by the frequency-domain resource of the first resource pool.

Herein, the sixth parameter is a value used to indicate the number of the frequency-domain units occupied by the frequency-domain resource of the first resource pool. The granularity of the frequency-domain unit is one of: PRB, RBG or sub-band. Unless otherwise specified hereinafter, the granularity of the frequency-domain unit is one of: PRB, RBG or sub-band.

For example, a carrier bandwidth is 20 MHz and includes 100 PRBs, and the granularity of the frequency-domain unit is sub-band. Each sub-band includes 10 PRBs, so that a sub-band index range is [0, 9]. The starting position of the frequency-domain resource of the first resource pool is a sub-band 1, the number of sub-bands that are occupied is 8, and in such case, it is indicated that the frequency-domain resource of the first resource pool is 8 sub-bands from the sub-band 1.

1.7) The information of a size of the frequency-domain units corresponding to the frequency-domain resource of the first resource pool is determined through a seventh parameter, and the seventh parameter is used to indicate the number of PRBs in the frequency-domain unit.

1.8) The information of a number of the frequency-domain units occupied by the first control channel transmitted in the first resource pool is determined through an eighth parameter, and the eighth parameter is used to indicate the number of the frequency-domain units occupied by the first control channel.

Herein, the eighth parameter is a value used to indicate the number of the frequency-domain units occupied by a frequency-domain resource for the first control channel.

For example, a resource occupied by each PSCCH resource in a frequency domain takes sub-band as a granularity, each sub-band includes U PRBs, and each PSCCH resource occupies V sub-bands. Furthermore, the number of the PRBs occupied by each PSCCH resource is a maximum integer that is less than or equal to U×V and may be exactly divided by 2, 3 and 5.

For example, if U=5 and V=8, each PSCCH occupies 40 PRBs.

For example, if U=10 and V=7, the number of the PRBs occupied by each PSCCH is a maximum integer that is less than or equal to 70 and may be exactly divided by 2, 3 and 5, i.e., 64. In such case, the PSCCH occupies 64 PRBs from a smallest PRB index of the PSCCH resource.

2) The first configuration information is used to determine the time-domain resource of the second resource pool and/or frequency-domain resource of the second resource pool, and the first configuration information includes at least one of:
   starting position information of the time-domain resource of the second resource pool;
   length information of the time-domain resource of the second resource pool;
   time-domain length information of the first data channel transmitted in the second resource pool;
   starting position information of the frequency-domain resource of the second resource pool;
   information of a number of frequency-domain units occupied by the frequency-domain resource of the second resource pool;
   information of a size of the frequency-domain units corresponding to the frequency-domain resource of the second resource pool; and
   information of a number of frequency-domain units occupied by the first data channel transmitted in the second resource pool.

2.1) The starting position information of the time-domain resource of the second resource pool is determined through a ninth parameter, and the ninth parameter is used to indicate information of a first time unit in the second resource pool.

Herein, the first time unit in the second resource pool may be the same as the first time unit in the first resource pool and may also be different from the first time unit in the first resource pool. When the first time unit in the second resource pool is the same as the first time unit in the first resource pool, the starting position information of the time-domain resource of the second resource pool may not be additionally configured.

In the embodiment of the disclosure, the ninth parameter is a piece of time index information, each piece of time index information corresponds to a time unit, the time index information may be a subframe number in a radio frame or a subframe number in a radio frame period, etc., and the information of the first time unit in the second resource pool may be determined through the time index information in the ninth parameter. For example, a radio frame includes 10 subframes, so that a range of the subframe number is [0, 9]. If the ninth parameter is a subframe number 4, the first time unit in the second resource pool is a subframe 4 in a radio frame. For another example, a radio frame period includes 10,240 subframes, so that the range of the subframe number is [0, 10,239]. If the ninth parameter is a subframe number 100, the first time unit in the second resource pool is a subframe 100 in a radio frame period.

For another example, the ninth parameter is a time offset, and the time offset is an offset relative to determined time, for example, relative to a first subframe (i.e., a subframe 0) in a radio frame period.

2.2) The length information of the time-domain resource of the second resource pool is determined through a tenth parameter, and the tenth parameter is used to indicate: information of time units for transmission of the first data channel in the second resource pool, or the number of time units for transmission of the first data channel in the second resource pool.

Herein, a length of the time-domain resource of the second resource pool takes time unit as a unit. The time-domain resource of the second resource pool may occupy multiple continuous time units and may also occupy multiple discrete time units. Specific time units including the time-domain resource of the second resource pool or the number of time units of the time-domain resource of the second resource pool may be determined through the tenth parameter.

For example, the tenth parameter includes a bitmap, each bit in the bitmap corresponds to a time unit, and a value of each bit indicates whether the time unit corresponding to the bit includes the time-domain resource of the second resource pool or not. For example, when the value of a certain bit is 0, it is indicated that the time unit corresponding to the bit does not include the time-domain resource of the second resource pool. When the value of a certain bit is 1, it is indicated that the time unit corresponding to the bit includes the time-domain resource of the second resource pool. Therefore, the specific time units including the time-domain resource of the second resource pool may be determined based on the bitmap, and the number of the time units including the time-domain resource of the second resource pool may further be determined. Furthermore, the bitmap may periodically repeat, so that all time-domain resources of the second resource pool may be determined. For example, a radio frame period includes 10,240 subframes, the bitmap includes 10 bits corresponding to 10 subframes respectively, and the bitmap may periodically repeat in the radio frame period, so that whether all the subframes in the radio frame period belong to the second resource pool or not may be determined.

For another example, the tenth parameter is a value used to indicate the number of the time units including the time-domain resource of the second resource pool. For example, a radio frame period includes 10,240 subframes, the tenth parameter is 1,024, and in such case, it is indicated that 1,024 subframes in the radio frame period belong to the second resource pool. Furthermore, in combination with the starting position information of the time-domain resource of the second resource pool, it is indicated that 1,024 subframes from a starting position of the time-domain resource belong to the second resource pool.

2.3) The time-domain length information of the first data channel transmitted in the second resource pool is determined through an eleventh parameter, and the eleventh parameter is used to indicate: a number of time-domain symbols occupied by a time-domain resource for the first data channel transmitted in the second resource pool, or a number of time units occupied by a time-domain resource for the first data channel transmitted in the second resource pool.

In a time unit, other time-domain symbols except time-domain symbols occupied by the first control channel are configured as resources for the first data channel. Herein, the time-domain length information of the first data channel transmitted in the second resource pool is determined through the eleventh parameter, and the eleventh parameter is used to indicate the number of the time-domain symbols occupied by the time-domain resource for the first data channel transmitted in the second resource pool. For example, the PSSCH may occupy N time-domain symbols, N≤14.

For example, referring to FIG. 5(a), the PSSCH scheduled in a second subframe occupies a symbol of the second subframe. Besides a subframe, the time unit may also be a slot or an sTTI or a fixed time length, for example, 1 ms or 0.5 ms. Particularly, for the sTTI, if the PSCCH does not occupy all symbols of a time unit, the remaining symbols of the time unit are PSSCH resources. If the PSCCH occupies all the symbols of a time unit, there is no PSSCH resources in the time unit, and the PSSCH may occupy another time unit.

Furthermore, a PSSCH may occupy multiple continuous time units. For example, in FIG. 5(a), the PSSCH scheduled in a third subframe occupies symbols of the third and fourth subframes.

In an embodiment, the eleventh parameter is used to indicate the number of the time units occupied by the first data channel. For example, a time unit is an sTTI, the first data channel occupies multiple continuous sTTI, and in such case, the eleventh parameter is used to indicate the number of the sTTIs occupied by the first data channel.

In the embodiment of the disclosure, for determining the time-domain resource for the first data channel, it is necessary to determine the number of the time-domain symbols occupied by the time-domain resource for the first data channel, and it is also necessary to determine a position of the time-domain resource for the first data channel. A time-domain starting position or ending position of the first data channel in a time unit may be determined in the manner of pre-configuration or configuration by the network. Specifically, the position of the time-domain resource for the first data channel may be determined in the following manners.

1: The starting position of the time-domain resource for the first data channel is at a next time-domain symbol of a last time-domain symbol occupied by the first control channel in a time unit, and furthermore, if the last time-domain symbol occupied by the first control channel is a last time-domain symbol of the time unit, the starting position of the time-domain resource for the first data channel is at a first available time-domain symbol of a next time unit of the time unit; or, 2: the starting position of the time-domain resource for the first control channel is at a next time-domain symbol of a last time-domain symbol occupied by the first data channel in a time unit, and furthermore, if the last time-domain symbol occupied by the first data channel is a last time-domain symbol of the time unit, the starting position of the time-domain resource for the first control channel is at a first available time-domain symbol of a next time unit of the time unit.

Optionally, in the solution of the embodiment of the disclosure, a last time-domain symbol of a last time unit occupied by the first data channel is not configured for data transmission but as a GP. Furthermore, if a PSSCH occupies multiple continuous time units, a last symbol of the last time unit is configured as a GP only.

Optionally, in the solution of the embodiment of the disclosure, a last time-domain symbol of the time unit occupied by the first control channel is not configured for control information transmission but as the GP.

In the embodiment of the disclosure, the time-domain resource of the second resource pool may be determined through each parameter in 2.1) to 2.3). Not limited thereto, the time-domain resource of the second resource pool may also be determined through a bitmap. Specifically, the first configuration information includes the second bitmap, and the second bitmap is used to determine the time unit occupied by the second resource pool. Furthermore, the second bitmap periodically repeats in a second time range.

For example, the second time range is a radio frame period (10,240 subframes), the second bitmap includes 10 bits, each bit is configured to indicate whether a subframe may be configured for the second resource pool or not, and the bitmap periodically repeats in the radio frame period, so that the specific subframes available for the second resource pool in the radio frame period are determined.

2.4) A starting position of the frequency-domain resource of the second resource pool is determined through a twelfth parameter, and the twelfth parameter is used to indicate a frequency-domain offset of the starting position of the frequency-domain resource of the second resource pool relative to the first reference position.

Herein, the first reference position may be a starting position of a carrier or a BWP, and the starting position of the frequency-domain resource of the second resource pool may be determined based on the frequency-domain offset and the first reference position. The granularity of the frequency-domain offset is one of: PRB, RBG or sub-band.

For example, the starting position of the frequency-domain resource of the second resource pool may be an offset N_RB_RP relative to the starting position of the carrier or the BWP, and in such case, a starting position of a first PSSCH resource is H*ceil(N_RB_RP/H), where ceil( ) represents a rounding-up operation, and H represents the number of PRBs in a frequency-domain unit.

2.5) The information of the number of the frequency-domain units occupied by the frequency-domain resource of the second resource pool is determined through a thirteenth parameter, and the thirteenth parameter is used to indicate the number of the frequency-domain units occupied by the frequency-domain resource of the second resource pool.

Herein, the thirteenth parameter is a value used to indicate the number of the frequency-domain units occupied by the frequency-domain resource of the second resource pool.

For example, a resource occupied by each PSSCH resource in the frequency domain takes sub-band as a granularity, each sub-band includes R PRBs, and each PSSCH resource occupies S sub-bands. Furthermore, the number of the PRBs occupied by each PSSCH resource is a maximum integer that is less than or equal to R×S and may be exactly divided by 2, 3 and 5.

For example, a carrier bandwidth is 20 MHz and includes 100 PRBs, and the granularity of the frequency-domain unit is sub-band. Each sub-band includes 10 PRBs, so that a sub-band index range is [0, 9]. The starting position of the frequency-domain resource of the second resource pool is a sub-band 1, the number of sub-bands that are occupied is 8, and in such case, it is indicated that the frequency-domain resource of the second resource pool is 8 sub-bands from the sub-band 1.

2.6) The information of a size of the frequency-domain units corresponding to the frequency-domain resource of the second resource pool is determined through a fourteenth parameter, and the fourteenth parameter is used to indicate the number of PRBs in the frequency-domain unit.

2.7) The information of the number of the frequency-domain units occupied by the first data channel transmitted in the second resource pool is determined through a fifteenth parameter, and the fifteenth parameter is used to indicate the number of the frequency-domain units occupied by the first data channel.

Herein, the fifteenth parameter is a value used to indicate the number of the frequency-domain units occupied by a frequency-domain resource for the first data channel. The granularity of the frequency-domain unit is one of: PRB, RBG or sub-band.

For example, a resource occupied by each PSSCH resource in the frequency domain takes sub-band as a granularity, each sub-band includes R PRBs, and each PSSCH resource occupies S sub-bands. Furthermore, the number of the PRBs occupied by each PSSCH resource is a maximum integer that is less than or equal to R×S and may be exactly divided by 2, 3 and 5.

For example, if R=6 and S=8, each PSSCH occupies 48 PRBs.

For example, if R=10 and S=7, the number of the PRBs occupied by each PSSCH is a maximum integer that is less than or equal to 70 and may be exactly divided by 2, 3 and 5, i.e., 64. In such case, the PSSCH occupies 64 PRBs from a smallest PRB index of the PSSCH resource.

In the embodiment of the disclosure, a relationship between the first resource pool and the second resource pool may be, but not limited to, that a time-domain resource occupied by the first resource pool and a time-domain resource occupied by the second resource pool are different.

The relationship between the first resource pool and the second resource pool is not limited to that the occupied time-domain resources are different, and may also be that the time-domain of the first resource pool is a subset of the time-domain resource of the second resource pool. For example, for a subframe, the second resource occupies the whole subframe, and the first resource pool occupies first N symbols in the subframe.

In the embodiment of the disclosure, the first resource pool and the second resource pool meet at least one of the following characteristics.

The starting position of the frequency-domain resource of the first resource pool and the starting position of the frequency-domain resource of the second resource pool are the same or different.

The size of the frequency-domain unit of the frequency-domain resource of the first resource pool and the size of the frequency-domain unit of the frequency-domain resource of the second resource pool are the same or different.

Time division is adopted for the first control channel and the first data channel corresponding to the first control channel.

The time-domain resource for the first control channel and the time-domain resource for the first data channel corresponding to the first control channel are adjacent or non-adjacent.

The starting position of the time-domain resource for the first control channel and the starting position of the time-domain resource for the first data channel corresponding to the first control channel have a one-to-one correspondence.

The starting position of the frequency-domain resource for the first control channel and the starting positions of the frequency-domain resource for the first data channel corresponding to the first control channel have a one-to-one correspondence.

The starting position of the frequency-domain resource for the first control channel and the starting position of the frequency-domain resource for the first data channel corresponding to the first control channel are the same or different.

Length of the frequency-domain resource for the first control channel and length of the frequency-domain resource for the first data channel corresponding to the first control channel are the same or different.

In the solution, that time division is adopted for the first control channel and the first data channel corresponding to the first control channel may include the following two implementations.

a) Transmission of the first control channel and the first data channel corresponding to the first control channel is time division in one time unit, the first control channel occupying A time-domain symbols in the one time unit, the first data channel occupying B time-domain symbols in the one time unit and the time-domain resource for the first control channel and the time-domain resource for the first data channel not overlapping, $1 \leq A < C$, $1 \leq B < C$ and $A+B \leq C$, where C is a number of time-domain symbols in one time unit, the granularity of the time unit being slot, subframe, sTTI or another fixed time length.

For example, as illustrated in FIG. 5(a), a time unit includes C=14 time-domain symbols, the first data channel and the first control channel occupy the same time unit, the first control channel occupies the first to second time-domain symbols of the time unit, and the first data channel occupies the third to fourteenth time-domain symbols of the time unit. It is to be noted that, under the condition that the time-domain resource for the first data channel and the time-domain resource for the first control channel do not overlap, continuous time-domain symbols may be occupied and discontinuous time-domain symbols may also be occupied. For example, the first control channel occupies the first to second time-domain symbols of the time unit and the first data channel occupies the fifth to fourteenth time-domain symbols of the time unit.

b) Transmission of the first control channel is in the first time unit, and transmission of the first data channel is in a second time unit, the first control channel occupying A time-domain symbols in the first time unit and the first data channel occupying B time-domain symbols in the second time unit, $1 \leq A \leq C$ and $1 \leq B \leq C$, where C is a number of time-domain symbols in one time unit, the granularity of the time unit being slot, subframe, sTTI or another fixed time length.

For example, as illustrated in FIG. 7(b), a time unit includes C=14 time-domain symbols, the first data channel and the first control channel occupy different time units, the first control channel occupies first to second time-domain symbols of the first time unit, and the first data channel occupies third to fourteenth time-domain symbols of the second time unit. It is to be noted that the first data channel and the first control channel may occupy continuous time-domain symbols and may also occupy discontinuous time-domain symbols.

For another example, as illustrated in FIG. 5(b), a time unit includes C=14 time-domain symbols, the first data channel and the first control channel occupy different time units, the first control channel occupies all time-domain symbols of the first time unit, and the first data channel occupies all time-domain symbols of the second time unit.

In the embodiment of the disclosure, the time-domain resource occupied by the first control channel is smaller than the time-domain resource occupied by the first data channel corresponding to the first control channel.

In the embodiment of the disclosure, the time-domain resource occupied by the first control channel is a subset of the time-domain resource occupied by the first data channel corresponding to the first control channel.

In the embodiment of the disclosure, the first control channel occupies A time-domain symbols in one time unit, the first data channel occupies B time-domain symbols in the one time unit, and the time-domain resource for the first control channel and the time-domain resource for the first data channel at least partially overlap, $1 \leq A \leq C$ and $1 \leq B \leq C$, where C is a number of time-domain symbols in one time unit.

In an implementation, the first configuration information includes the first indication information, and the first indication information is used to determine a time-domain position relationship of the first control channel and the first data channel corresponding to the first control channel. Specifically, when the first indication information indicates a first time-domain position relationship, it is indicated that the time-domain resource for the first control channel and the time-domain resource for the first data channel scheduled by the first control channel are adjacent. When the first indication information indicates a second time-domain position relationship, it is indicated that the time-domain resource for the first control channel and the time-domain resource for the first data channel scheduled by the first control channel are non-adjacent.

In an implementation, the first configuration information includes second indication information, and the second indication information is used to determine a scheduling type for the first control channel and the first data channel corresponding to the first control channel. Specifically, when the second indication information indicates a first scheduling type, it is indicated that the first control channel schedules the first data channel in the same time unit. When the second indication information indicates a second scheduling type, it is indicated that the first control channel schedules the first data channel in a different time unit.

In an implementation, the first configuration information includes third indication information, and the third indication information is used to indicate a numerology of the first resource pool and/or a numerology of the second resource pool.

Herein, the numerology includes a subcarrier spacing and/or a Cyclic Prefix (CP) type. The subcarrier spacing is, for example, 15 kHz, 30 kHz, 60 kHz and 120 kHz. The CP type is, for example, a normal CP and an extended CP.

For example, the third indication information indicates the subcarrier spacing 30 kHz of the first resource pool and normal CP of the first resource pool. Or, the third indication information indicates the subcarrier spacing 60 kHz of the second resource pool and normal CP of the second resource pool. Or, the third indication information indicates the subcarrier spacing 30 kHz of the first resource pool and normal CP of the first resource pool, and simultaneously indicates the subcarrier spacing 60 kHz of the second resource pool and normal CP of the second resource pool.

In an implementation, the first configuration information includes fourth indication information, and the fourth indication information is used to indicate synchronization source type information.

Herein, a synchronization source type includes a Global Navigation Satellite System (GNSS), an eNB or gNB, UE and the like.

In an implementation, the method further includes the following operations.

The first terminal acquires second configuration information, the second configuration information being used to indicate a slot format.

The first terminal acquires a first criterion, the first criterion being used to indicate that at least one of a UL symbol, a flexible symbol or a DL symbol may be configured for SL transmission.

The first terminal determines the time-domain resource for the first resource pool and/or the time-domain resource for the second resource pool according to the first criterion, the first configuration information and the second configuration information.

Furthermore, the operation that the first terminal determines the time-domain resource for the first resource pool and/or the time-domain resource for the second resource pool according to the first criterion, the first configuration information and the second configuration information includes the following operations.

The first terminal determines the first time unit included in the first resource pool and/or the first time unit included in the second resource pool according to the first configuration information.

The first terminal determines time-domain resources available for SL transmission in the first time units as a first set according to the first criterion and the second configuration information.

The first terminal determines time-domain resources available for the first resource pool and/or the second resource pool in the first time units as a second set according to the first configuration information.

The first terminal determines an intersection of the first set and the second set as the time-domain resource for the first resource pool and/or the time-domain resource for the second resource pool.

For example, a transmission resource is shared by an SL and a UL, namely data of the SL is transmitted in a UL carrier or a UL slot. In an NR system, a slot structure of a link between a base station and a terminal is very flexible, and a slot may include a UL symbol, a DL symbol and a flexible symbol. It may be pre-configured or configured by the network (i.e., the first criterion) that UL, and/or DL and/or flexible symbols in a slot may be configured for SL transmission. In such case, a time unit where a resource pool is located may be determined according to resource pool configuration information, time-domain resource (i.e., the second set) for the first control channel and/or time-domain resource (i.e., the second set) for the first data channel (i.e., specific symbols available for SL transmission) in the time unit may be determined, and the time-domain resources available for SL transmissions in the time unit (i.e., the first set) is determined in combination with slot structure configuration information and the first criterion; the intersection of the first set and the second set being the time-domain resource for the first control channel or the first data channel.

For example, it is configured through resource pool configuration information of the first data channel that each slot may be configured for transmission of the first data channel, and last 8 time-domain symbols in each slot are configured for transmission of the first data channel. The first criterion indicates that the flexible symbols and UL symbols may be configured for SL transmission. A slot format of a slot is configured to be D D F F F F F F F F U U U U through the slot structure configuration information, where D represents a DL symbol, U represents a UL symbol and F represents a flexible symbol.

In combination with the first criterion and the slot structure configuration information, the first set includes last 12 symbols in the slot, i.e., {F F F F F F F F U U U U}. According to the resource pool configuration information, the second set includes last 8 time-domain symbols in the slot, i.e., {F F F F U U U U}. The intersection of the first set and the second set is the last 8 time-domain symbols, i.e., {F F F F U U U U}. In such case, the time-domain resource for the first data channel in the slot is the last 8 time-domain symbols.

For another example, it is configured through resource pool configuration information of the first data channel that each slot may be configured for transmission of the first data channel, and last 8 time-domain symbols in each slot are configured for transmission of the first data channel. The first criterion indicates that the UL symbol may be configured for SL transmission. A slot format of a slot is configured to be D D F F F F F F F F U U U U through the slot structure configuration information, where D represents a DL symbol, U represents a UL symbol and F represents a flexible symbol.

In combination with the first criterion and the slot structure configuration information, the first set includes last 4 symbols in the time unit, i.e., {U U U U}. According to the resource pool configuration information, the second set includes last 8 time-domain symbols in the slot, i.e., {F F F F U U U U}. The intersection of the first set and the second set is the last 4 time-domain symbols, i.e., {U U U U}. In such case, the time-domain resource for the first data channel in the slot is the last 4 time-domain symbols.

In the embodiment, the first configuration information, the second configuration information, the first criterion and the like are pre-configured or configured by the network.

It should be understood that time-domain resources available for the first resource pool in each time unit may be the same or different; and time-domain resources available for the second resource pool in each time unit may be the same or different. For example, the time-domain resource available for the second resource pool in the first time unit is last 8 time-domain symbols in the time unit, and the available time-domain resource for the second resource pool in the second time unit is last 4 time-domain symbols in the time unit.

It should be understood that, when configuration parameters of the time-domain resource and/or frequency-domain resource of the first resource pool may be explicitly determined by configuration parameters of the time-domain resource and/or frequency-domain resource of the second resource pool, the first configuration information may not include the corresponding configuration parameters. Or, when the configuration parameters of the time-domain resource and/or frequency-domain resource of the second resource pool may be implicitly determined by the configuration parameters of the time-domain resource and/or frequency-domain resource of the first resource pool, the first configuration information may not include the corresponding configuration parameters. For example, when the first resource pool and the second resource pool occupy the same time unit, for example, the first resource pool occupies first N symbols of a subframe and the second resource pool occupies other symbols of the subframe, and when the network configures the starting position information of the time-domain resource of the first resource pool and length information of the time-domain resource of the first resource pool, the starting position information of the time-domain resource of the second resource pool and length information of the time-domain resource of the second resource pool are not required to be configured. Or, when the first control channel and the corresponding data channel occupy the same frequency-domain size, and when the network configures the information of the number of the frequency-domain units occupied by the first control channel and the information of a size of the frequency-domain units occupied by the first control channel, the information of the number of the frequency-domain units occupied by the data channel transmitted in the second resource pool and the information of a size of the frequency-domain units occupied by the data channel transmitted in the second resource pool are not required to be configured.

According to the technical solution of the embodiment of the disclosure, the PSCCH resource pool and/or the PSSCH resource pool are/is configured, so that the delay is reduced without increasing the detection complexity of a Rel-15 receiver and influencing a resource sensing and selecting process of a Rel-14 terminal.

Figure 8C:
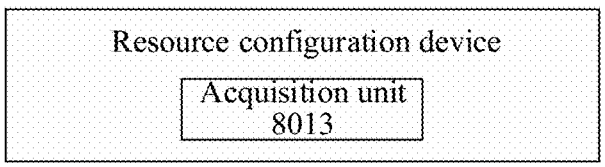
FIG. 8(c) is a structure composition diagram of a device for a resource configuration according to an embodiment of the disclosure.

FIG. 8(c) is a structure composition diagram of a device for a resource configuration according to an embodiment of the disclosure. As illustrated in FIG. 8(c), the device includes an acquisition unit 8013.

The acquisition unit 8013 is configured to acquire first configuration information, the first configuration information being used to determine at least one of: a time-domain resource of a first resource pool, a frequency-domain resource of the first resource pool, a time-domain resource of a second resource pool or a frequency-domain resource of the second resource pool.

A resource in the first resource pool is capable of transmitting a first control channel, the first control channel being used for transmission of SCI. A resource in the second resource pool is capable of transmitting a first data channel, the first data channel being used for transmission of SL data.

In the embodiment of the disclosure, a link between a terminal and a terminal is called an SL, control information transmitted between a terminal and a terminal is called SCI, the SCI being carried in an SL control channel (i.e., the first control channel), and data transmitted between a terminal and a terminal is SL data, the SL data being carried in an SL data channel (i.e., the first data channel).

In an implementation, the first control channel is called a PSCCH, the first data channel is called a PSSCH, a resource set capable of transmitting the first control channel is called the first resource pool (i.e., a PSCCH resource pool), a resource set capable of transmitting the first data channel is called a second resource pool (i.e., a PSSCH resource pool), and time division is adopted for the first resource pool and the second resource pool.

In the embodiment of the disclosure, the first resource pool or the second resource pool is a set of transmission resources, may be a resource pool in LTE-V2X, and may also be a BWP in an NR system or another physical parameter that may be configured to represent a transmission resource set. No limits are made thereto in the disclosure.

In the embodiment of the disclosure, at least one of the time-domain resource of the first resource pool, frequency-domain resource of the first resource pool, the time-domain resource of the second resource pool, or frequency-domain resource of the second resource pool are configured through the first configuration information. In an implementation, the first configuration information is configured by a network device or is pre-configured. Herein, through the first configuration information, the time-domain resource of the first resource pool and/or frequency-domain resource of the first resource pool may be independently configured; or the time-domain resource of the second resource pool and/or frequency-domain resource of the second resource pool may be independently configured; or the time-domain resources and/or frequency-domain resources of the first resource pool and the second resource pool may be simultaneously configured.

How to configure the time-domain resources and/or frequency-domain resources of the two resource pools through the first configuration information will be described below.

1) The first configuration information is used to determine the time-domain resource of the first resource pool and/or frequency-domain resource of the first resource pool, and the first configuration information includes at least one of:

starting position information of the time-domain resource of the first resource pool;

length information of the time-domain resource of the first resource pool;

density information of the time-domain resource of the first resource pool;

time-domain length information of the first control channel transmitted in the first resource pool;

starting position information of the frequency-domain resource of the first resource pool;

information of a number of frequency-domain units occupied by the frequency-domain resource of the first resource pool;

information of a size of the frequency-domain units corresponding to the frequency-domain resource of the first resource pool; and information of a number of frequency-domain units occupied by the first control channel transmitted in the first resource pool.

1.1) The starting position information of the time-domain resource of the first resource pool is determined through a first parameter, and the first parameter is used to indicate information of a first time unit in the first resource pool. A granularity of the time unit is one of: a subframe, a slot, an sTTI or a fixed time length. Unless otherwise specified hereinafter, the granularity of the time unit is one of: a subframe, a slot, an sTTI or a fixed time length.

For example, the first parameter is a piece of time index information, each piece of time index information corresponds to a time unit, the time index information may be a subframe number in a radio frame or a subframe number in a radio frame period, etc., and the information of the first time unit in the first resource pool may be determined through the time index information in the first parameter. For example, a radio frame includes 10 subframes, so that a range of the subframe number is [0, 9]. If the first parameter is a subframe number 7, the first time unit in the first resource pool is a subframe 7 in a radio frame. For another example, a radio frame period includes 10,240 subframes, so that the range of the subframe number is [0, 10,239]. If the first parameter is a subframe number 100, the first time unit in the first resource pool is a subframe 100 in a radio frame period.

For another example, the first parameter is a time offset, and the time offset is an offset relative to determined time, for example, relative to a first subframe (i.e., a subframe 0) in a radio frame period.

1.2) The length information of the time-domain resource of the first resource pool is determined through a second parameter, and the second parameter is used to indicate: information of time units for transmission of the first control channel in the first resource pool, or a number of time units for transmission of the first control channel in the first resource pool.

Herein, a length of the time-domain resource of the first resource pool takes time unit as a unit. The time-domain resource of the first resource pool may occupy multiple continuous time units and may also occupy multiple discrete time units. Specific time units including the time-domain resource of the first resource pool or the number of time units of the time-domain resource of the first resource pool may be determined through the second parameter.

For example, the second parameter includes a bitmap, each bit in the bitmap corresponds to a time unit, and a value of each bit indicates whether the time unit corresponding to the bit includes the time-domain resource of the first resource pool or not. For example, when the value of a certain bit is 0, it is indicated that the time unit corresponding to the bit does not include the time-domain resource of the first resource pool. When the value of a certain bit is 1, it is indicated that the time unit corresponding to the bit includes the time-domain resource of the first resource pool. Therefore, the specific time units including the time-domain resource of the first resource pool may be determined based on the bitmap, and the number of the time units including the time-domain resource of the first resource pool may further be determined. Furthermore, the bitmap may periodically repeat, so that all time-domain resources of the first resource pool may be determined. For example, a radio frame period includes 10,240 subframes, the bitmap includes 10 bits corresponding to 10 subframes respectively, and the bitmap may periodically repeat in the radio frame period, so that whether all the subframes in the radio frame period belong to the first resource pool or not may be determined.

For another example, the second parameter is a value used to indicate the number of the time units including the time-domain resource of the first resource pool. For example, a radio frame period includes 10,240 subframes, the second parameter is 1,024, and in such case, it is indicated that 1,024 subframes in the radio frame period belong to the first resource pool. Furthermore, in combination with the starting position information of the time-domain resource of the first resource pool, it is indicated that 1,024 subframes from a starting position of the time-domain resource belong to the first resource pool.

1.3) The density information of the time-domain resource of the first resource pool is determined through a third parameter, and the third parameter is used to indicate that one time unit in every K time units is a time unit for transmission of the first control channel in the first resource pool, K≤1.

For example, K=1 indicates that each time unit includes the time-domain resource of the first resource pool. K=2 indicates that one time unit in every two time units includes the time-domain resource of the first resource pool. For example, the first time unit includes the time-domain resource of the first resource pool, a third time unit includes the time-domain resource of the first resource pool, a fifth time unit includes the time-domain resource of the first resource pool, and so on. The third parameter indicates a density or period of the time-domain resource of the first resource pool.

Optionally, all time units in the first resource pool may be determined in combination with the first parameter and the second parameter. For example, a position of the first time unit of the first resource pool is determined through the first parameter, and it is determined through the third parameter that one time unit in every K time units is configured for transmission of the first control channel. Therefore, in combination with the first parameter and the third parameter, it may be determined that every K time units from the first time unit are configured for transmission of the first control channel.

1.4) The time-domain length information of the first control channel transmitted in the first resource pool is determined through a fourth parameter, and the fourth parameter is used to indicate: a number of time-domain symbols occupied by a time-domain resource for the first control channel transmitted in the first resource pool, or a number of time units occupied by a time-domain resource for the first control channel transmitted in the first resource pool.

After a specific time unit including the time-domain resource of the first resource pool is determined, specific time-domain symbols configured for transmission of the first control channel in the time unit are further required to be determined. Therefore, it is necessary to determine the time-domain length information corresponding to the first control channel and the starting position of the time-domain resource corresponding to the first control channel.

Herein, the time-domain length information of the first control channel transmitted in the first resource pool is determined through the fourth parameter, and the fourth parameter is used to indicate the number of the time-domain symbols occupied by the time-domain resource for the first control channel transmitted in the first resource pool or the number of the time units occupied by the time-domain resource for the first control channel transmitted in the first resource pool. In an implementation, a time unit includes M time-domain symbols, and the first control channel occupies N time-domain symbols, M and N being integers, M>1 and 1≤N<M. For example, the PSCCH may occupy P time-domain symbols in a subframe or a slot, P<14. Preferably, P=2 or P=3 or P=4. For another example, if the granularity of the time unit is sTTI, the PSCCH may occupy a length of an sTTI or occupy Q time-domain symbols, Q being a positive integer less than the number of symbols in the sTTI. For example, if an sTTI includes 7 time-domain symbols, Q may be 3 or 4. If an sTTI includes 3 or 4 time-domain symbols, the PSCCH occupies the length of an sTTI, i.e., 3 or 4 Orthogonal Frequency Division Multiplexing (OFDM) symbols.

In the embodiment of the disclosure, for determining the time-domain resource for the first control channel, it is necessary to determine the number of the time-domain symbols occupied by the time-domain resource for the first control channel, and it is also necessary to determine a starting position or ending position of the time-domain resource for the first control channel. A time-domain starting position or ending position of the first control channel in a time unit may be determined in a manner of pre-configuration or configuration by a network. Specifically, the starting position or ending position of the time-domain resource for the first control channel may be determined in the following manners.

1: The starting position of the time-domain resource for the first control channel transmitted in the first resource pool is at a first time-domain symbol of a time unit.

For example, if K=1 in 1.3), namely each time unit is configured for transmission of the PSCCH, the time-domain resource for the PSCCH starts from a first time-domain symbol of each time unit. Herein, the granularity of the time unit is one of: a subframe, a slot, an sTTI or a fixed time length.

For another example, if the granularity of the time unit is sTTI, an sTTI includes 7 symbols and the PSCCH occupies 3 symbols, the first three symbols in the sTTI are PSCCH resources, and furthermore, every K sTTIs include a PSCCH resource. If an sTTI includes 3 or 4 symbols (in such case, in a subcarrier spacing 15 kHz, 1 ms corresponds to 14 symbols that may be divided into 4 sTTIs), the PSCCH occupies the length of an sTTI, and every K sTTIs include a PSCCH resource, for example, K=4, referring to FIG. 7(b).

2: The ending position of the time-domain resource for the first control channel transmitted in the first resource pool is at a last time-domain symbol of a time unit.

For example, if K=1 in 1.3), namely each time unit is configured for transmission of the PSCCH, the time-domain resource for the PSCCH ends at a last time-domain symbol of each time unit. Herein, the granularity of the time unit is one of: a subframe, a slot, an sTTI or a fixed time length.

For example, the PSCCH may be at last N symbols of a time unit. For example, a subframe includes 14 symbols, and a PSCCH occupies N=4 symbols. In a subframe, the PSCCH may occupy last four symbols of the subframe, and other symbols may be configured for transmission of the PSSCH. Furthermore, the last symbol of the subframe is not configured to transmit the PSCCH or the PSSCH but configured as a GP.

In the embodiment of the disclosure, the time-domain resource of the first resource pool may be determined through each parameter in 1.1) to 1.4). Not limited thereto, the time-domain resource of the first resource pool may also be determined through a bitmap. Specifically, the first configuration information includes the first bitmap, and the first bitmap is used to determine the time unit occupied by the first resource pool. Furthermore, the first bitmap periodically repeats in a first time range.

For example, the first time range is a radio frame period (10,240 subframes), the first bitmap includes 10 bits, each bit is configured to indicate whether a subframe may be configured for the first resource pool or not, and the bitmap periodically repeats in the radio frame period, so that the specific subframes available for the first resource pool in the radio frame period are determined.

1.5) A starting position of the frequency-domain resource of the first resource pool is determined through a fifth parameter, and the fifth parameter is used to indicate a frequency-domain offset of the starting position of the frequency-domain resource of the first resource pool relative to a first reference position.

Herein, the first reference position may be a starting position of a carrier or a BWP or another determined frequency-domain position, for example, a lowest PRB position of a synchronization resource, and the starting position of the frequency-domain resource of the first resource pool may be determined based on the frequency-domain offset and the first reference position. The granularity of the frequency-domain offset is one of: PRB, RBG or sub-band.

For example, the starting position of the frequency-domain resource of the first resource pool may be an offset N_RB_RP relative to the starting position of the carrier or the BWP, and in such case, a starting position of a first PSCCH resource is W*ceil(N_RB_RP/W), where ceil( ) represents a rounding-up operation, and W represents the number of PRBs in a frequency-domain unit.

1.6) The information of the number of the frequency-domain units occupied by the frequency-domain resource of the first resource pool is determined through a sixth parameter, and the sixth parameter is used to indicate the number of the frequency-domain units occupied by the frequency-domain resource of the first resource pool.

Herein, the sixth parameter is a value used to indicate the number of the frequency-domain units occupied by the frequency-domain resource of the first resource pool. The granularity of the frequency-domain unit is one of: PRB, RBG or sub-band. Unless otherwise specified hereinafter, the granularity of the frequency-domain unit is one of: PRB, RBG or sub-band.

For example, a carrier bandwidth is 20 MHz and includes 100 PRBs, and the granularity of the frequency-domain unit is sub-band. Each sub-band includes 10 PRBs, so that a sub-band index range is [0, 9]. The starting position of the frequency-domain resource of the first resource pool is a sub-band 1, the number of sub-bands that are occupied is 8, and in such case, it is indicated that the frequency-domain resource of the first resource pool is 8 sub-bands from the sub-band 1.

1.7) The information of a size of the frequency-domain units corresponding to the frequency-domain resource of the first resource pool is determined through a seventh parameter, and the seventh parameter is used to indicate the number of PRBs in the frequency-domain unit.

1.8) The information of the number of the frequency-domain units occupied by the first control channel transmitted in the first resource pool is determined through an eighth parameter, and the eighth parameter is used to indicate the number of the frequency-domain units occupied by the first control channel.

Herein, the eighth parameter is a value used to indicate the number of the frequency-domain units occupied by a frequency-domain resource for the first control channel.

For example, a resource occupied by each PSCCH resource in a frequency domain takes sub-band as a granularity, each sub-band includes U PRBs, and each PSCCH resource occupies V sub-bands. Furthermore, the number of the PRBs occupied by each PSCCH resource is a maximum integer that is less than or equal to U×V and may be exactly divided by 2, 3 and 5.

For example, if U=5 and V=8, each PSCCH occupies 40 PRBs.

For example, if U=10 and V=7, the number of the PRBs occupied by each PSCCH is a maximum integer that is less than or equal to 70 and may be exactly divided by 2, 3 and 5, i.e., 64. In such case, the PSCCH occupies 64 PRBs from a smallest PRB index of the PSCCH resource.

2) The first configuration information is used to determine the time-domain resource of the second resource pool and/or frequency-domain resource of the second resource pool, and the first configuration information includes at least one of:
  starting position information of the time-domain resource of the second resource pool;
  length information of the time-domain resource of the second resource pool;
  time-domain length information of the first data channel transmitted in the second resource pool;
  starting position information of the frequency-domain resource of the second resource pool;

information of a number of frequency-domain units occupied by the frequency-domain resource of the second resource pool;

information of a size of the frequency-domain units corresponding to the frequency-domain resource of the second resource pool; and information of a number of frequency-domain units occupied by the first data channel transmitted in the second resource pool.

2.1) The starting position information of the time-domain resource of the second resource pool is determined through a ninth parameter, and the ninth parameter is used to indicate information of a first time unit in the second resource pool.

Herein, the first time unit in the second resource pool may be the same as the first time unit in the first resource pool and may also be different from the first time unit in the first resource pool. When the first time unit in the second resource pool is the same as the first time unit in the first resource pool, the starting position information of the time-domain resource of the second resource pool may not be additionally configured.

In the embodiment of the disclosure, the ninth parameter is a piece of time index information, each piece of time index information corresponds to a time unit, the time index information may be a subframe number in a radio frame or a subframe number in a radio frame period, etc., and the information of the first time unit in the second resource pool may be determined through the time index information in the ninth parameter. For example, a radio frame includes 10 subframes, so that a range of the subframe number is [0, 9]. If the ninth parameter is a subframe number 4, the first time unit in the second resource pool is a subframe 4 in a radio frame. For another example, a radio frame period includes 10,240 subframes, so that the range of the subframe number is [0, 10,239]. If the ninth parameter is a subframe number 100, the first time unit in the second resource pool is a subframe 100 in a radio frame period.

For another example, the ninth parameter is a time offset, and the time offset is an offset relative to determined time, for example, relative to a first subframe (i.e., a subframe 0) in a radio frame period.

2.2) The length information of the time-domain resource of the second resource pool is determined through a tenth parameter, and the tenth parameter is used to indicate: information of time units for transmission of the first data channel in the second resource pool, or the number of time units for transmission of the first data channel in the second resource pool.

Herein, a length of the time-domain resource of the second resource pool takes time unit as a unit. The time-domain resource of the second resource pool may occupy multiple continuous time units and may also occupy multiple discrete time units. Specific time units including the time-domain resource of the second resource pool or the number of time units of the time-domain resource of the second resource pool may be determined through the tenth parameter.

For example, the tenth parameter includes a bitmap, each bit in the bitmap corresponds to a time unit, and a value of each bit indicates whether the time unit corresponding to the bit includes the time-domain resource of the second resource pool or not. For example, when the value of a certain bit is 0, it is indicated that the time unit corresponding to the bit does not include the time-domain resource of the second resource pool. When the value of a certain bit is 1, it is indicated that the time unit corresponding to the bit includes the time-domain resource of the second resource pool.

Therefore, the specific time units including the time-domain resource of the second resource pool may be determined based on the bitmap, and the number of the time units including the time-domain resource of the second resource pool may further be determined. Furthermore, the bitmap may periodically repeat, so that all time-domain resources of the second resource pool may be determined. For example, a radio frame period includes 10,240 subframes, the bitmap includes 10 bits corresponding to 10 subframes respectively, and the bitmap may periodically repeat in the radio frame period, so that whether all the subframes in the radio frame period belong to the second resource pool or not may be determined.

For another example, the tenth parameter is a value used to indicate the number of the time units including the time-domain resource of the second resource pool. For example, a radio frame period includes 10,240 subframes, the tenth parameter is 1,024, and in such case, it is indicated that 1,024 subframes in the radio frame period belong to the second resource pool. Furthermore, in combination with the starting position information of the time-domain resource of the second resource pool, it is indicated that 1,024 subframes from a starting position of the time-domain resource belong to the second resource pool.

2.3) The time-domain length information of the first data channel transmitted in the second resource pool is determined through an eleventh parameter, and the eleventh parameter is used to indicate: a number of time-domain symbols occupied by a time-domain resource for the first data channel transmitted in the second resource pool, or a number of time units occupied by a time-domain resource for the first data channel transmitted in the second resource pool.

In a time unit, other time-domain symbols except time-domain symbols occupied by the first control channel are configured as resources for the first data channel. Herein, the time-domain length information of the first data channel transmitted in the second resource pool is determined through the eleventh parameter, and the eleventh parameter is used to indicate the number of the time-domain symbols occupied by the time-domain resource for the first data channel transmitted in the second resource pool. For example, the PSSCH may occupy N time-domain symbols, N≤14.

For example, referring to FIG. 5(a), the PSSCH scheduled in a second subframe occupies a symbol of the second subframe. Besides a subframe, the time unit may also be a slot or an sTTI or a fixed time length, for example, 1 ms or 0.5 ms. Particularly, for the sTTI, if the PSCCH does not occupy all symbols of a time unit, the remaining symbols of the time unit are PSSCH resources. If the PSCCH occupies all the symbols of a time unit, there is no PSSCH resources in the time unit, and the PSSCH may occupy another time unit.

Furthermore, a PSSCH may occupy multiple continuous time units. For example, in FIG. 5(a), the PSSCH scheduled in a third subframe occupies symbols of the third and fourth subframes.

In an embodiment, the eleventh parameter is used to indicate the number of the time units occupied by the first data channel. For example, a time unit is an sTTI, the first data channel occupies multiple continuous sTTI, and in such case, the eleventh parameter is used to indicate the number of the sTTIs occupied by the first data channel.

In the embodiment of the disclosure, for determining the time-domain resource for the first data channel, it is necessary to determine the number of the time-domain symbols occupied by the time-domain resource for the first data channel, and it is also necessary to determine a position of the time-domain resource for the first data channel. A time-domain starting position or ending position of the first data channel in a time unit may be determined in the manner of pre-configuration or configuration by the network. Specifically, the position of the time-domain resource for the first data channel may be determined in the following manners.

1: The starting position of the time-domain resource for the first data channel is at a next time-domain symbol of a last time-domain symbol occupied by the first control channel in a time unit, and furthermore, if the last time-domain symbol occupied by the first control channel is a last time-domain symbol of the time unit, the starting position of the time-domain resource for the first data channel is at a first available time-domain symbol of a next time unit of the time unit; or, 2: the starting position of the time-domain resource for the first control channel is at a next time-domain symbol of a last time-domain symbol occupied by the first data channel in a time unit, and furthermore, if the last time-domain symbol occupied by the first data channel is a last time-domain symbol of the time unit, the starting position of the time-domain resource for the first control channel is at a first available time-domain symbol of a next time unit of the time unit.

Optionally, in the solution of the embodiment of the disclosure, a last time-domain symbol of a last time unit occupied by the first data channel is not configured for data transmission but as a GP. Furthermore, if a PSSCH occupies multiple continuous time units, a last symbol of the last time unit is configured as a GP only.

Optionally, in the solution of the embodiment of the disclosure, a last time-domain symbol of the time unit occupied by the first control channel is not configured for control information transmission but as the GP.

In the embodiment of the disclosure, the time-domain resource of the second resource pool may be determined through each parameter in 2.1) to 2.3). Not limited thereto, the time-domain resource of the second resource pool may also be determined through a bitmap. Specifically, the first configuration information includes the second bitmap, and the second bitmap is used to determine the time unit occupied by the second resource pool. Furthermore, the second bitmap periodically repeats in a second time range.

For example, the second time range is a radio frame period (10,240 subframes), the second bitmap includes 10 bits, each bit is configured to indicate whether a subframe may be configured for the second resource pool or not, and the bitmap periodically repeats in the radio frame period, so that the specific subframes available for the second resource pool in the radio frame period are determined.

2.4) A starting position of the frequency-domain resource of the second resource pool is determined through a twelfth parameter, and the twelfth parameter is used to indicate a frequency-domain offset of the starting position of the frequency-domain resource of the second resource pool relative to the first reference position.

Herein, the first reference position may be a starting position of a carrier or a BWP, and the starting position of the frequency-domain resource of the second resource pool may be determined based on the frequency-domain offset and the first reference position. The granularity of the frequency-domain offset is one of: PRB, RBG or sub-band.

For example, the starting position of the frequency-domain resource of the second resource pool may be an offset N_RB_RP relative to the starting position of the carrier or the BWP, and in such case, a starting position of a first PSSCH resource is H*ceil(N_RB_RP/H), where ceil( ) represents a rounding-up operation, and H represents the number of PRBs in a frequency-domain unit.

2.5) The information of the number of the frequency-domain units occupied by the frequency-domain resource of the second resource pool is determined through a thirteenth parameter, and the thirteenth parameter is used to indicate the number of the frequency-domain units occupied by the frequency-domain resource of the second resource pool.

Herein, the thirteenth parameter is a value used to indicate the number of the frequency-domain units occupied by the frequency-domain resource of the second resource pool.

For example, a resource occupied by each PSSCH resource in the frequency domain takes sub-band as a granularity, each sub-band includes R PRBs, and each PSSCH resource occupies S sub-bands. Furthermore, the number of the PRBs occupied by each PSSCH resource is a maximum integer that is less than or equal to Rx S and may be exactly divided by 2, 3 and 5.

For example, a carrier bandwidth is 20 MHz and includes 100 PRBs, and the granularity of the frequency-domain unit is sub-band. Each sub-band includes 10 PRBs, so that a sub-band index range is [0, 9]. The starting position of the frequency-domain resource of the second resource pool is a sub-band 1, the number of sub-bands that are occupied is 8, and in such case, it is indicated that the frequency-domain resource of the second resource pool is 8 sub-bands from the sub-band 1.

2.6) The information of a size of the frequency-domain units corresponding to the frequency-domain resource of the second resource pool is determined through a fourteenth parameter, and the fourteenth parameter is used to indicate the number of PRBs in the frequency-domain unit.

2.7) The information of the number of the frequency-domain units occupied by the first data channel transmitted in the second resource pool is determined through a fifteenth parameter, and the fifteenth parameter is used to indicate the number of the frequency-domain units occupied by the first data channel.

Herein, the fifteenth parameter is a value used to indicate the number of the frequency-domain units occupied by a frequency-domain resource for the first data channel. The granularity of the frequency-domain unit is one of: PRB, RBG or sub-band.

For example, a resource occupied by each PSSCH resource in the frequency domain takes sub-band as a granularity, each sub-band includes R PRBs, and each PSSCH resource occupies S sub-bands. Furthermore, the number of the PRBs occupied by each PSSCH resource is a maximum integer that is less than or equal to R×S and may be exactly divided by 2, 3 and 5.

For example, if R=6 and S=8, each PSSCH occupies 48 PRBs.

For example, if R=10 and S=7, the number of the PRBs occupied by each PSSCH is a maximum integer that is less than or equal to 70 and may be exactly divided by 2, 3 and 5, i.e., 64. In such case, the PSSCH occupies 64 PRBs from a smallest PRB index of the PSSCH resource.

In the embodiment of the disclosure, a relationship between the first resource pool and the second resource pool may be, but not limited to, that a time-domain resource occupied by the first resource pool and a time-domain resource occupied by the second resource pool are different.

The relationship between the first resource pool and the second resource pool is not limited to that the occupied time-domain resources are different, and may also be that the time-domain of the first resource pool is a subset of the time-domain resource of the second resource pool. For example, for a subframe, the second resource occupies the whole subframe, and the first resource pool occupies first N symbols in the subframe.

In the embodiment of the disclosure, the first resource pool and the second resource pool meet at least one of the following characteristics.

The starting position of the frequency-domain resource of the first resource pool and the starting position of the frequency-domain resource of the second resource pool are the same or different.

The size of the frequency-domain unit of the frequency-domain resource of the first resource pool and the size of the frequency-domain unit of the frequency-domain resource of the second resource pool are the same or different.

Time division is adopted for the first control channel and the first data channel corresponding to the first control channel.

The time-domain resource for the first control channel and the time-domain resource for the first data channel corresponding to the first control channel are adjacent or non-adjacent.

The starting position of the time-domain resource for the first control channel and the starting position of the time-domain resource for the first data channel corresponding to the first control channel have a one-to-one correspondence.

The starting position of the frequency-domain resource for the first control channel and the starting position of the frequency-domain resource for the first data channel corresponding to the first control channel have a one-to-one correspondence.

The starting position of the frequency-domain resource for the first control channel and the starting position of the frequency-domain resource for the first data channel corresponding to the first control channel are the same or different.

Length of the frequency-domain resource for the first control channel and length of the frequency-domain resource for the first data channel corresponding to the first control channel are the same or different.

In the solution, that time division is adopted for the first control channel and the first data channel corresponding to the first control channel may include the following two implementations.

a) Transmission of the first control channel and the first data channel corresponding to the first control channel is time division in one time unit, the first control channel occupying A time-domain symbols in the one time unit, the first data channel occupying B time-domain symbols in the one time unit and the time-domain resource for the first control channel and the time-domain resource for the first data channel not overlapping, $1 \leq A < C$, $1 \leq B < C$ and $A+B \leq C$, where C is a number of time-domain symbols in one time unit, the granularity of the time unit being slot, subframe, sTTI or another fixed time length.

For example, as illustrated in FIG. 5(a), a time unit includes C=14 time-domain symbols, the first data channel and the first control channel occupy the same time unit, the first control channel occupies the first to second time-domain symbols of the time unit, and the first data channel occupies the third to fourteenth time-domain symbols of the time unit. It is to be noted that, under the condition that the time-domain resource for the first data channel and the time-domain resource for the first control channel do not overlap, continuous time-domain symbols may be occupied and discontinuous time-domain symbols may also be occupied. For example, the first control channel occupies the first to second time-domain symbols of the time unit and the first data channel occupies the fifth to fourteenth time-domain symbols of the time unit.

b) Transmission of the first control channel is in the first time unit, and transmission of the first data channel is in a second time unit, the first control channel occupying A time-domain symbols in the first time unit and the first data channel occupying B time-domain symbols in the second time unit, $1 \leq A \leq C$ and $1 \leq B \leq C$, where C is a number of time-domain symbols in one time unit, the granularity of the time unit being slot, subframe, sTTI or another fixed time length.

For example, as illustrated in FIG. 7(b), a time unit includes C=14 time-domain symbols, the first data channel and the first control channel occupy different time units, the first control channel occupies first to second time-domain symbols of the first time unit, and the first data channel occupies third to fourteenth time-domain symbols of the second time unit. It is to be noted that the first data channel and the first control channel may occupy continuous time-domain symbols and may also occupy discontinuous time-domain symbols.

For another example, as illustrated in FIG. 5(b), a time unit includes C=14 time-domain symbols, the first data channel and the first control channel occupy different time units, the first control channel occupies all time-domain symbols of the first time unit, and the first data channel occupies all time-domain symbols of the second time unit.

In the embodiment of the disclosure, the time-domain resource occupied by the first control channel is smaller than the time-domain resource occupied by the first data channel corresponding to the first control channel.

In the embodiment of the disclosure, the time-domain resource occupied by the first control channel is a subset of the time-domain resource occupied by the first data channel corresponding to the first control channel.

In the embodiment of the disclosure, the first control channel occupies A time-domain symbols in one time unit, the first data channel occupies B time-domain symbols in the one time unit, and the time-domain resource for the first control channel and the time-domain resource for the first data channel at least partially overlap, $1 \leq A \leq C$ and $1 \leq B \leq C$, where C is a number of time-domain symbols in one time unit.

In an implementation, the first configuration information includes the first indication information, and the first indication information is used to determine a time-domain position relationship of the first control channel and the first data channel corresponding to the first control channel. Specifically, when the first indication information indicates a first time-domain position relationship, it is indicated that the time-domain resource for the first control channel and the time-domain resource for the first data channel scheduled by the first control channel are adjacent. When the first indication information indicates a second time-domain position relationship, it is indicated that the time-domain resource for the first control channel and the time-domain resource for the first data channel scheduled by the first control channel are non-adjacent.

In an implementation, the first configuration information includes second indication information, and the second indication information is used to determine a scheduling type for the first control channel and the first data channel corresponding to the first control channel. Specifically, when the second indication information indicates a first scheduling type, it is indicated that the first control channel schedules the first data channel in the same time unit. When the second indication information indicates a second scheduling type, it is indicated that the first control channel schedules the first data channel in a different time unit.

In an implementation, the first configuration information includes third indication information, and the third indication information is used to indicate a numerology of the first resource pool and/or a numerology of the second resource pool.

Herein, the numerology includes a subcarrier spacing and/or a CP type. The subcarrier spacing is, for example, 15 kHz, 30 kHz, 60 kHz and 120 kHz. The CP type is, for example, a normal CP and an extended CP.

For example, the third indication information indicates the subcarrier spacing 30 kHz of the first resource pool and normal CP of the first resource pool. Or, the third indication information indicates the subcarrier spacing 60 kHz of the second resource pool and normal CP of the second resource pool. Or, the third indication information indicates the subcarrier spacing 30 kHz of the first resource pool and normal CP of the first resource pool and simultaneously indicates the subcarrier spacing 60 kHz of the second resource pool and normal CP of the second resource pool.

In an implementation, the first configuration information includes fourth indication information, and the fourth indication information is used to indicate synchronization source type information.

Herein, a synchronization source type includes a GNSS, an eNB or gNB, UE and the like.

In an implementation, the method further includes the following operations.

The first terminal acquires second configuration information, the second configuration information being used to indicate a slot format.

The first terminal acquires a first criterion, the first criterion being used to indicate that at least one of a UL symbol, a flexible symbol or a DL symbol may be configured for SL transmission.

The first terminal determines the time-domain resource for the first resource pool and/or the time-domain resource for the second resource pool according to the first criterion, the first configuration information and the second configuration information.

Furthermore, the operation that the first terminal determines the time-domain resource for the first resource pool and/or the time-domain resource for the second resource pool according to the first criterion, the first configuration information and the second configuration information includes the following operations.

The first terminal determines the first time unit included in the first resource pool and/or the first time unit included in the second resource pool according to the first configuration information.

The first terminal determines time-domain resources available for SL transmission in the first time units as a first set according to the first criterion and the second configuration information.

The first terminal determines time-domain resources available for the first resource pool and/or the second resource pool in the first time units as a second set according to the first configuration information.

The first terminal determines an intersection of the first set and the second set as the time-domain resource for the first resource pool and/or the time-domain resource for the second resource pool.

For example, a transmission resource is shared by an SL and a UL, namely data of the SL is transmitted in a UL carrier or a UL slot. In an NR system, a slot structure of a link between a base station and a terminal is very flexible, and a slot may include a UL symbol, a DL symbol and a flexible symbol. It may be pre-configured or configured by the network (i.e., the first criterion) that UL, and/or DL and/or flexible symbols in a slot may be configured for SL transmission. In such case, a time unit where a resource pool is located may be determined according to resource pool configuration information, time-domain resource (i.e., the second set) for the first control channel and/or time-domain resource (i.e., the second set) for the first data channel (i.e., specific symbols available for SL transmission) in the time unit may be determined, and the time-domain resources available for SL transmissions in the time unit (i.e., the first set) is determined in combination with slot structure configuration information and the first criterion; the intersection of the first set and the second set being the time-domain resource for the first control channel or the first data channel.

For example, it is configured through resource pool configuration information of the first data channel that each slot may be configured for transmission of the first data channel, and last 8 time-domain symbols in each slot are configured for transmission of the first data channel. The first criterion indicates that the flexible symbols and UL symbols may be configured for SL transmission. A slot format of a slot is configured to be D D F F F F F F F F U U U U through the slot structure configuration information, where D represents a DL symbol, U represents a UL symbol and F represents a flexible symbol.

In combination with the first criterion and the slot structure configuration information, the first set includes last 12 symbols in the slot, i.e., {F F F F F F F F U U U U}. According to the resource pool configuration information, the second set includes last 8 time-domain symbols in the slot, i.e., {F F F F U U U U}. The intersection of the first set and the second set is the last 8 time-domain symbols, i.e., {F F F F U U U U}. In such case, the time-domain resource for the first data channel in the slot is the last 8 time-domain symbols.

For another example, it is configured through resource pool configuration information of the first data channel that each slot may be configured for transmission of the first data channel, and last 8 time-domain symbols in each slot are configured for transmission of the first data channel. The first criterion indicates that the UL symbol may be configured for SL transmission. A slot format of a slot is configured to be D D F F F F F F F F U U U U through the slot structure configuration information, where D represents a DL symbol, U represents a UL symbol and F represents a flexible symbol.

In combination with the first criterion and the slot structure configuration information, the first set includes last 4 symbols in the time unit, i.e., {U U U U}. According to the resource pool configuration information, the second set includes last 8 time-domain symbols in the slot, i.e., {F F F F U U U U}. The intersection of the first set and the second set is the last 4 time-domain symbols, i.e., {U U U U}. In such case, the time-domain resource for the first data channel in the slot is the last 4 time-domain symbols.

In the embodiment, the first configuration information, the second configuration information, the first criterion and the like are pre-configured or configured by the network.

It should be understood that time-domain resources available for the first resource pool in each time unit may be the same or different and time-domain resources available for the second resource pool in each time unit may be the same or different. For example, the time-domain resource available for the second resource pool in the first time unit is last 8 time-domain symbols in the time unit, and the available time-domain resource for the second resource pool in the second time unit is last 4 time-domain symbols in the time unit.

It should be understood that, when configuration parameters of the time-domain resource and/or frequency-domain resource of the first resource pool may be explicitly determined by configuration parameters of the time-domain resource and/or frequency-domain resource of the second resource pool, the first configuration information may not include the corresponding configuration parameters. Or, when the configuration parameters of the time-domain resource and/or frequency-domain resource of the second resource pool may be implicitly determined by the configuration parameters of the time-domain resource and/or frequency-domain resource of the first resource pool, the first configuration information may not include the corresponding configuration parameters. For example, when the first resource pool and the second resource pool occupy the same time unit, for example, the first resource pool occupies first N symbols of a subframe and the second resource pool occupies other symbols of the subframe, and when the network configures the starting position information of the time-domain resource of the first resource pool and length information of the time-domain resource of the first resource pool, the starting position information of the time-domain resource of the second resource pool and length information of the time-domain resource of the second resource pool are not required to be configured. Or, when the first control channel and the corresponding data channel occupy the same frequency-domain size, and when the network configures the information of the number of the frequency-domain units occupied by the first control channel and the information of a size of the frequency-domain units occupied by the first control channel, the information of the number of the frequency-domain units occupied by the data channel transmitted in the second resource pool and the information of a size of the frequency-domain units occupied by the data channel transmitted in the second resource pool are not required to be configured.

According to the technical solution of the embodiment of the disclosure, the PSCCH resource pool and/or the PSSCH resource pool are/is configured, so that the delay is reduced without increasing the detection complexity of a Rel-15 receiver and influencing a resource sensing and selecting process of a Rel-14 terminal.

It is understood by those skilled in the art that the related descriptions about the resource configuration device of the embodiments of the disclosure may be understood with reference to the related descriptions about the resource configuration method of the embodiments of the disclosure.

Figure 9:
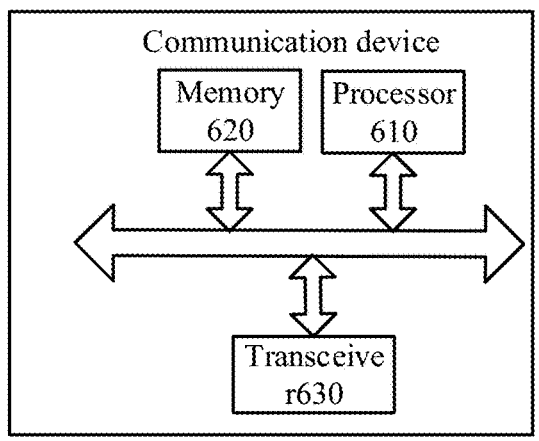
FIG. 9 is a schematic structure diagram of a communication device according to an embodiment of the disclosure.

FIG. 9 is a schematic structure diagram of a communication device 600 according to an embodiment of the disclosure. The communication device may be a terminal device or a network device such as a base station. The communication device illustrated in FIG. 9 includes a processor 610, and the processor 610 may call and run a computer program in a memory to implement the method in the embodiments of the disclosure.

Optionally, as illustrated in FIG. 9, the communication device 600 may further include the memory 620. The processor 610 may call and run the computer program in the memory 620 to implement the method in the embodiments of the disclosure.

The memory 620 may be an independent device independent of the processor 610 and may also be integrated into the processor 610.

Optionally, as illustrated in FIG. 9, the communication device 600 may further include a transceiver 630, and the processor 610 may control the transceiver 630 to communicate with another device, specifically transmitting information or data to the other device or receiving information or data sent by the other device.

The transceiver 630 may include a transmitter and a receiver. The transceiver 630 may further include antennae, and the number of the antennae may be one or more.

Optionally, the communication device 600 may specifically be a network device of the embodiment of the disclosure, and the communication device 600 may implement corresponding flows implemented by the network device in each method of the embodiments of the disclosure. For simplicity, elaborations are omitted herein.

Optionally, the communication device 600 may specifically be the mobile terminal/terminal device of the embodiments of the disclosure, and the communication device 600 may implement corresponding flows implemented by the mobile terminal/terminal device in each method of the embodiments of the disclosure. For simplicity, elaborations are omitted herein.

Figure 10:
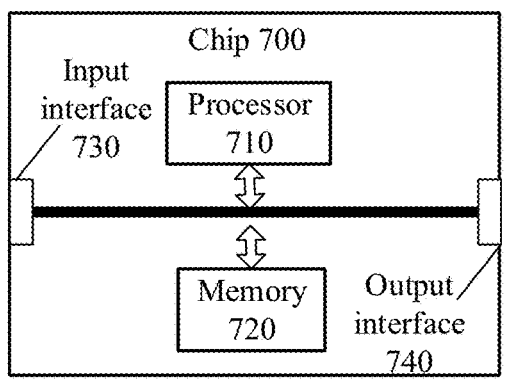
FIG. 10 is a schematic structure diagram of a chip according to another embodiment of the disclosure.

FIG. 10 is a schematic structure diagram of a chip according to another embodiment of the disclosure. The chip 700 illustrated in FIG. 10 includes a processor 710, and the processor 710 may call and run a computer program in a memory to implement the method in the embodiments of the disclosure.

Optionally, as illustrated in FIG. 10, the chip 700 may further include the memory 720. The processor 710 may call and run the computer program in the memory 720 to implement the method in the embodiments of the disclosure.

The memory 720 may be an independent device independent of the processor 710 and may also be integrated into the processor 710.

Optionally, the chip 700 may further include an input interface 730. The processor 710 may control the input interface 730 to communicate with another device or chip, specifically acquiring information or data sent by the other device or chip.

Optionally, the chip 700 may further include an output interface 740. The processor 710 may control the output interface 740 to communicate with the other device or chip, specifically outputting information or data sent by the other device or chip.

Optionally, the chip may be applied to the network device of the embodiments of the disclosure, and the chip may implement corresponding flows implemented by the network device in each method of the embodiments of the disclosure. For simplicity, elaborations are omitted herein.

Optionally, the chip may be applied to the mobile terminal/terminal device of the embodiment of the disclosure, and the chip may implement corresponding flows implemented by the mobile terminal/terminal device in each method of the embodiment of the disclosure. For simplicity, elaborations are omitted herein.

It is to be understood that the chip mentioned in the embodiment of the disclosure may also be called a system-level chip, a system chip, a chip system or a system on chip, etc.

Figure 11:
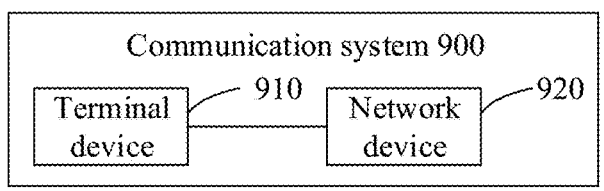
FIG. 11 is a schematic structure diagram of a communication system according to an embodiment of the disclosure.

FIG. 11 is a second block diagram of a communication system 900 according to an embodiment of the disclosure. As illustrated in FIG. 11, a communication system 900 includes a terminal device 910 and a network device 920.

The terminal device 910 may be configured to realize corresponding functions realized by the terminal device in the method, and the network device 920 may be configured to realize corresponding functions realized by the network device in the method. For simplicity, elaborations are omitted herein.

It is to be understood that the processor in the embodiment of the disclosure may be an integrated circuit chip and has a signal processing capacity. In an implementation process, each step of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the embodiments of the disclosure may be implemented or executed. The universal processor may be a microprocessor or the processor may also be any conventional processor and the like. The steps of the method disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the steps of the method in combination with hardware.

It can be understood that the memory in the embodiment of the disclosure may be a volatile memory or a nonvolatile memory, or may include both the volatile and nonvolatile memories. The nonvolatile memory may be a ROM, a PROM, an Erasable PROM (EPROM), an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

It is to be understood that the memory is exemplarily but unlimitedly described. For example, the memory in the embodiments of the disclosure may also be an SRAM, a DRAM, an SDRAM, a DDR SDRAM, an ESDRAM, an SLDRAM and a DR RAM. That is, the memory in the embodiments of the disclosure is intended to include, but not limited to, memories of these and any other proper types.

The embodiments of the disclosure also provide a computer-readable storage medium, which is configured to store a computer program.

Optionally, the computer-readable storage medium may be applied to a network device in the embodiments of the disclosure, and the computer program enables a computer to execute corresponding flows implemented by the network device in each method of the embodiments of the disclosure. For simplicity, elaborations are omitted herein.

Optionally, the computer-readable storage medium may be applied to a mobile terminal/terminal device in the embodiments of the disclosure, and the computer program enables a computer to execute corresponding flows implemented by the mobile terminal/terminal device in each method of the embodiments of the disclosure. For simplicity, elaborations are omitted herein.

The embodiments of the disclosure also provide a computer program product, which includes a computer program instruction.

Optionally, the computer program product may be applied to a network device in the embodiments of the disclosure, and the computer program instruction enables a computer to execute corresponding flows implemented by the network device in each method of the embodiments of the disclosure. For simplicity, elaborations are omitted herein.

Optionally, the computer program product may be applied to a mobile terminal/terminal device in the embodiments of the disclosure, and the computer program instruction enables the computer to execute corresponding flows implemented by the mobile terminal/terminal device in each method of the embodiments of the disclosure. For simplicity, elaborations are omitted herein.

The embodiments of the disclosure also provide a computer program.

Optionally, the computer program may be applied to a network device in the embodiments of the disclosure, and the computer program runs in a computer to enable the computer to execute corresponding flows implemented by the network device in each method of the embodiments of the disclosure. For simplicity, elaborations are omitted herein.

Optionally, the computer program may be applied to a mobile terminal/terminal device in the embodiments of the disclosure, and the computer program runs in the computer to enable the computer to execute corresponding flows implemented by the mobile terminal/terminal device in each method of the embodiments of the disclosure. For simplicity, elaborations are omitted herein.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for control information transmission, comprising:
    performing, by a first device, transmission of first control information between the first device and a second device, the first control information being carried in a second control channel and being used to schedule transmission of a first control channel and a first data channel, the first control channel being used for transmission of Sidelink Control Information (SCI), the first data channel being used for transmission of Sidelink (SL) data, and transmission of the first data channel and the first control channel being time division,
    wherein the first control information comprises frequency-domain resource information of the first data channel,
    wherein the first control information comprises a third parameter, and the third parameter is used to determine a starting position of the frequency-domain resource for the first data channel and a length of the frequency-domain resource for the first data channel,
    wherein when the first control information is used to schedule transmission of a plurality of data channels, the plurality of data channels at least comprise the first data channel and a second data channel, and the third parameter is used to determine lengths of frequency-domain resources corresponding to the plurality of data channels and a starting position of frequency-domain resource corresponding to the second data channel.

2. The method of claim 1, wherein the first control information further comprises at least one of: frequency-domain resource information of the first control channel, time-domain resource information of the first control channel, or time-domain resource information of the first data channel.

3. The method of claim 2, wherein the first control information comprises a first parameter, and the first parameter is used to determine at least one of a starting position of the frequency-domain resource for the first control channel or a length of the frequency-domain resource for the first control channel.

4. The method of claim 3, wherein the first parameter is an index value of a frequency-domain unit.

5. The method of claim 2, wherein a length of the frequency-domain resource for the first control channel is determined based on pre-configured information or information configured by a network.

6. The method of claim 2, wherein the first control information comprises first index information, the first index information is used to determine a first frequency-domain resource corresponding to the first index information from a resource configured by first configuration information, and the first configuration information comprises at least one correspondence between index information and a frequency-domain resource.

7. The method of claim 6, wherein the first configuration information is pre-configured or configured by a network.

8. The method of claim 2, wherein the time-domain resource information of the first control channel comprises at least one of time-domain starting position information or time-domain length information,
    the time-domain starting position information is determined through a first indication field in the first control information, and the time-domain length information is determined through a second indication field in the first control information.

9. The method of claim 8, wherein
    the first indication field comprises second index information, and the second index information is used to determine a time unit occupied by a starting position of the first control channel.

10. The method of claim 9, wherein a granularity of the time offset is a slot; the time unit comprises a slot.

11. The method of claim 8, wherein time-domain position of the first control channel within one time unit is determined based on pre-configured information or information configured by a network.

12. The method of claim 2, wherein the first control information comprises third indication field, the third indication field comprises third index information, the third index information is used to determine a first time-domain resource corresponding to the third index information from a resource configured by second configuration information.

13. The method of claim 2, wherein
    the first control information comprises at least one of frequency-domain resource information corresponding to one first control channel or time-domain resource information corresponding to the one first control channel; or
    the first control information comprises at least one of frequency-domain resource information corresponding to a plurality of first control channels or time-domain resource information corresponding to the plurality of first control channels.

14. The method of claim 2, wherein the first control information comprises fourth index information, the fourth index information is used to determine a second frequency-domain resource corresponding to the fourth index information from third configuration information.

15. The method of claim 2, wherein the time-domain resource information of the first data channel comprises time-domain starting position information,
the time-domain starting position information is determined through a fourth indication field in the first control information.

16. The method of claim 15, wherein the fourth indication field comprises second time offset information, and the second time offset information is used to determine a time offset of a time-domain resource for the first data channel relative to the time-domain resource for the second control channel or the first control channel.

17. The method of claim 2, wherein time-domain resource for the first data channel within a time unit is determined based on pre-configuration information or information configuration by a network.

18. The method of claim 2, wherein a last time-domain symbol of a last time unit occupied by the first data channel is not configured for data transmission.

19. The method of claim 1, wherein a frequency-domain starting position of the first control channel is the same as a frequency-domain starting position of the first data channel.

20. The method of claim 1, wherein the transmission of the first data channel and the first control channel being time division comprises that:
the transmission of the first data channel and the first control channel is time division in a time unit, the first control channel occupying A time-domain symbols in the time unit, the first data channel occupying B time-domain symbols in the time unit, and the time-domain resource for the first control channel and the time-domain resource for the first data channel not overlapping, $1 \leq A < C$, $1 \leq B < C$ and $A+B \leq C$, where C is a number of time-domain symbols in one time unit.

21. The method of claim 1, wherein the transmission of the first data channel and the first control channel being time division comprises that:
the transmission of the first data channel and the first control channel is partially time division.

22. The method of claim 21, wherein the transmission of the first data channel and the first control channel being partially time division comprises that:
the time-domain resource occupied by the first control channel at least partially overlaps the time-domain resource occupied by the first data channel.

23. The method of claim 21, wherein time-domain starting position for the first control channel is same as time-domain starting position for the first data channel.

24. The method of claim 21, further comprising that:
the first control channel occupies A time-domain symbols in one time unit, the first data channel occupies B time-domain symbols in the one time unit, and the time-domain resource for the first control channel and the time-domain resource for the first data channel at least partially overlap, $1 \leq A \leq C$ and $1 \leq B \leq C$, where C is a number of time-domain symbols in one time unit.

25. The method of claim 1, wherein a granularity of the frequency-domain unit is one of: Physical Resource Block (PRB) or sub-band.

26. The method of claim 1, wherein the first control information further comprises at least one of:
second indication information, the second indication information being used to determine transmission times of the first data channel;
resource pool indication information, the resource pool indication information being used to determine resource pool information for transmission of at least one of the first control channel or the first data channel;
third indication information, the third indication information being used to determine a transmission resource for a feedback information;
fourth indication information, the fourth indication information being used to determine a transmission mode for an Uplink (UL) control channel; and
eighth indication information, the eighth indication information being used to determine transmission times of the first control channel.

27. A device for control information transmission, applied to a first device and comprising:
a processor, configured to control a transceiver to perform transmission of first control information between the first device and a second device, the first control information being carried in a second control channel, the first control information being used to schedule transmission of a first control channel and a first data channel, the first control channel being used for transmission of Sidelink Control Information (SCI), the first data channel being used for transmission of Sidelink (SL) data, and transmission of the first data channel and the first control channel is time division,
wherein the first control information comprises frequency-domain resource information of the first data channel,
wherein the first control information comprises a third parameter, and the third parameter is used to determine a starting position of the frequency-domain resource for the first data channel and a length of the frequency-domain resource for the first data channel,
wherein when the first control information is used to schedule transmission of a plurality of data channels, the plurality of data channels at least comprise the first data channel and a second data channel, and the third parameter is used to determine lengths of frequency-domain resources corresponding to the plurality of data channels and a starting position of frequency-domain resource corresponding to the second data channel.

* * * * *